(12) United States Patent
Blum et al.

(10) Patent No.: US 11,061,252 B2
(45) Date of Patent: Jul. 13, 2021

(54) HINGE FOR ELECTRONIC SPECTACLES

(71) Applicant: e-Vision, LLC, Sarasota, FL (US)

(72) Inventors: Ronald D. Blum, Roanoke, VA (US); William Kokonaski, Gig Harbor, WA (US); Claudio Dalla Longa, Sarasota, FL (US); Mark Graham, Sarasota, FL (US); Joshua N. Haddock, Roanoke, VA (US); Charles Willey, Sarasota, FL (US); Tiziano Tabacchi, Sarasota, FL (US); Martin Boch, Sarasota, FL (US); Massimo Pinazza, Sarasota, FL (US); Scott N. Richman, Sarasota, FL (US); Volkan Ozguz, Sarasota, FL (US)

(73) Assignee: e-Vision, LLC, Sarasota, FL (US)

( * ) Notice: Subject to any disclaimer, the term of this patent is extended or adjusted under 35 U.S.C. 154(b) by 151 days.

(21) Appl. No.: 16/376,310

(22) Filed: Apr. 5, 2019

(65) Prior Publication Data
US 2019/0235284 A1    Aug. 1, 2019

Related U.S. Application Data

(63) Continuation of application No. 13/890,809, filed on May 9, 2013, now Pat. No. 10,613,355, which is a
(Continued)

(51) Int. Cl.
*G02C 5/22* (2006.01)
*G02C 11/00* (2006.01)
(Continued)

(52) U.S. Cl.
CPC ............. *G02C 5/22* (2013.01); *G02B 27/017* (2013.01); *G02C 5/2209* (2013.01); *G02C 7/083* (2013.01);
(Continued)

(58) Field of Classification Search
CPC .. G02C 5/22; G02C 11/10; G02C 7/02; G02C 7/022
(Continued)

(56) References Cited

U.S. PATENT DOCUMENTS 2,437,642 A  3/1948  Henroteau
2,576,581 A  11/1951 Edwards
(Continued)

FOREIGN PATENT DOCUMENTS

CN   89113088 A   10/2001
DE   2304134 A1   8/1973
(Continued)

OTHER PUBLICATIONS

Anderson, M.; Adaptive Optics: Liquid Crystals Lower the Cost of Adaptive Optics; Laser Focus World, Dec. 1999.
(Continued)

*Primary Examiner* — Darryl J Collins
(74) *Attorney, Agent, or Firm* — Smith Baluch LLP

(57) ABSTRACT

Eyewear including an optical functional member, control electronics, and a sealed electrical connective element connecting the electronics to the optical functional member. The connective element can directly connect the electronics to the optical functional member, or can connect through an intermediate contact, e.g., a plug-and-receptacle. The connective element can be routed from the electronics, around a rimlock of the eyewear to the optical functional member. The connective element can be a conductive compressible member, such as conductive rubber. In some embodiments, the connective element can be a multiconductor cable.

13 Claims, 26 Drawing Sheets

Related U.S. Application Data continuation-in-part of application No. 13/587,645, filed on Aug. 16, 2012, now abandoned, which is a continuation-in-part of application No. 13/372,240, filed on Feb. 13, 2012, now Pat. No. 8,801,174, said application No. 13/890,809 is a continuation-in-part of application No. 13/726,267, filed on Dec. 24, 2012, now Pat. No. 8,708,483, which is a continuation of application No. 12/834,526, filed on Jul. 12, 2010, now Pat. No. 8,337,014, which is a continuation of application No. 12/054,299, filed on Mar. 24, 2008, now abandoned, said application No. 13/890,809 is a continuation-in-part of application No. 13/372,240, filed on Feb. 13, 2012, now Pat. No. 8,801,174, and a continuation-in-part of application No. 13/169,996, filed on Jun. 27, 2011, now abandoned, which is a continuation-in-part of application No. PCT/US2011/029419, filed on Mar. 22, 2011, said application No. 13/890,809 is a continuation-in-part of application No. 12/834,526, filed on Jul. 12, 2010, now Pat. No. 8,337,014, which is a continuation of application No. 12/054,299, filed on Mar. 24, 2008, now abandoned, said application No. 13/890,809 is a continuation-in-part of application No. 13/298,997, filed on Nov. 17, 2011, now Pat. No. 8,944,590, and a continuation-in-part of application No. 13/298,992, filed on Nov. 17, 2011, now Pat. No. 8,905,541, which is a continuation-in-part of application No. 13/175,633, filed on Jul. 1, 2011, now Pat. No. 8,783,861, and a continuation-in-part of application No. 13/175,634, filed on Jul. 1, 2011, now abandoned, and a continuation-in-part of application No. 13/179,219, filed on Jul. 8, 2011, now Pat. No. 8,979,259, said application No. 13/890,809 is a continuation-in-part of application No. 13/866,575, filed on Apr. 19, 2013, now abandoned.

(60) Provisional application No. 61/524,567, filed on Aug. 17, 2011, provisional application No. 61/537,205, filed on Sep. 21, 2011, provisional application No. 61/563,937, filed on Nov. 28, 2011, provisional application No. 60/978,517, filed on Oct. 9, 2007, provisional application No. 60/929,991, filed on Jul. 20, 2007, provisional application No. 60/929,419, filed on Jun. 26, 2007, provisional application No. 60/924,225, filed on May 4, 2007, provisional application No. 61/441,817, filed on Feb. 11, 2011, provisional application No. 61/382,963, filed on Sep. 15, 2010, provisional application No. 61/366,746, filed on Jul. 22, 2010, provisional application No. 61/358,447, filed on Jun. 25, 2010, provisional application No. 61/326,703, filed on Apr. 22, 2010, provisional application No. 61/317,100, filed on Mar. 24, 2010, provisional application No. 61/481,353, filed on May 2, 2011, provisional application No. 61/415,391, filed on Nov. 19, 2010, provisional application No. 61/376,719, filed on Aug. 25, 2010, provisional application No. 61/638,290, filed on Apr. 25, 2012.

(51) Int. Cl.
 *G02C 7/08* (2006.01)
 *G02C 7/10* (2006.01)
 *G02B 27/01* (2006.01)
 *H01R 35/04* (2006.01)
 *H01R 13/24* (2006.01)
 *G02C 5/14* (2006.01)

(52) U.S. Cl.
 CPC .............. *G02C 7/101* (2013.01); *G02C 11/10* (2013.01); *H01R 35/04* (2013.01); *G02B 2027/0134* (2013.01); *G02B 2027/0178* (2013.01); *G02C 5/146* (2013.01); *H01R 13/2414* (2013.01)

(58) Field of Classification Search
 USPC .................................................. 351/153, 158
 See application file for complete search history.

(56) References Cited

U.S. PATENT DOCUMENTS

| | | | |
|---|---|---|---|
| 2,930,857 | A | 3/1960 | Hollingsworth |
| 3,160,735 | A * | 12/1964 | Aufricht ................ G02C 11/08 2/435 |
| 3,161,718 | A | 12/1964 | De Luca |
| 3,245,315 | A | 4/1966 | Marks et al. |
| 3,309,162 | A | 3/1967 | Kosanke et al. |
| 3,614,215 | A | 10/1971 | Leo |
| 3,738,734 | A | 6/1973 | Tait et al. |
| 3,791,719 | A | 2/1974 | Kratzer et al. |
| 4,062,629 | A | 12/1977 | Winthrop |
| 4,152,846 | A | 5/1979 | Witt |
| 4,174,156 | A | 11/1979 | Glorieux |
| 4,181,408 | A | 1/1980 | Senders |
| 4,190,330 | A | 2/1980 | Berreman |
| 4,243,306 | A | 1/1981 | Bononi |
| 4,254,451 | A | 3/1981 | Cochran, Jr. |
| 4,264,154 | A | 4/1981 | Petersen |
| 4,279,474 | A | 7/1981 | Belgorod |
| 4,283,127 | A | 8/1981 | Rosenwinkel et al. |
| 4,300,818 | A | 11/1981 | Schachar |
| 4,320,939 | A | 3/1982 | Mueller |
| 4,373,218 | A | 2/1983 | Schachar |
| 4,395,736 | A | 7/1983 | Fraleux |
| 4,418,990 | A | 12/1983 | Gerber |
| 4,423,929 | A | 1/1984 | Gomi |
| 4,431,262 | A | 2/1984 | Tolles |
| 4,457,585 | A | 7/1984 | Ducorday |
| 4,461,550 | A | 7/1984 | Legendre |
| 4,466,703 | A | 8/1984 | Nishimoto |
| 4,466,706 | A | 8/1984 | Lamothe, II |
| 4,520,238 | A | 5/1985 | Ikeda |
| 4,529,268 | A | 7/1985 | Brown |
| 4,537,479 | A | 8/1985 | Shinohara et al. |
| 4,564,267 | A | 1/1986 | Nishimoto |
| 4,572,616 | A | 2/1986 | Kowel et al. |
| 4,577,928 | A | 3/1986 | Brown |
| 4,601,545 | A | 7/1986 | Kern |
| 4,609,824 | A | 9/1986 | Munier et al. |
| 4,712,870 | A | 12/1987 | Robinson et al. |
| 4,756,605 | A | 7/1988 | Okada et al. |
| 4,772,094 | A | 9/1988 | Sheiman |
| D298,250 | S | 10/1988 | Kildall |
| 4,787,733 | A | 11/1988 | Silva |
| 4,787,903 | A | 11/1988 | Grendahl |
| 4,795,248 | A | 1/1989 | Okada et al. |
| 4,813,777 | A | 3/1989 | Rainville et al. |
| 4,818,095 | A | 4/1989 | Takeuchi |
| 4,836,652 | A | 6/1989 | Oishi et al. |
| 4,842,400 | A | 6/1989 | Klein |
| 4,873,029 | A | 10/1989 | Blum |
| 4,875,030 | A | 10/1989 | Chiu |
| 4,880,300 | A | 11/1989 | Payner et al. |
| 4,890,903 | A | 1/1990 | Treisman et al. |
| 4,904,063 | A | 2/1990 | Okada et al. |
| 4,907,860 | A | 3/1990 | Noble |
| 4,909,626 | A | 3/1990 | Purvis et al. |
| 4,919,520 | A | 4/1990 | Okada et al. |
| 4,921,728 | A | 5/1990 | Takiguchi et al. |
| 4,927,241 | A | 5/1990 | Kuijk |
| 4,929,865 | A | 5/1990 | Blum |

(56) References Cited

U.S. PATENT DOCUMENTS

| | | |
|---|---|---|
| 4,930,884 A | 6/1990 | Tichenor et al. |
| 4,944,584 A | 7/1990 | Maeda et al. |
| 4,945,242 A | 7/1990 | Berger et al. |
| 4,952,788 A | 8/1990 | Berger et al. |
| 4,955,712 A | 9/1990 | Barth et al. |
| 4,958,907 A | 9/1990 | Davis |
| 4,961,639 A | 10/1990 | Lazarus |
| 4,967,268 A | 10/1990 | Lipton et al. |
| 4,968,127 A | 11/1990 | Russell et al. |
| 4,981,342 A | 1/1991 | Fiala |
| 4,991,258 A | 2/1991 | Drlik |
| 4,991,951 A | 2/1991 | Mizuno et al. |
| 5,015,086 A | 5/1991 | Okaue et al. |
| 5,030,882 A | 7/1991 | Solero |
| 5,050,981 A | 9/1991 | Roffman |
| 5,066,301 A | 11/1991 | Wiley |
| 5,067,795 A | 11/1991 | Senatore |
| 5,073,021 A | 12/1991 | Marron |
| 5,076,665 A | 12/1991 | Petersen |
| 5,089,023 A | 2/1992 | Swanson |
| 5,091,801 A | 2/1992 | Ebstein |
| 5,108,169 A | 4/1992 | Mandell |
| 5,114,218 A | 5/1992 | Black et al. |
| 5,114,628 A | 5/1992 | Hoefer et al. |
| 5,130,856 A | 7/1992 | Tichenor et al. |
| 5,142,411 A | 8/1992 | Fiala |
| 5,147,585 A | 9/1992 | Blum |
| 5,150,234 A | 9/1992 | Takahashi et al. |
| 5,171,266 A | 12/1992 | Wiley et al. |
| 5,178,800 A | 1/1993 | Blum |
| 5,182,585 A | 1/1993 | Stoner |
| 5,184,156 A | 2/1993 | Black et al. |
| 5,200,859 A | 4/1993 | Payner et al. |
| RE34,251 E | 5/1993 | Achatz et al. |
| 5,208,688 A | 5/1993 | Fergason et al. |
| 5,219,497 A | 6/1993 | Blum |
| 5,229,797 A | 7/1993 | Futhey et al. |
| 5,229,885 A | 7/1993 | Quaglia |
| 5,231,430 A | 7/1993 | Kohayakawa |
| 5,239,412 A | 8/1993 | Naka et al. |
| D342,063 S | 12/1993 | Howitt et al. |
| 5,305,028 A | 4/1994 | Okano |
| 5,306,926 A | 4/1994 | Yonemoto |
| 5,319,397 A | 6/1994 | Ryden |
| 5,324,930 A | 6/1994 | Jech |
| D350,342 S | 9/1994 | Sack |
| 5,352,886 A | 10/1994 | Kane |
| 5,359,444 A | 10/1994 | Piosenka et al. |
| 5,375,006 A | 12/1994 | Haas |
| 5,382,986 A | 1/1995 | Black et al. |
| 5,386,308 A | 1/1995 | Michel et al. |
| 5,424,927 A | 6/1995 | Schaller et al. |
| 5,440,357 A | 8/1995 | Quaglia |
| 5,443,506 A | 8/1995 | Garabet |
| 5,451,766 A | 9/1995 | Van |
| 5,455,638 A | 10/1995 | Kallman et al. |
| 5,463,428 A | 10/1995 | Lipton et al. |
| 5,488,439 A | 1/1996 | Weltmann |
| 5,489,302 A | 2/1996 | Skottun |
| 5,522,323 A | 6/1996 | Richard |
| 5,526,067 A | 6/1996 | Cronin et al. |
| 5,552,841 A | 9/1996 | Gallorini et al. |
| 5,606,743 A * | 2/1997 | Vogt ........................ H04B 1/086 16/228 |
| 5,608,567 A | 3/1997 | Grupp |
| 5,615,588 A | 4/1997 | Gottschald |
| 5,654,789 A | 8/1997 | Kirigaya et al. |
| 5,657,107 A | 8/1997 | Wagner et al. |
| 5,668,620 A | 9/1997 | Kurtin et al. |
| 5,682,223 A | 10/1997 | Menezes et al. |
| 5,683,457 A | 11/1997 | Gupta et al. |
| 5,684,637 A | 11/1997 | Floyd |
| RE35,691 E | 12/1997 | Theirl et al. |
| 5,710,615 A | 1/1998 | Kitani |
| 5,712,721 A | 1/1998 | Large |
| 5,728,155 A | 3/1998 | Anello et al. |
| 5,739,959 A | 4/1998 | Quaglia |
| 5,742,379 A | 4/1998 | Reifer |
| 5,760,869 A | 6/1998 | Mitamura |
| 5,764,338 A | 6/1998 | Mack |
| 5,774,273 A | 6/1998 | Bornhorst |
| 5,777,719 A | 7/1998 | Williams et al. |
| 5,815,233 A | 9/1998 | Morokawa et al. |
| 5,815,239 A | 9/1998 | Chapman et al. |
| 5,835,185 A | 11/1998 | Kallman et al. |
| 5,861,934 A | 1/1999 | Blum et al. |
| 5,861,936 A | 1/1999 | Sorensen |
| 5,877,876 A | 3/1999 | Birdwell |
| 5,900,720 A | 5/1999 | Kallman et al. |
| 5,949,521 A | 9/1999 | Williams et al. |
| 5,953,098 A | 9/1999 | Lieberman et al. |
| 5,956,183 A | 9/1999 | Epstein et al. |
| 5,963,300 A | 10/1999 | Horwitz |
| 5,971,540 A | 10/1999 | Ofner |
| 5,980,037 A | 11/1999 | Conway |
| 5,999,328 A | 12/1999 | Kurtin et al. |
| 6,040,947 A | 3/2000 | Kurtin et al. |
| 6,050,687 A | 4/2000 | Bille et al. |
| 6,069,742 A | 5/2000 | Silver |
| 6,086,203 A | 7/2000 | Blum et al. |
| 6,086,204 A | 7/2000 | Magnante |
| 6,095,651 A | 8/2000 | Williams et al. |
| 6,097,450 A | 8/2000 | Humphrey |
| 6,099,117 A | 8/2000 | Gregory |
| 6,115,177 A | 9/2000 | Vossler |
| 6,136,926 A | 10/2000 | Raetzsch et al. |
| 6,142,941 A | 11/2000 | Benhalima et al. |
| 6,145,987 A | 11/2000 | Baude et al. |
| 6,163,926 A | 12/2000 | Watanabe |
| 6,188,525 B1 | 2/2001 | Silver |
| 6,191,881 B1 | 2/2001 | Tajima |
| 6,213,602 B1 | 4/2001 | Smarto |
| 6,270,220 B1 | 8/2001 | Keren |
| 6,271,915 B1 | 8/2001 | Frey et al. |
| 6,288,846 B1 | 9/2001 | Stoner, Jr. |
| 6,305,802 B1 | 10/2001 | Roffman et al. |
| 6,325,508 B1 | 12/2001 | Decreton et al. |
| 6,336,250 B1 | 1/2002 | Takeda et al. |
| 6,350,031 B1 | 2/2002 | Lashkari et al. |
| 6,390,623 B1 | 5/2002 | Kokonaski et al. |
| 6,396,622 B1 | 5/2002 | Alden |
| 6,412,941 B1 | 7/2002 | Xiao |
| 6,433,913 B1 | 8/2002 | Bauer et al. |
| 6,437,762 B1 | 8/2002 | Birdwell |
| 6,437,925 B1 | 8/2002 | Nishioka |
| 6,464,363 B1 | 10/2002 | Nishioka et al. |
| 6,491,391 B1 | 12/2002 | Blum et al. |
| 6,491,394 B1 | 12/2002 | Blum et al. |
| 6,501,443 B1 | 12/2002 | Mcmahon |
| 6,517,203 B1 | 2/2003 | Blum et al. |
| 6,554,425 B1 | 4/2003 | Roffman et al. |
| 6,582,075 B1 | 6/2003 | Swab et al. |
| 6,595,634 B1 | 7/2003 | Pilat, Jr. |
| 6,607,271 B2 | 8/2003 | Bar et al. |
| 6,609,794 B2 | 8/2003 | Levine |
| 6,614,408 B1 | 9/2003 | Mann |
| 6,616,275 B1 | 9/2003 | Dick et al. |
| 6,616,279 B1 | 9/2003 | Davis et al. |
| 6,618,208 B1 | 9/2003 | Silver |
| 6,619,799 B1 | 9/2003 | Blum et al. |
| 6,626,532 B1 | 9/2003 | Nishioka et al. |
| 6,631,001 B2 | 10/2003 | Kuiseko |
| 6,682,195 B2 | 1/2004 | Dreher |
| 6,709,105 B2 | 3/2004 | Menezes |
| 6,709,108 B2 | 3/2004 | Levine et al. |
| 6,715,876 B2 | 4/2004 | Floyd |
| 6,719,425 B2 | 4/2004 | Conner |
| 6,733,130 B2 | 5/2004 | Blum et al. |
| 6,738,199 B2 | 5/2004 | Nishioka |
| 6,768,536 B2 | 7/2004 | Okuwaki et al. |
| 6,772,448 B1 | 8/2004 | Hockaday et al. |
| 6,774,871 B2 | 8/2004 | Birdwell |
| 6,778,246 B2 | 8/2004 | Sun et al. |
| 6,824,265 B1 | 11/2004 | Harper |

(56) References Cited

U.S. PATENT DOCUMENTS

| | | |
|---|---|---|
| 6,833,938 B2 | 12/2004 | Nishioka |
| 6,840,619 B2 | 1/2005 | Dreher |
| 6,851,805 B2 | 2/2005 | Blum et al. |
| 6,857,741 B2 | 2/2005 | Blum et al. |
| 6,866,386 B1 | 3/2005 | Chen |
| 6,871,951 B2 | 3/2005 | Blum et al. |
| 6,883,916 B2 | 4/2005 | Menezes |
| 6,886,938 B1 | 5/2005 | Menezes |
| 6,893,124 B1 | 5/2005 | Kurtin |
| 6,902,271 B2 | 6/2005 | Perrott et al. |
| 6,918,570 B2 | 7/2005 | Ahn |
| 6,918,670 B2 | 7/2005 | Blum et al. |
| 6,927,894 B2 | 8/2005 | Blum et al. |
| 6,938,277 B2 | 9/2005 | Lindahl |
| 6,948,818 B2 | 9/2005 | Williams et al. |
| 6,951,391 B2 | 10/2005 | Michael et al. |
| 6,955,433 B1 | 10/2005 | Benjamin et al. |
| 6,956,682 B2 | 10/2005 | Benjamin |
| 6,986,579 B2 | 1/2006 | Blum et al. |
| 7,008,054 B1 | 3/2006 | Kurtin et al. |
| 7,009,757 B2 | 3/2006 | Nishioka et al. |
| 7,018,040 B2 | 3/2006 | Blum et al. |
| 7,019,890 B2 | 3/2006 | Meredith et al. |
| 7,023,594 B2 | 4/2006 | Blum et al. |
| 7,030,411 B2 | 4/2006 | Krulevitch et al. |
| 7,041,133 B1 | 5/2006 | Azar |
| 7,063,420 B2 | 6/2006 | Lerner et al. |
| 7,077,519 B2 | 7/2006 | Blum et al. |
| 7,085,065 B2 | 8/2006 | Silver |
| 7,090,348 B2 | 8/2006 | Nason et al. |
| 7,104,645 B2 | 9/2006 | Pilat et al. |
| 7,133,172 B2 | 11/2006 | Nishioka |
| 7,140,727 B2 | 11/2006 | Pilat et al. |
| 7,142,369 B2 | 11/2006 | Wu et al. |
| 7,159,983 B2 | 1/2007 | Menezes et al. |
| 7,188,948 B2 | 3/2007 | Blum et al. |
| 7,192,136 B2 | 3/2007 | Howell et al. |
| 7,195,353 B2 | 3/2007 | Blum et al. |
| 7,209,097 B2 | 4/2007 | Suyama et al. |
| 7,229,173 B2 | 6/2007 | Menezes |
| 7,234,809 B2 | 6/2007 | Blum et al. |
| 7,255,437 B2 | 8/2007 | Howell et al. |
| 7,256,943 B1 | 8/2007 | Kobrin et al. |
| 7,264,354 B2 | 9/2007 | Blum et al. |
| 7,290,875 B2 | 11/2007 | Blum et al. |
| 7,290,876 B2 | 11/2007 | Duston et al. |
| 7,333,272 B2 | 2/2008 | Oh et al. |
| 7,369,321 B1 | 5/2008 | Ren et al. |
| 7,374,283 B2 | 5/2008 | Blum et al. |
| 7,380,936 B2 | 6/2008 | Howell et al. |
| 7,396,126 B2 | 7/2008 | Blum et al. |
| 7,401,918 B2 | 7/2008 | Howell et al. |
| 7,404,636 B2 | 7/2008 | Blum et al. |
| 7,425,066 B2 | 9/2008 | Blum et al. |
| 7,438,410 B1 | 10/2008 | Howell et al. |
| 7,452,075 B2 | 11/2008 | Iuliano |
| 7,453,646 B2 | 11/2008 | Lo |
| 7,475,984 B2 | 1/2009 | Blum et al. |
| 7,475,985 B2 | 1/2009 | Blum et al. |
| 7,481,531 B2 | 1/2009 | Howell et al. |
| 7,500,746 B1 | 3/2009 | Howell et al. |
| 7,500,747 B2 | 3/2009 | Howell et al. |
| 7,517,083 B2 | 4/2009 | Blum et al. |
| 7,527,375 B2 | 5/2009 | Blum et al. |
| 7,533,993 B2 | 5/2009 | Blum et al. |
| 7,543,934 B2 | 6/2009 | Howell et al. |
| 7,553,019 B2 | 6/2009 | Kuiper et al. |
| 7,581,833 B2 | 9/2009 | Howell et al. |
| 7,588,332 B2 | 9/2009 | Blum et al. |
| 7,594,726 B2 | 9/2009 | Silver et al. |
| 7,604,349 B2 | 10/2009 | Blum et al. |
| 7,621,634 B2 | 11/2009 | Howell et al. |
| 7,654,667 B2 | 2/2010 | Blum et al. |
| 7,656,509 B2 | 2/2010 | Haddock et al. |
| 7,675,686 B2 | 3/2010 | Lo et al. |
| 7,677,723 B2 | 3/2010 | Howell et al. |
| 7,728,949 B2 | 6/2010 | Clarke et al. |
| 7,731,358 B2 | 6/2010 | Blum et al. |
| 7,744,215 B2 | 6/2010 | Blum et al. |
| 7,760,898 B2 | 7/2010 | Howell et al. |
| 7,771,046 B2 | 8/2010 | Howell et al. |
| 7,777,660 B2 | 8/2010 | Chen et al. |
| 7,782,541 B2 | 8/2010 | Oh et al. |
| 7,784,935 B2 | 8/2010 | Jackson et al. |
| 7,806,525 B2 | 10/2010 | Howell et al. |
| 7,813,048 B2 | 10/2010 | Lynch et al. |
| 7,850,304 B2 | 12/2010 | Jacobs et al. |
| 7,883,206 B2 | 2/2011 | Blum et al. |
| 7,883,207 B2 | 2/2011 | Iyer et al. |
| 7,922,321 B2 | 4/2011 | Howell et al. |
| 7,926,940 B2 | 4/2011 | Blum et al. |
| 7,926,941 B2 | 4/2011 | Blum et al. |
| 7,971,994 B2 | 7/2011 | Blum et al. |
| 7,988,286 B2 | 8/2011 | Blum et al. |
| 8,016,415 B2 | 9/2011 | Figler et al. |
| 8,047,651 B2 | 11/2011 | Blum et al. |
| 8,066,373 B2 | 11/2011 | Blum et al. |
| 8,075,132 B2 | 12/2011 | Blum et al. |
| 8,092,016 B2 | 1/2012 | Blum et al. |
| 8,109,629 B2 | 2/2012 | Howell et al. |
| 8,154,804 B2 | 4/2012 | McGinn et al. |
| 8,197,063 B2 | 6/2012 | Iyer et al. |
| 8,215,770 B2 | 7/2012 | Blum et al. |
| 8,308,295 B2 | 11/2012 | Blum et al. |
| 8,317,321 B2 | 11/2012 | Haddock et al. |
| 8,319,937 B2 | 11/2012 | Clarke et al. |
| 8,333,470 B2 | 12/2012 | Blum et al. |
| 8,337,013 B2 | 12/2012 | Howell et al. |
| 8,337,014 B2 | 12/2012 | Kokonaski et al. |
| 8,408,699 B2 | 4/2013 | Blum et al. |
| 8,430,507 B2 | 4/2013 | Howell et al. |
| 8,434,863 B2 | 5/2013 | Howell et al. |
| 8,434,864 B2 | 5/2013 | Gupta et al. |
| 8,465,151 B2 | 6/2013 | Howell et al. |
| 8,500,271 B2 | 8/2013 | Howell et al. |
| 8,523,354 B2 | 9/2013 | Haddock et al. |
| 8,534,832 B2 | 9/2013 | Gupta et al. |
| 8,573,774 B2 | 11/2013 | Gupta et al. |
| 8,579,435 B2 | 11/2013 | Blum et al. |
| 8,641,191 B2 | 2/2014 | Blum et al. |
| 8,662,665 B2 | 3/2014 | Iyer et al. |
| 8,678,581 B2 | 3/2014 | Blum |
| 8,708,483 B2 | 4/2014 | Kokonaski et al. |
| 8,770,742 B2 | 7/2014 | Howell et al. |
| 8,778,022 B2 | 7/2014 | Blum et al. |
| 8,783,861 B2 | 7/2014 | Blum et al. |
| 8,801,174 B2 | 8/2014 | Willey |
| 8,827,446 B2 | 9/2014 | Iyer et al. |
| 8,830,408 B2 | 9/2014 | Haddock et al. |
| 8,854,519 B2 | 10/2014 | Duston et al. |
| 8,905,541 B2 | 12/2014 | Blum et al. |
| 8,915,588 B2 | 12/2014 | Blum et al. |
| 8,921,445 B2 | 12/2014 | Turshani et al. |
| 8,922,902 B2 | 12/2014 | Blum et al. |
| 8,928,796 B2 | 1/2015 | Van et al. |
| 8,931,896 B2 | 1/2015 | Blum et al. |
| 8,944,590 B2 | 2/2015 | Blum et al. |
| 8,979,259 B2 | 3/2015 | Haddock et al. |
| 9,022,563 B2 | 5/2015 | Gupta et al. |
| 9,028,062 B2 | 5/2015 | Kokonaski et al. |
| 9,033,494 B2 | 5/2015 | Blum et al. |
| 9,074,040 B2 | 7/2015 | Turshani et al. |
| 9,081,208 B2 | 7/2015 | Blum et al. |
| 9,096,026 B2 | 8/2015 | Hall et al. |
| 9,122,077 B2 | 9/2015 | Gupta et al. |
| 9,122,083 B2 | 9/2015 | Blum et al. |
| 9,124,796 B2 | 9/2015 | Blum et al. |
| 9,142,329 B2 | 9/2015 | Trajkovska et al. |
| 9,146,407 B2 | 9/2015 | Clarke et al. |
| 9,155,614 B2 | 10/2015 | Blum et al. |
| 9,199,420 B2 | 12/2015 | Trajkovska et al. |
| 9,207,467 B2 | 12/2015 | Gupta et al. |
| 9,229,248 B2 | 1/2016 | Kokonaski et al. |
| 9,268,153 B2 | 2/2016 | Blum et al. |

(56) References Cited

U.S. PATENT DOCUMENTS

| | | |
|---|---|---|
| 9,323,101 B2 | 4/2016 | Blum et al. |
| D755,281 S | 5/2016 | Blum et al. |
| 9,329,309 B2 | 5/2016 | Heugten |
| 9,411,172 B2 | 8/2016 | Haddock et al. |
| 9,442,305 B2 | 9/2016 | Blum et al. |
| 9,470,909 B2 | 10/2016 | Willey et al. |
| 9,588,396 B2 | 3/2017 | Haddock et al. |
| 9,625,767 B2 | 4/2017 | Duston et al. |
| 9,690,117 B2 | 6/2017 | Blum et al. |
| 9,712,738 B2 | 7/2017 | Van et al. |
| 9,801,709 B2 | 10/2017 | Blum et al. |
| 10,613,355 B2 | 4/2020 | Blum et al. |
| 2001/0007493 A1 | 7/2001 | Masunaga et al. |
| 2001/0043266 A1 | 11/2001 | Robinson et al. |
| 2001/0055094 A1 | 12/2001 | Zhang |
| 2002/0140899 A1 | 10/2002 | Blum et al. |
| 2002/0149739 A1 | 10/2002 | Perrott et al. |
| 2002/0186346 A1 | 12/2002 | Stantz et al. |
| 2003/0018383 A1 | 1/2003 | Azar |
| 2003/0095336 A1 | 5/2003 | Floyd |
| 2003/0151721 A1 | 8/2003 | Lai et al. |
| 2003/0210377 A1 | 11/2003 | Blum et al. |
| 2004/0000733 A1 | 1/2004 | Swab et al. |
| 2004/0001180 A1 | 1/2004 | Epstein |
| 2004/0008319 A1 | 1/2004 | Lai et al. |
| 2004/0096078 A1* | 5/2004 | Lin .................. G02C 11/10 381/333 |
| 2004/0108971 A1 | 6/2004 | Waldern et al. |
| 2004/0117011 A1 | 6/2004 | Aharoni et al. |
| 2004/0130677 A1 | 7/2004 | Liang et al. |
| 2004/0156012 A1 | 8/2004 | Jannard et al. |
| 2004/0179280 A1 | 9/2004 | Nishioka |
| 2004/0196435 A1 | 10/2004 | Dick et al. |
| 2004/0223113 A1 | 11/2004 | Blum et al. |
| 2004/0246440 A1 | 12/2004 | Andino et al. |
| 2005/0073739 A1 | 4/2005 | Meredith et al. |
| 2005/0078274 A1 | 4/2005 | Howell et al. |
| 2005/0099594 A1 | 5/2005 | Blum et al. |
| 2005/0124983 A1 | 6/2005 | Frey et al. |
| 2005/0140922 A1 | 6/2005 | Bekerman et al. |
| 2005/0140924 A1 | 6/2005 | Blum et al. |
| 2005/0206844 A1 | 9/2005 | Blum et al. |
| 2005/0213027 A1 | 9/2005 | Blum et al. |
| 2005/0225723 A1 | 10/2005 | Pilu |
| 2005/0225823 A1 | 10/2005 | Ling et al. |
| 2005/0230596 A1 | 10/2005 | Howell et al. |
| 2005/0237477 A1 | 10/2005 | Lindahl et al. |
| 2005/0237485 A1 | 10/2005 | Blum et al. |
| 2005/0239502 A1 | 10/2005 | Swab et al. |
| 2005/0242771 A1 | 11/2005 | Blum et al. |
| 2005/0248719 A1 | 11/2005 | Howell et al. |
| 2005/0264752 A1 | 12/2005 | Howell et al. |
| 2005/0270479 A1 | 12/2005 | Canavan et al. |
| 2005/0270481 A1 | 12/2005 | Blum et al. |
| 2006/0001827 A1 | 1/2006 | Howell et al. |
| 2006/0023158 A1 | 2/2006 | Howell et al. |
| 2006/0044510 A1 | 3/2006 | Williams et al. |
| 2006/0066808 A1 | 3/2006 | Blum et al. |
| 2006/0077562 A1 | 4/2006 | Silver |
| 2006/0092340 A1 | 5/2006 | Blum et al. |
| 2006/0095128 A1 | 5/2006 | Blum et al. |
| 2006/0132382 A1 | 6/2006 | Jannard |
| 2006/0164593 A1 | 7/2006 | Peyghambarian et al. |
| 2006/0203186 A1 | 9/2006 | Ifergan |
| 2006/0238701 A1 | 10/2006 | Blum |
| 2006/0250699 A1 | 11/2006 | Silver et al. |
| 2007/0030442 A1 | 2/2007 | Howell et al. |
| 2007/0059503 A1 | 3/2007 | Park et al. |
| 2007/0064969 A1* | 3/2007 | Chou ................ H04R 1/1066 381/381 |
| 2007/0091257 A1 | 4/2007 | Spivey |
| 2007/0121061 A1 | 5/2007 | Kim |
| 2007/0159562 A1 | 7/2007 | Haddock et al. |
| 2007/0211207 A1 | 9/2007 | Lo et al. |
| 2007/0258039 A1 | 11/2007 | Duston et al. |
| 2007/0263293 A1 | 11/2007 | Batchko et al. |
| 2007/0296918 A1 | 12/2007 | Blum et al. |
| 2008/0019015 A1 | 1/2008 | Fernandez et al. |
| 2008/0084532 A1 | 4/2008 | Kurtin |
| 2008/0100792 A1 | 5/2008 | Blum et al. |
| 2008/0106694 A1 | 5/2008 | Blum et al. |
| 2008/0106695 A1 | 5/2008 | Kokonaski et al. |
| 2008/0129953 A1 | 6/2008 | Blum et al. |
| 2008/0218684 A1 | 9/2008 | Howell et al. |
| 2008/0273166 A1 | 11/2008 | Kokonaski et al. |
| 2008/0273167 A1 | 11/2008 | Clarke |
| 2008/0273169 A1 | 11/2008 | Blum et al. |
| 2008/0316420 A1 | 12/2008 | Agazarova |
| 2009/0002626 A1 | 1/2009 | Wakabayashi |
| 2009/0015785 A1 | 1/2009 | Blum et al. |
| 2009/0082835 A1 | 3/2009 | Jaax et al. |
| 2009/0091818 A1 | 4/2009 | Haddock et al. |
| 2009/0116118 A1 | 5/2009 | Frazier et al. |
| 2009/0120901 A1 | 5/2009 | White et al. |
| 2009/0201460 A1 | 8/2009 | Blum et al. |
| 2009/0213471 A1 | 8/2009 | Silver et al. |
| 2009/0256977 A1 | 10/2009 | Haddock et al. |
| 2009/0264966 A1 | 10/2009 | Blum et al. |
| 2009/0296044 A1 | 12/2009 | Howell et al. |
| 2010/0002190 A1 | 1/2010 | Clarke et al. |
| 2010/0039709 A1 | 2/2010 | Lo |
| 2010/0177277 A1 | 7/2010 | Kokonaski et al. |
| 2010/0201938 A1 | 8/2010 | Jackson et al. |
| 2010/0208194 A1 | 8/2010 | Gupta et al. |
| 2010/0208195 A1 | 8/2010 | Gupta et al. |
| 2010/0265456 A1 | 10/2010 | Matsui |
| 2010/0271588 A1 | 10/2010 | Kokonaski et al. |
| 2010/0309426 A1 | 12/2010 | Howell et al. |
| 2011/0013136 A1 | 1/2011 | Archambeau et al. |
| 2011/0058141 A1 | 3/2011 | Cozzani |
| 2011/0249230 A1 | 10/2011 | Blum |
| 2012/0002159 A1 | 1/2012 | Blum et al. |
| 2012/0002160 A1 | 1/2012 | Blum et al. |
| 2012/0019773 A1 | 1/2012 | Blum et al. |
| 2012/0092775 A1 | 4/2012 | Duston et al. |
| 2012/0127420 A1 | 5/2012 | Blum et al. |
| 2012/0127423 A1 | 5/2012 | Blum et al. |
| 2012/0140167 A1 | 6/2012 | Blum |
| 2012/0212696 A1 | 8/2012 | Trajkovska et al. |
| 2012/0262667 A1 | 10/2012 | Willey |
| 2012/0300171 A1 | 11/2012 | Gupta et al. |
| 2012/0301604 A1 | 11/2012 | Hall et al. |
| 2013/0010256 A1 | 1/2013 | Haddock et al. |
| 2013/0050639 A1 | 2/2013 | Trajkovska et al. |
| 2013/0070198 A1 | 3/2013 | Willey et al. |
| 2013/0201439 A1 | 8/2013 | Kokonaski et al. |
| 2013/0208238 A1 | 8/2013 | Blum et al. |
| 2013/0215374 A1 | 8/2013 | Blum et al. |
| 2013/0235332 A1 | 9/2013 | Blum et al. |
| 2013/0242253 A1 | 9/2013 | Blum et al. |
| 2013/0250135 A1 | 9/2013 | Blum et al. |
| 2013/0250233 A1 | 9/2013 | Blum et al. |
| 2013/0282117 A1 | 10/2013 | Van et al. |
| 2013/0293825 A1 | 11/2013 | Trajkovska et al. |
| 2013/0329183 A1 | 12/2013 | Blum et al. |
| 2013/0342807 A1 | 12/2013 | Blum et al. |
| 2014/0036172 A1 | 2/2014 | Trajkovska-Broach et al. |
| 2014/0132916 A1 | 5/2014 | Iyer et al. |
| 2014/0198370 A1 | 7/2014 | Trajkovska-Broach et al. |
| 2014/0204333 A1 | 7/2014 | Blum et al. |
| 2014/0237817 A1 | 8/2014 | Trajkovska-Broach et al. |
| 2014/0293215 A1 | 10/2014 | Blum et al. |
| 2014/0313473 A1 | 10/2014 | Willey et al. |
| 2014/0327875 A1 | 11/2014 | Blum et al. |
| 2014/0327950 A1 | 11/2014 | Trajkovska-Broach et al. |
| 2014/0347581 A1 | 11/2014 | Haddock et al. |
| 2015/0027613 A1 | 1/2015 | Trajkovska-Broach et al. |
| 2015/0301338 A1 | 10/2015 | Van et al. |
| 2015/0335420 A1 | 11/2015 | Blum et al. |
| 2015/0378177 A1 | 12/2015 | Blum et al. |
| 2015/0378180 A1 | 12/2015 | Blum et al. |
| 2016/0202399 A1 | 7/2016 | Van et al. |
| 2017/0031181 A1 | 2/2017 | Blum et al. |
| 2017/0075141 A1 | 3/2017 | Blum et al. |

(56) References Cited

U.S. PATENT DOCUMENTS

| | | | |
|---|---|---|---|
| 2017/0108713 A1 | 4/2017 | Blum et al. | |
| 2017/0172729 A1 | 6/2017 | Blum et al. | |
| 2017/0176777 A1 | 6/2017 | Blum et al. | |
| 2017/0205680 A1 | 7/2017 | Trajkovska-Broach et al. | |
| 2017/0242317 A1 | 8/2017 | Li et al. | |
| 2017/0293197 A1 | 10/2017 | Van et al. | |
| 2017/0297283 A1 | 10/2017 | Van | |
| 2017/0336637 A1 | 11/2017 | Van | |
| 2020/0363567 A1* | 11/2020 | Kan | G02F 1/13 |

FOREIGN PATENT DOCUMENTS

| | | |
|---|---|---|
| DE | 4223395 A1 | 1/1994 |
| DE | 20103525 U | 3/2003 |
| EP | 0027339 A2 | 4/1981 |
| EP | 0061002 A1 | 9/1982 |
| EP | 0154962 A2 | 9/1985 |
| EP | 0225034 A1 | 6/1987 |
| EP | 0233104 A1 | 8/1987 |
| EP | 0237365 A1 | 9/1987 |
| EP | 0308705 A2 | 3/1989 |
| EP | 0578833 A1 | 1/1994 |
| EP | 0649044 A1 | 4/1995 |
| EP | 1647854 A1 | 4/2006 |
| EP | 1727393 A1 | 11/2006 |
| EP | 1916561 A2 | 4/2008 |
| EP | 2233964 A1 | 9/2010 |
| GB | 2011640 A | 7/1979 |
| GB | 1563929 A | 4/1980 |
| GB | 2169417 A | 7/1986 |
| GB | 2170613 A | 8/1986 |
| JP | S5576323 A | 6/1980 |
| JP | S61156227 A | 7/1986 |
| JP | S61177429 A | 8/1986 |
| JP | H01237610 A | 9/1989 |
| JP | H05100201 A | 4/1993 |
| JP | H09294654 A | 11/1997 |
| JP | H11352445 A | 12/1999 |
| JP | 2008083299 A | 4/2008 |
| WO | 9201417 A1 | 2/1992 |
| WO | 9827863 A1 | 7/1998 |
| WO | 9901063 A1 | 1/1999 |
| WO | 9921400 A1 | 4/1999 |
| WO | 9927334 A1 | 6/1999 |
| WO | 9941624 A1 | 8/1999 |
| WO | 0102895 A1 | 1/2001 |
| WO | 0135159 A1 | 5/2001 |
| WO | 0175510 A1 | 10/2001 |
| WO | 03050472 A1 | 6/2003 |
| WO | 03068059 A2 | 8/2003 |
| WO | 2004008189 A1 | 1/2004 |
| WO | 2004015481 A1 | 2/2004 |
| WO | 2004028203 A2 | 4/2004 |
| WO | 2004034095 A2 | 4/2004 |
| WO | 2004072687 A2 | 8/2004 |
| WO | 2005016057 A1 | 2/2005 |
| WO | 2006086155 A2 | 8/2006 |
| WO | 2006123596 A1 | 11/2006 |
| WO | 2006126881 A2 | 11/2006 |
| WO | 2007062601 A1 | 6/2007 |
| WO | 2007142520 A1 | 12/2007 |
| WO | 2007142602 A1 | 12/2007 |
| WO | 2008002388 A2 | 1/2008 |
| WO | 2008024071 A1 | 2/2008 |
| WO | 2008045283 A2 | 4/2008 |
| WO | 2008046858 A1 | 4/2008 |
| WO | 2008051520 A2 | 5/2008 |
| WO | 2008115251 A1 | 9/2008 |
| WO | 2009081542 A1 | 7/2009 |
| WO | 2009098719 A1 | 8/2009 |
| WO | 2009109749 A1 | 9/2009 |
| WO | 2009125184 A2 | 10/2009 |
| WO | 2009126946 A1 | 10/2009 |
| WO | 2009136667 A1 | 11/2009 |
| WO | 2010062504 A2 | 6/2010 |
| WO | 2010080999 A1 | 7/2010 |
| WO | 2011119601 A1 | 9/2011 |
| WO | 2012068527 A2 | 5/2012 |
| WO | 2014184137 A1 | 11/2014 |

OTHER PUBLICATIONS

Bradley, Arthur; Profile: Larry N. Thibos, PhD., and Donald T. Miller, PhD.; Indian Journal of Optometry; Spring 1999; vol. 2, No. 1.

Davis, Robert A.; Computer Vision Syndrome—The Eyestrain Epidemic; Review of Optometry, Sep. 15, 1997.

Kowel, Stephen T., et al; Focusing by electical modulation of refraction in a liquid crystal cell; Applied Optics; Jan. 15, 1984; vol. 23, No. 2.

Lazarus, Stuart M.; The Use of Yoked Base-Up and Base-In Prism for Reducing Eye Strain at the Computer; Journal of the American Optometric Association, Apr. 1996.

Liquid Lenses Eye Commercial Breakthrough; Opto & Laser Europe, Nov. 2003.

Miller, Donald T., et al.; Requirements for Segmented Spatial Light Modulators for Diffraction-Limited Imaging Through Aberrated Eyes; Adaptive Optics Conference; Jul. 1999; Durham, UK.

Naumov, A.F.; Control Optimizatin of Spherical Modal Liquid Crystal Lenses; Optics Express, Apr. 26, 1999; vol. 4, No. 9; Optical Society of America.

Naumov, A.F.; Liquid Crystal Adaptive Lenses with Modal Control; Optics Letters, Jul. 1, 1998, vol. 23, No. 13; Optical Society of America.

Thibos, Larry N., et al.; Electronic Spectacles for the 21st Century, Indian Journal of Optometry, Spring 1999; vol. 2, No. 1.

Thibos, Larry N., et al.; Use of Liquid-Crystal Adaptive-Optics to Alter the Refractive State of the Eye; Optometry and Vision Science; Jul. 1997; vol. 74, No. 7; American Academy of Optometry.

Thibos, Larry N., et al.; Vision through a liquid-crystal spatial light modulator; Adaptive Optics Conference; Jul. 1999; Durham, UK.

U.S. Appl. No. 60/796,876, filed May 3, 2006.
U.S. Appl. No. 60/854,677, filed Oct. 27, 2006.
U.S. Appl. No. 60/854,697, filed Oct. 27, 2006.
U.S. Appl. No. 61/326,703, filed Apr. 22, 2010.
U.S. Appl. No. 61/358,447, filed Jun. 25, 2010.
U.S. Appl. No. 61/361,110, filed Jul. 2, 2010.
U.S. Appl. No. 61/362,877, filed Jul. 9, 2010.
U.S. Appl. No. 61/366,746, filed Jul. 22, 2010.
U.S. Appl. No. 61/376,719, filed Aug. 25, 2010.
U.S. Appl. No. 61/382,963, filed Sep. 15, 2010.
U.S. Appl. No. 61/415,391, filed Nov. 19, 2010.
U.S. Appl. No. 61/441,817, filed Feb. 11, 2011.
U.S. Appl. No. 61/481,353, filed May 2, 2011.

"Hearing Mojo: Varibel Hearing-Aid Glasses Integrate Eight Directional Microphones," Feb. 27, 2009, pp. 1-4, URL—http://hearingmojo.com/blog-mt/blog-mt/2006/04/varibel_hearingaid_glasses_dou.html.

Donald T. Miller, Xin Hong, and Larry N. Thibos, "Requirements for segmented spatial light modulators for diffraction-limited imaging through aberrated eyes," G.D. Love, ed. Proceedings of the 2nd International Workshop on Adaptive Optics for Industry and Medecine, World Scientific, Singapore, 63-68 (Jul. 1999).

European Search Report in related EP07852880.9 application dated Feb. 9, 2010. 7 pages.

Eyecare Business, Oct. 1997. 76 pages.

International Preliminary Report on Patentability and Written Opinion of the International Searching Authority directed to related International Patent Application No. PCT/US2008/058056, dated Nov. 10, 2009; 6 pages.

International Preliminary Report on Patentability and Written Opinion of the International Searching Authority directed to related International Patent Application No. PCT/US2010/020498, dated Jul. 12, 2011; 9 pages.

(56) References Cited

OTHER PUBLICATIONS

International Preliminary Report on Patentability and Written Opinion of the International Searching Authority directed to related International Patent Application No. PCT/US2011/042882, dated Jan. 8, 2013; 11 pages.
International Preliminary Report on Patentability and Written Opinion of the International Searching Authority directed to related International Patent Application No. PCT/US2011/042883, dated Jan. 8, 2013; 9 pages.
International Preliminary Report on Patentability and Written Opinion of the International Searching Authority directed to related International Patent Application No. PCT/US2011/043591, dated Jan. 15, 2013; 10 pages.
International Preliminary Report on Patentability and Written Opinion of the International Searching Authority directed to related International Patent Application No. PCT/US2011/061495, dated May 21, 2013; 8 pages.
International Preliminary Report on Patentability and Written Opinion of the International Searching Authority directed to related International Patent Application No. PCT/US2011/061505, dated May 21, 2013; 14 pages.
International Search Report and Written Opinion corresponding to the PCT/US2011/042048 application dated Apr. 12, 2013. 18 pages.
International Search Report and Written Opinion directed to related International Patent Application No. PCT/US2011/043591, dated Feb. 3, 2012; 16 pages.
International Search Report and Written Opinion in International Patent Application No. PCT/US2011/029419 dated Jun. 28, 2011. 13 pages.
International Search Report and Written Opinion of the International Searching Authority directed to related International Patent Application No. PCT/US2008/058056, dated Jul. 17, 2008; 7 pages.
International Search Report directed to related International Patent Application No. PCT/US2010/020498, dated Jun. 25, 2010; 5 pages.
International Search Report directed to related International Patent Application No. PCT/US2011/042882, dated Feb. 15, 2012; 5 pages.
International Search Report directed to related International Patent Application No. PCT/US2011/042883, dated Feb. 7, 2012; 6 pages.
International Search Report directed to related International Patent Application No. PCT/US2011/061495, dated Feb. 29, 2012; 13 pages.
International Search Report directed to related International Patent Application No. PCT/US2011/061505, dated May 25, 2012; 6 pages.
International Search Report directed to related International Patent Application No. PCT/US2012/051202, dated Jan. 15, 2013; 4 pages.
Partial International Search Report in corresponding. PCT/US2010/020498 application. undated. 3 pages.

\* cited by examiner

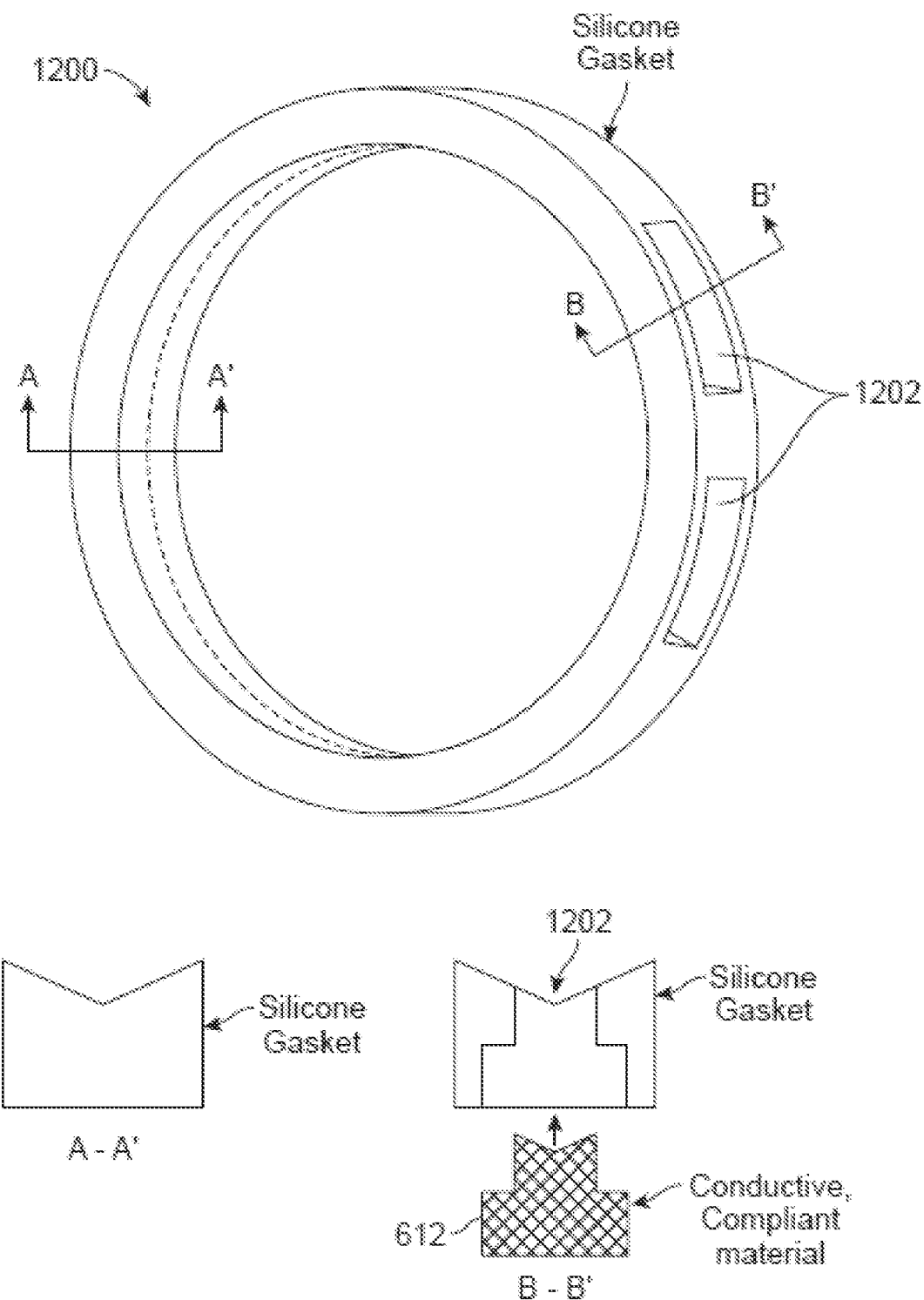
FIG. 12-A

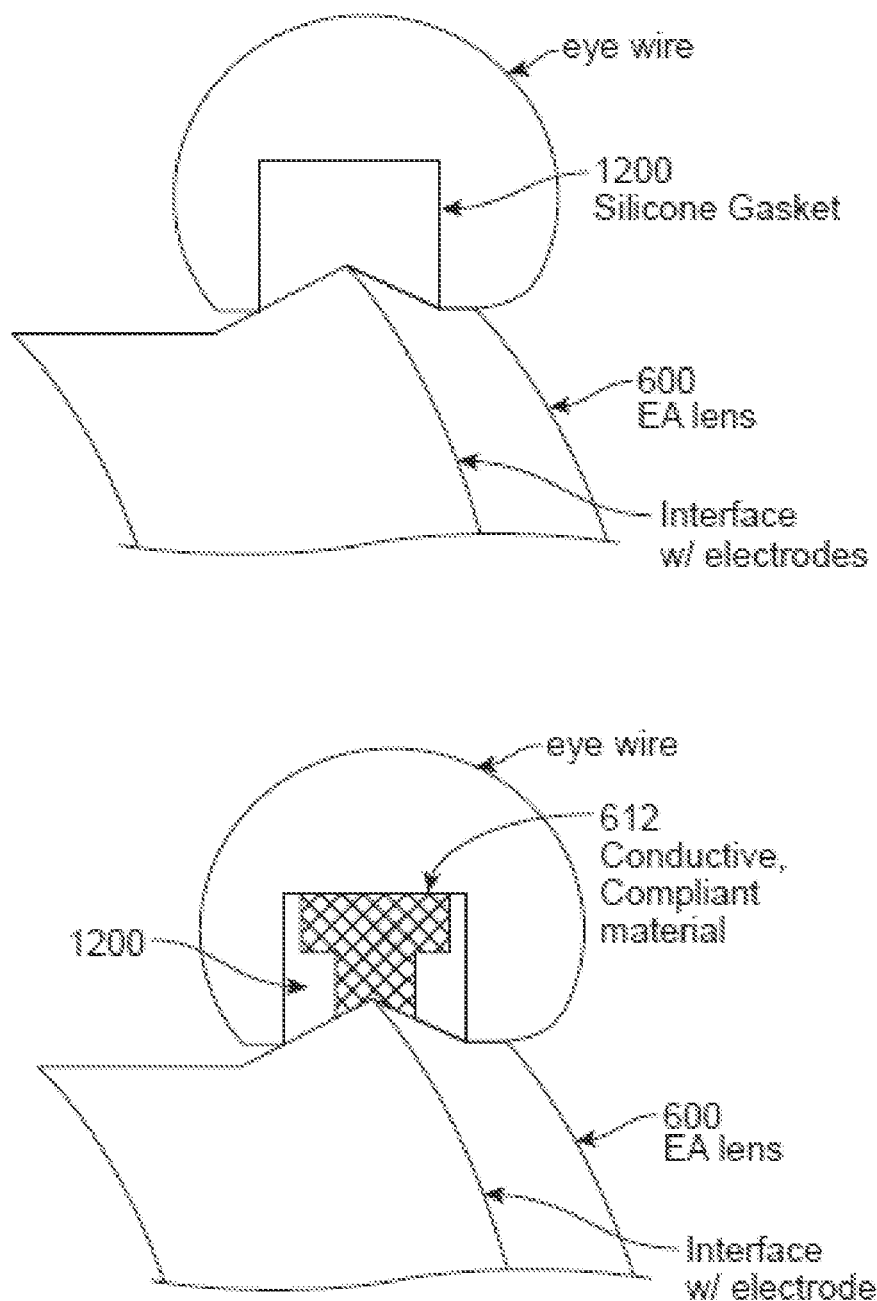
FIG. 12-B

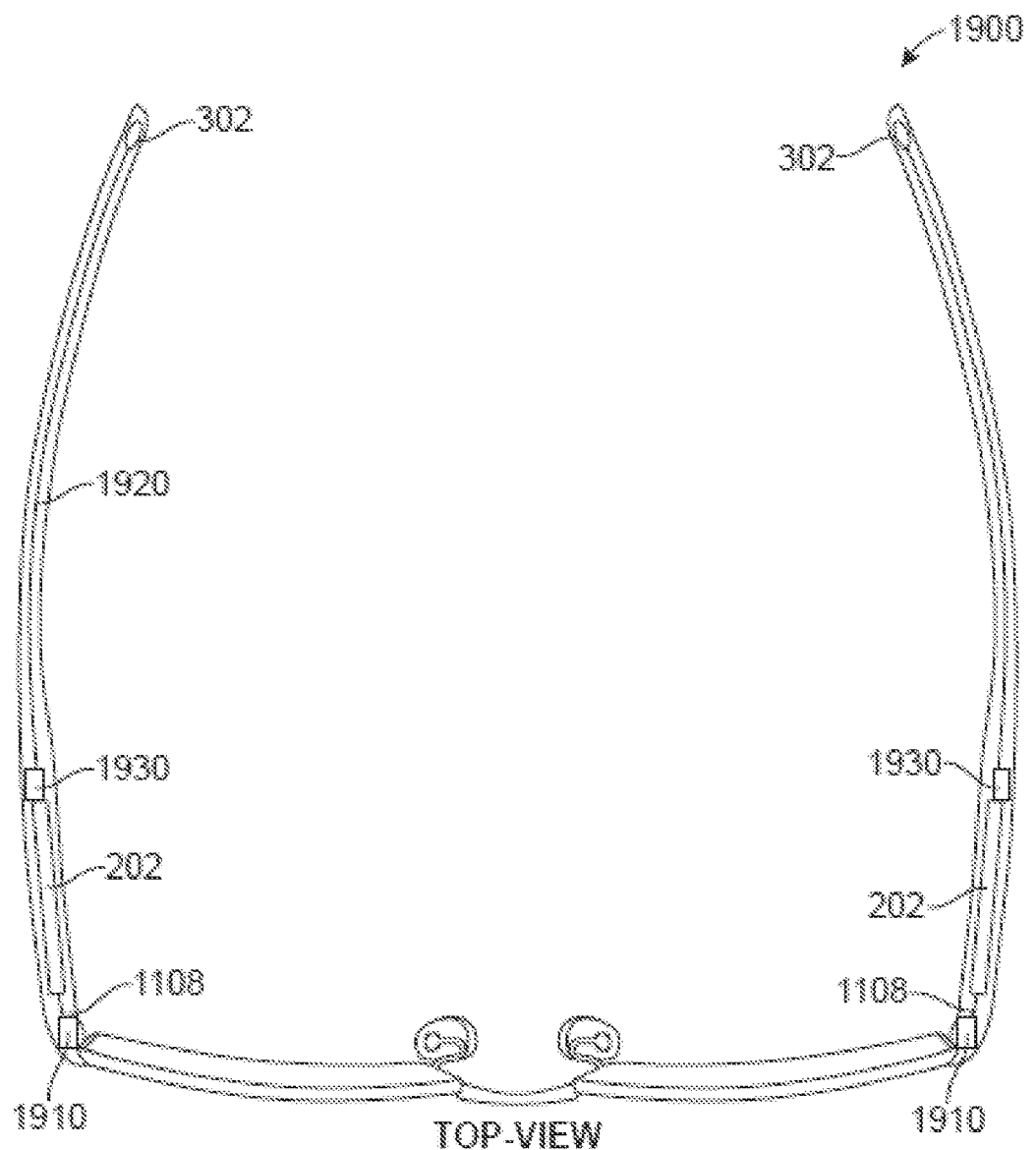
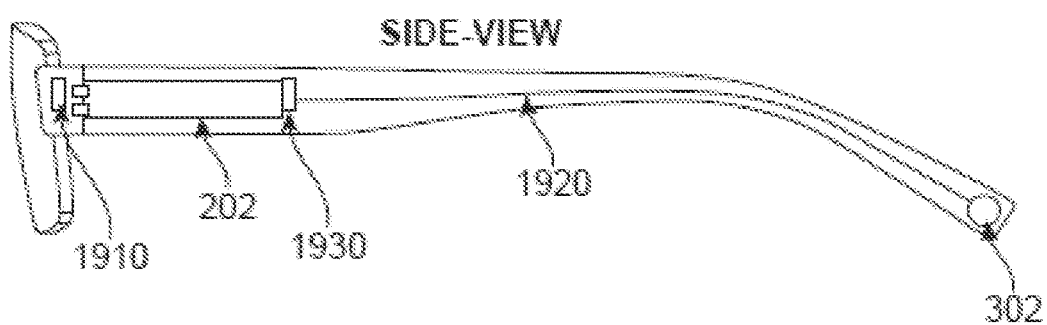
FIG. 18

HINGE FOR ELECTRONIC SPECTACLES

CROSS-REFERENCE TO RELATED APPLICATIONS

The present application is a continuation of and incorporates by reference in its entirety U.S. patent application Ser. No. 13/890,809, filed May 9, 2013, which is a continuation-in-part of U.S. patent application Ser. No. 13/587,645, filed Aug. 16, 2012, which claims priority to and incorporates by the reference in the entirety each of the following provisional patent applications: U.S. Prov. Pat App. No. 61/524,567, filed Aug. 17, 2011; U.S. Prov. Pat. App. No. 61/537,205, filed Sep. 21, 2011; and U.S. Prov. Pat. App. No. 61/563,937, filed Nov. 28, 2011 and which is also a continuation-in-part of U.S. patent application Ser. No. 13/372,240, filed Feb. 13, 2012, which in turn claims priority to U.S. Prov. Pat. App. No. 61/441,817, filed Feb. 11, 2011.

U.S. patent application Ser. No. 13/890,809 is also a continuation-in-part of and incorporates by the reference in the entirety of U.S. patent application Ser. No. 13/726,267, filed Dec. 24, 2012, which is a continuation of U.S. patent application Ser. No. 12/834,526, filed Jul. 12, 2010, and entitled "Electronic Eyeglass Frame," which in turn is a continuation of U.S. patent application Ser. No. 12/054,299 filed Mar. 24, 2008, and entitled "Electronic Eyeglass Frame," which in turn claims the benefit of each of the following provisional patent applications: U.S. Prov. Pat. App. No. 60/978,517, filed Oct. 9, 2007; U.S. Prov. Pat. App. No. 60/929,991, filed Jul. 20, 2007; U.S. Prov. Pat. App. No. 60/929,419, filed Jun. 26, 2007; and U.S. Prov. Pat. App. No. 60/924,225, filed May 4, 2007.

U.S. patent application Ser. No. 13/890,809 is a continuation-in-part of U.S. patent application Ser. No. 13/372,240, filed Feb. 13, 2012, which in turn claims priority to U.S. Prov. Pat. App. No. 61/441,817, filed Feb. 11, 2011.

U.S. patent application Ser. No. 13/890,809 is a continuation-in-part of U.S. patent application Ser. No. 13/169,996, filed Jun. 27, 2011, which is a continuation-in-part of PCT/US2011/029419, filed Mar. 22, 2011, and which also claims priority to and incorporates by the reference in the entirety each of the following provisional patent applications: U.S. Prov. Pat App. No. 61/382,963, filed Sep. 15, 2010; U.S. Prov. Pat App. No. 61/366,746, filed Jul. 22, 2010; and U.S. Prov. Pat App. No. 61/358,447, filed Jun. 25, 2010. PCT/US2011/029419, filed Mar. 22, 2011, is a continuation of U.S. application Ser. No. 13/050,974, filed Mar. 18, 2011, which in turn claims benefit of U.S. Prov. Pat. App. No. 61/382,963, filed Sep. 15, 2010; U.S. Prov. Pat. App. No. 61/366,746, filed Jul. 22, 2010; U.S. Prov. Pat. App. No. 61/326,703, filed Apr. 22, 2010; and U.S. Prov. Pat. App. No. 61/317,100, filed Mar. 24, 2010.

U.S. patent application Ser. No. 13/890,809 is a continuation-in-part of U.S. patent application Ser. No. 12/834,526, filed Jul. 12, 2010, which in turn is a continuation of U.S. patent application Ser. No. 12/054,299 filed Mar. 24, 2008, which in turn claims priority to U.S. Prov. Pat. App. No. 60/978,517, filed Oct. 9, 2007; U.S. Prov. Pat. App. No. 60/929,991, filed Jul. 20, 2007; U.S. Prov. Pat. App. No. 60/929,419, filed Jun. 26, 2007; and U.S. Prov. Pat. App. No. 60/924,225, filed May 4, 2007.

U.S. patent application Ser. No. 13/890,809 is a continuation-in-part of U.S. patent application Ser. No. 13/298,997, filed Nov. 17, 2011, which is a continuation-in-part of U.S. application Ser. No. 13/179,219, filed Jul. 8, 2011, which in turn claims priority to U.S. Prov. Pat. App. No. 61/481,353, filed May 2, 2011, and to U.S. Prov. Pat. App. No. 61/362,877, filed Jul. 9, 2010. U.S. application Ser. No. 13/298,997 is also a continuation-in-part of U.S. application Ser. No. 13/175,633, filed Jul. 1, 2011, and of U.S. application Ser. No. 13/175,634, filed Jul. 1, 2011, each of which claims priority to U.S. Prov. Pat. App. No. 61/415,391, filed Nov. 19, 2010; U.S. Prov. Pat. App. No. 61/376,719, filed Aug. 25, 2010; and U.S. Prov. Pat. App. No. 61/361,110, filed Jul. 2, 2010.

U.S. patent application Ser. No. 13/890,809 is a continuation-in-part of U.S. patent application Ser. No. 13/298,992, filed Nov. 17, 2011, which in is a continuation-in-part of each of the following patent applications: U.S. patent application Ser. No. 13/175,633, filed Jul. 1, 2011 and U.S. patent application Ser. No. 13/175,634, filed Jul. 1, 2011, each of which in turn claims benefit of U.S. Prov. Pat. App. No. 61/415,391, filed Nov. 19, 2010; U.S. Prov. Pat. App. No. 61/376,719, filed Aug. 25, 2010; and U.S. Prov. Pat. App. No. 61/361,110, filed Jul. 2, 2010. U.S. patent application Ser. No. 13/298,992 is also a continuation-in-part of U.S. application Ser. No. 13/179,219, filed Jul. 8, 2011, which in turn claims priority to U.S. Prov. Pat. App. No. 61/481,353, filed May 2, 2011, and to U.S. Prov. Pat. App. No. 61/362,877, filed Jul. 9, 2010.

U.S. patent application Ser. No. 13/890,809 is a continuation-in-part of U.S. patent application Ser. No. 13/866,575, filed Apr. 19, 2013, which claims the priority benefit of U.S. Prov. Pat. App. No. 61/638,290, filed Apr. 25, 2012.

BACKGROUND

The present subject matter relates to various types of eyewear including electronic functional members, including, for example, electronic focusing eyeglasses, electro-active eyeglasses, electronic eyewear providing 3D capabilities, etc.

Unfortunately, it has been found that in some environments, particularly those having high humidity or causing the wearer to sweat, commercially available electronic eyewear and frames may suffer from shorting of electronic connections and thus impede or cause the electronic application used with the eyewear to fail.

Thus there is a need for a solution to allow for electronic eyewear and frames to be even more robust in all environments including those whereby there is an abundance of moisture present, one whereby there are fewer electrical contact points exposed to the environment, and/or one that involved fewer moving and/or open and shut electrical connections.

SUMMARY

The technology includes eyewear having an optical functional member, an electronics module, and at least one sealed conductive element. The electronics module can include electronics for controlling the optical functional member. The sealed electrical connective element connects the electronics of the electronics module to the optical functional member. The optical functional member can include an electrical connector, and the connective element can directly connect the electronics of a sealed electronics module to the electrical connector of the optical functional member.

The present subject matter may be applied, by way of example only, in and/or with electronic focusing eyeglasses, electro-active eyeglasses, fluid lenses being activated by way of an electronic actuator, mechanical or membrane lenses being activated by way of electronics, electro-chromic lenses, electronic fast tint changing liquid crystal lenses, lenses whose tint can be altered electronically, lenses that by way of an electrical charge can resist or reduce the attraction of dust particles, lenses or eyeglass frames housing or having an electronic display affixed thereto, electronic eyewear providing virtual reality, electronic eyewear providing 3D capabilities, electronic eyewear providing gaming, and electronic eyewear providing augmented reality.

In some embodiments, the eyewear can include an intermediate electrical contact. In those embodiments, the optical functional member can include an electrical connector, and the connective element can connects the electronics of the electronics module to the electrical connector(s) of the optical functional member through the intermediate electrical contact. The intermediate electrical contact can be a plug-and-receptacle electrical contact. In some embodiments, the intermediate electrical contact is located at one of: a rim of the eyewear, the rear 1/3 of the temple, the middle of the temple, the forward 1/3 of the temple, the rim lock or hinge, of the eyewear, a surface of the optical functional member, a frame front of the eyewear, an electronic display, an electronic controller, and between the rim and the lens of the eyewear.

In some embodiments, the eyewear can include a temple and a rimlock. In those embodiments, the electronics module can be located in the temple, and the connective element can be routed from the electronics module through the rimlock to the optical functional member. In some embodiments, the rimlock includes an upper rimlock and a lower rimlock, and the connective element is routed between the upper rimlock and the lower rimlock. The rimlock can include upper rimlock and a lower rimlock, and the connective element can form a layer between the upper rimlock and the lower rimlock. The layer can be insulating. In some embodiments, the connective element can be a conductive compressible member that can be conductive rubber. In some embodiments, the connective element comprises a multi-conductor cable.

The technology includes an eyewear frame that includes an electronics module and at least one conductive element. The electronics module includes electronics for controlling an optical functional member. The sealed electrical connective element(s) can connect the electronics of the electronics module at a first end of the connective element, and can connect to an optical functional element at a second end of the connective element. The sealed electrical connective element can connect one electrical module to another electrical module or to a plurality of different electrical modules. In some embodiments, the optical functional member includes at least one electrical connector, and the connective element can directly connect the electronics of a sealed electronics module to the electrical connector of the optical functional member.

In some embodiments, the frame includes at least one intermediate electrical contact, and the optical functional member comprises at least one electrical connector. In such embodiments, the connective element can connect the electronics of the electronics module to the electrical connector of the optical functional member through the intermediate electrical contact. In some such embodiments, the intermediate electrical contact is a plug-and-receptacle.

The intermediate electrical contact is located at one of: a rim of the eyewear, the rear 1/3 of the temple, the middle of the temple, the forward 1/3 of the temple, the rim lock or hinge, of the eyewear a surface of the optical functional member, a frame front of the eyewear, an electronic display, an electronic controller, and between the rim and the lens of the eyewear.

In some embodiments, the eyewear frame can include a temple and a rimlock. In such embodiments the electronics module can be located in the temple, and the connective element can be muted from the electronics module through the rimlock to the optical functional member. In some such embodiments, the rimlock can include an upper rimlock and a lower rimlock, and the connective element can be routed between the upper rimlock and the lower rimlock. In some such embodiments, the rimlock can include an upper rimlock and a lower rimlock, and the connective element can form a layer between the upper rimlock and the lower rimlock. The layer can be an electrically insulating layer. The connective element can be a conductive compressible member, which can be conductive rubber. The connective element can be a multi-conductor cable.

The technology includes eyewear including at least one electrical conductor and at least one non-electrically-conductive grease coating a portion of the electrical conductor. In such embodiments, the grease can be silicone grease.

The disclosed technology includes methods of assembling eyewear. Some such methods include coating a portion of at least one electrical conductor of the eyewear with non-electrically-conductive grease, which can be silicone grease in some such methods, the grease can be applied between surfaces of a conducting portion of a rimlock of the eyewear and an insulating layer of the eyewear.

The disclosed technology includes additional methods of assembling eyewear. Such methods include affixing a portion of eyewire to a rimlock to form a first stage assembly, wherein each surface point of the first stage assembly comprises an single electrical node; bisecting the first stage assembly, forming an upper rimlock with upper eyewire and a lower rimlock with lower eyewire; and coating the bisected first stage assembly with an electrically-insulating coating. Some such methods include removing the coating from at least one area of electrical connection.

The technology also includes eyewear including a lens comprising electro-active material, and in some cases a gasket. The electro-active lens, can be characterized by a lens edge, and can include at least one electrical contact on the lens edge. The gasket can be configured to fit around the lens edge to be substantially resistant to the ingress of liquid between the gasket and the lens edge. The gasket can have formed therein an aperture to corresponding to the electrical contact. In such embodiments, the electrical contact surface can be a conductive compliant material fitted to the aperture to substantially resist the ingress of liquid between the gasket and the electrical contact. In other embodiments the connection from the connector to the lens or optical functional member can be sealed by way of example only, an adhesive, caulk, or another material that forms a water resistant barrier.

In some embodiments, an electrically conductive caulk can be used, which is also moisture resistant and/or moisture proof.

In some embodiments, the technology can include an eyewear temple assembly that includes a temple body and an electronics module. The temple body can form a cavity therein, and can be configured to be removeably attachable to eyewear. The electronics module can be housed in the cavity, and can be operable to perform a function other than control of electro-active optics. In such embodiments, the temple assembly is configured to maintain the electronics module at least one of moisture resistant, salt resistant, and moisture proof.

In some such embodiments, the electronics module includes at least one of: a transmitter operable to transmit a signal in response a user input; a sensor operable to sense at least one of: the environment of the electronics module, and a condition of the electronics module; and an output module operable to output at least one of: an acoustic signal, a visible light signal, and a vibration signal. In some such embodiments containing a sensor, the electronics module includes s at least one of a temperature sensor, a position sensor, an electromagnetic radiation sensor, GPS, and a pedometer.

In some embodiments of the temple assembly, the cavity can be formed with an opening at a surface of the temple body, and a cover of the eyewear temple can seal the opening, in a fashion that electronics module is maintained as at least one of moisture resistant, salt resistant, and moisture proof at least in part by the cover. In some such embodiments, the cavity can be formed with only one opening, and the one opening is at a front surface of the temple body. In other such embodiments, the cavity can be formed with only one opening, and the one opening is at a wearer-facing surface of the temple body. In some embodiments of the temple assembly, the electronics module can be is releasably secured in the cavity, and the electronics module itself can be at least one of moisture resistant, salt resistant, and moisture proof.

In some embodiments, a sealed electronic module may house one or more of an electronic sensor, manual controls and/or automatic controls. In embodiments, eyewear may be configured to be placed in one or more of an automatic mode, a manual on mode, and/or a manual off mode. In embodiments, one electronic module may be provided to electrically power a pair of lenses, or two such electronic modules can be provided. In embodiments, the electronic modules may be sealed such that they are water resistant or water proof.

Aspects of the invention disclosed herein may be used to address pressing needs of making electronic eyewear more moisture resistant and more robust. This may allow more reliable performance from the electronic eyewear and, thus, happier users. Electronic eyewear, or electronic eyeglasses, may be understood as typically including electronic frames that provide an electrical connection to, by way of example only, electronic focusing eyeglasses, electro-active eyeglasses, fluid lenses being activated by way of an electronic actuator, mechanical or membrane lenses being activated by way of electronics, electro-chromic lenses, electronic fast tint changing liquid crystal lenses, lenses whose tint can be altered electronically, lenses that by way of an electrical charge can resist or reduce the attraction of dust particles, lenses or eyeglass frames housing or having an electronic display affixed thereto, electronic eyewear providing virtual reality, electronic eyewear providing 3D capabilities, electronic eyewear providing gaming, and electronic eyewear providing augmented reality.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings:

FIG. 12-A and FIG. 12-B illustrate a gasket of the present technology.

FIG. 18 illustrates electro-active spectacles in accordance with an aspect of the present technology employing plug connections among electrical elements.

DETAILED DESCRIPTION

Figure 1:
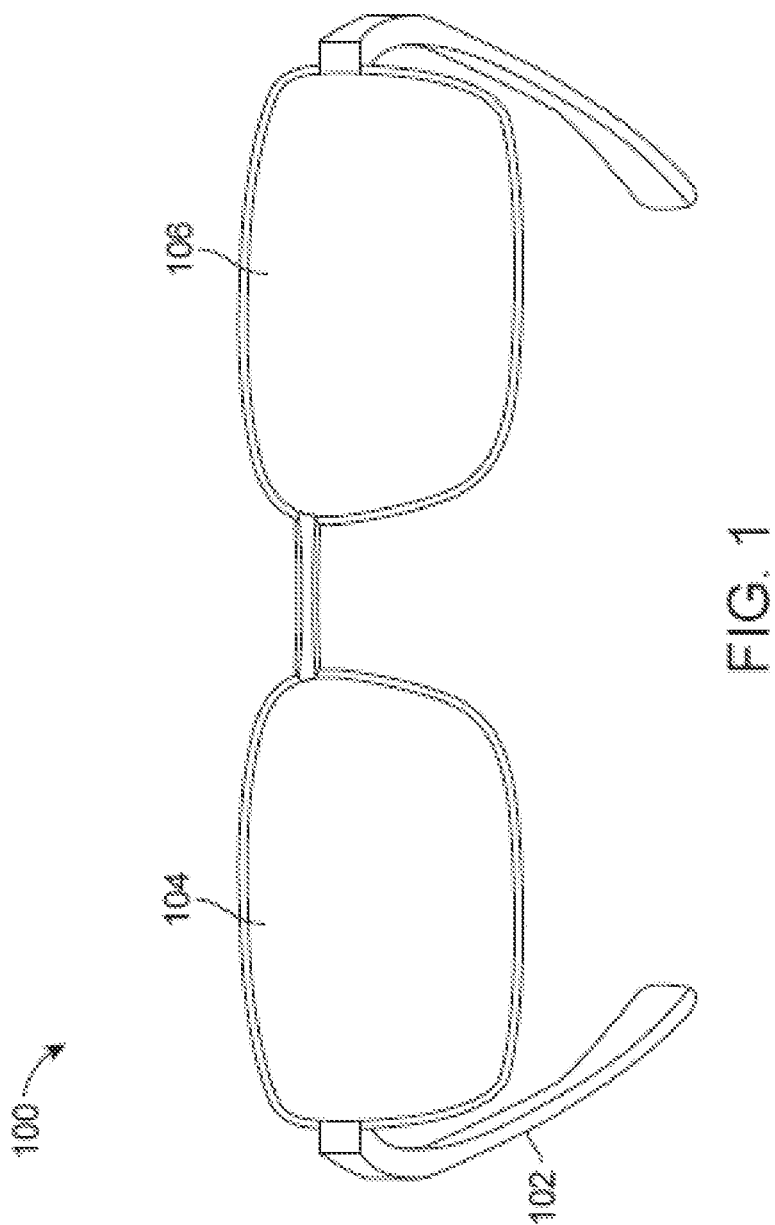
FIG. 1 illustrates electro-active spectacles in accordance with an aspect of the present technology.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a lens" is a reference to one or more lenses and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

While enabling embodiments of the present technology are disclosed in the context of electro-active eyeglasses having at least one electro-active lens as an optical functional member, the technology can find application where the optical functional member is other than an electro-active lens, e.g., in fluid lenses being activated by way of an electronic actuator, mechanical or membrane lenses being activated by way of electronics, electro-chromic lenses, electronic fast tint changing liquid crystal lenses, thermo-chromic lenses, lenses that by way of an electrical charge can resist or reduce the attraction of dust particles, lenses or eyeglass frames housing or having an electronic display affixed thereto, electronic eyewear providing virtual reality, electronic eyewear providing 3-D capabilities, electronic eyewear providing gaming, and electronic eyewear providing augmented reality.

FIG. 1 illustrates electro-active spectacles or eyeglasses 100 in accordance with an aspect of the present technology. The electro-active spectacles 100 shown in FIG. 1 are fully rimmed eyeglasses comprising left and right temples and a frame front (the frame front can comprise left and right eyewires or rims, and a bridge, as will be appreciated by one skilled in the pertinent art). Electro-active spectacles and frames of the present technology can be fully rimmed, partially rimmed, or rimless. The electro-active spectacles 100 can include a frame 102, a first electro-active lens 104, and a second electro-active lens 106. The first and second electro-active lenses 104 and 106 can each be an electro-active lens as described in U.S. patent application Ser. No. 12/408,973 (hereinafter the '973 application), filed Mar. 23, 2009, entitled "Electro-Active Diffractive Lens and Method for Making the Same," which is hereby incorporated by reference in its entirety. In general, the first and second electro-active lenses 104 and 106 can be any lens or optic capable of changing, varying or tuning the optical power they each provide with the application of electricity.

The right temple portion can be considered to be a first temple portion that is positioned adjacent to the first electro-active lens 104. The left temple portion can be considered to be a second temple portion that is positioned adjacent to the second electro-active lens 106. The bridge can be considered to be part of the frame or to be a separate portion of the electro-active spectacles 100 that connects, joins or supports the first and second electro-active lenses 104 and 106. The electro-active spectacles 100 can include one or more power sources for powering the first and second electro-active lenses 104 and 106. As an example, each power source can include one or more batteries (e.g., conventional rechargeable batteries and/or solar batteries). The electro-active spectacles 100 can also include electronics that can govern operation of the electro-active lenses 104 and 106. The electronics can comprise one or more control units (e.g., a control unit matched to each electro-active lens) to determine when to activate and when to deactivate the electro-active lenses 104 and 106. The one or more power sources and the electronics of the electro-active spectacles 100 can be housed or contained within, or on, any portion of the frame 102. The one or more power sources and the one or more control units of the electro-active spectacles 100 can be grouped together or distributed or dispersed in any manner within, throughout, or on the frame 102.

The operation of the electro-active lenses 104 and 106 can be synchronized. That is, the one or more control units housed in the frame 102 can coordinate the activation and deactivation of the electro-active lenses 104 and 106 such that the electro-active lenses 104 and 106 are activated or deactivated at substantially the same time.

The one or more control units housed in the frame 102 can automatically operate (e.g., activate and deactivate) the electro-active lenses 104 and 106. As an example, the electro-active lenses 104 and 106 can be activated or deactivated based on a user's head tilt as sensed by the one or more control units. The one or more control units can also enable a user to interact with the electro-active lenses 102 and 104. As an example, a user can manually activate or deactivate the electro-active lenses 104 and 106, override automatic operation of the electro-active lenses 104 and 106, place the electro-active spectacles 100 into a standby mode (in which the electro-active lenses 104 and 106 are neither automatically or manually activated or deactivated), or power off the electro-active spectacles 100.

The electronics of the electro-active spectacles 100 can include a processor, memory, a power source (e.g., a battery), a gyroscope, and an accelerometer. As previously mentioned, these components can be grouped together or can be distributed within different portions of the frame 102. As an example, all or a portion of these components can be grouped together to form a self-contained electronic module. The electro-active spectacles 100 can comprise a single electronic module that governs synchronized operation of both the first and second electro-active lenses 104 and 106. Alternatively, operation of the first electro-active lens 104 can be governed by a first electronic module and operation of the second electro-active lens 106 can be governed by a second electronic module. Under this scenario, the first and second electronic modules can communicate using one or modes of electrical connectivity (e.g., wire(s) embedded within a portion of the frame, conductive portion(s) of the frame, conductive metal layer(s) or core(s) encapsulated by non-conductive material, conductive layer(s) of the electro-active lens(es) 104 and 106, optical link(s), wireless radio frequency or magnetic field communication).

Figure 2:
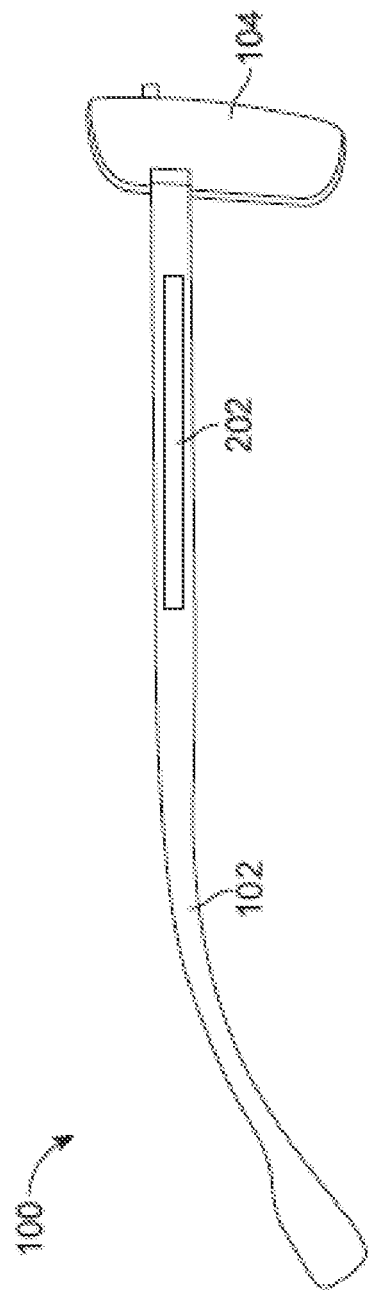
FIG. 2 illustrates a side view of the electro-active spectacles depicted in FIG. 1 in accordance with an aspect of the present technology.

FIG. 2 illustrates a side view of the electro-active spectacles 100 depicted in FIG. 1. As shown in FIG. 2, the electro-active spectacles 100 can comprise an electronic module (or control unit) 202. As described above, the electronic module 202 can include various electronics components. The electronic module 202 can be positioned near the front temple of the frame 102. The electronic module 202 can be positioned within the frame 102 (e.g., in an area or cavity of the frame 102) and can be removable and replaceable. Alternatively, the electronic module can be built into the frame 102 and form a part of the frame 102. The electronic module 202 can be located on an outer portion of a temple of the frame 102 (further from a wearer) or can be located on an inner portion of the temple of the frame 102 (closer to the wearer). The electronic module 202 can be positioned on a left temple or a right temple of the frame 102 (i.e., on either side of the frame 102). The electronic module 202, when inserted into the temple of the frame 102, can be flush with the other portions of the frame 102. All or a portion of the electronic components used to operate the electro-active lens 104, 106 can be contained within the electronic module 202.

The electronic module 202 can also control operation (or at least ensure synchronized operation) of the electro-active lens 104, 106. Electrical connections between the electronic module 202 and one or more of the electro-active lenses 104 and 106 can be routed through the frame 102 and/or the electro-active lenses 104 and 106 as will be described in more detail below. According to an aspect of the present technology, connectivity between the electronic module 202 and one or more of the electro-active lenses 104 and 106 can be accomplished by using a single conductive wire.

In some embodiments of the present technology, a first electrical connection (e.g., comprising one or more conductive links or wires) can be used to provide connectivity between one or more power sources of the electro-active spectacles 100 and one or more electronic modules 202 and a second electrical connection (e.g., comprising one or more conductive links or wires) can be used to provide connectivity between the one or more electronic modules 202 and the one or more electro-active lenses (e.g., the electro-active lenses 104 and 106). For example, a battery positioned within the frame 102 can be coupled to an electronic module 202 also positioned within the frame 102 using a first conductive link. A second, distinct conductive link (e.g., electrically isolated from the first conductive link) can be used to couple the electronic module 202 to the electro-active lenses 104 and 106.

In some embodiments of the present technology, the same electrical connection (e.g., comprising one or more electrical wires) can be used to couple the one or more power sources of the electro-active spectacles 100, the one or more electronic modules 202 and the electro-active lenses 104 and 106 as will be appreciated by one skilled in the pertinent art. This can enable a power source to be positioned on one side of the frame 102 (e.g., in a first temple) and an electronic module 202 to be positioned on the other side of the frame 102 (e.g., in a second temple) while using the same conductive link to simultaneously provide power to the electronic module 202 and controlling signals from the electronic module 202 to the electro-active lenses 104 and 106. As a result, the number of conductive links (e.g., embedded wires) positioned within the frame 102 can be minimized.

Figure 3:
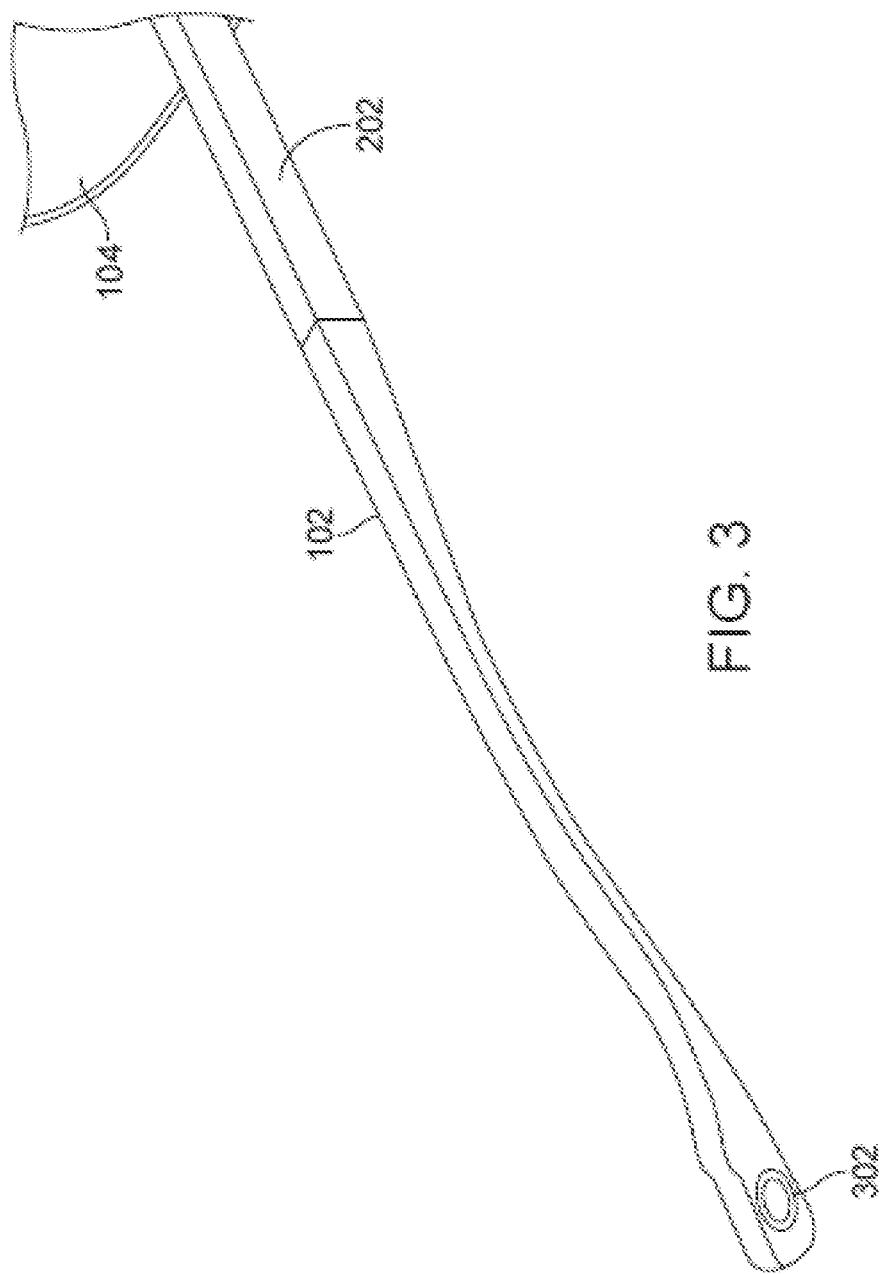
FIG. 3 illustrates an exemplary configuration of electrical components of the electro-active spectacles in accordance with an aspect of the present technology.

FIG. 3 illustrates an exemplary configuration of electrical components of the electro-active spectacles 100. Specifically, FIG. 3 shows a battery 302 located near the end of the frame 102 of the electro-active spectacles 100. A portion of the end of the frame 102 is removed for illustration purposes only. The battery 302 can be a rechargeable battery and can provide power to the electrical components located within the electronic module 202. The battery 302 can provide power to one or more electronic modules of the present technology.

Figure 4:
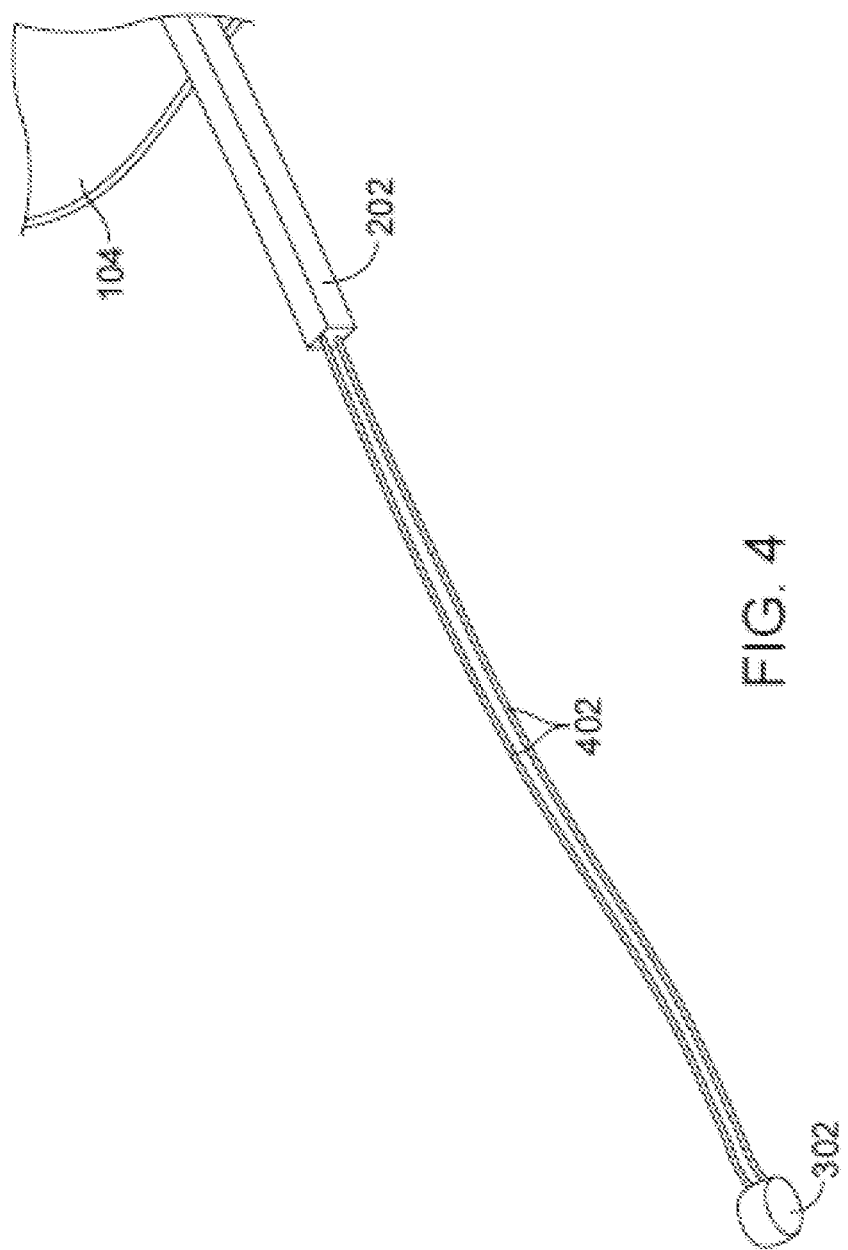
FIG. 4 illustrates an exemplary configuration of electrical connectivity between a battery and an electronic module depicted in FIG. 3 in accordance with an aspect of the present technology.
Figure 5:
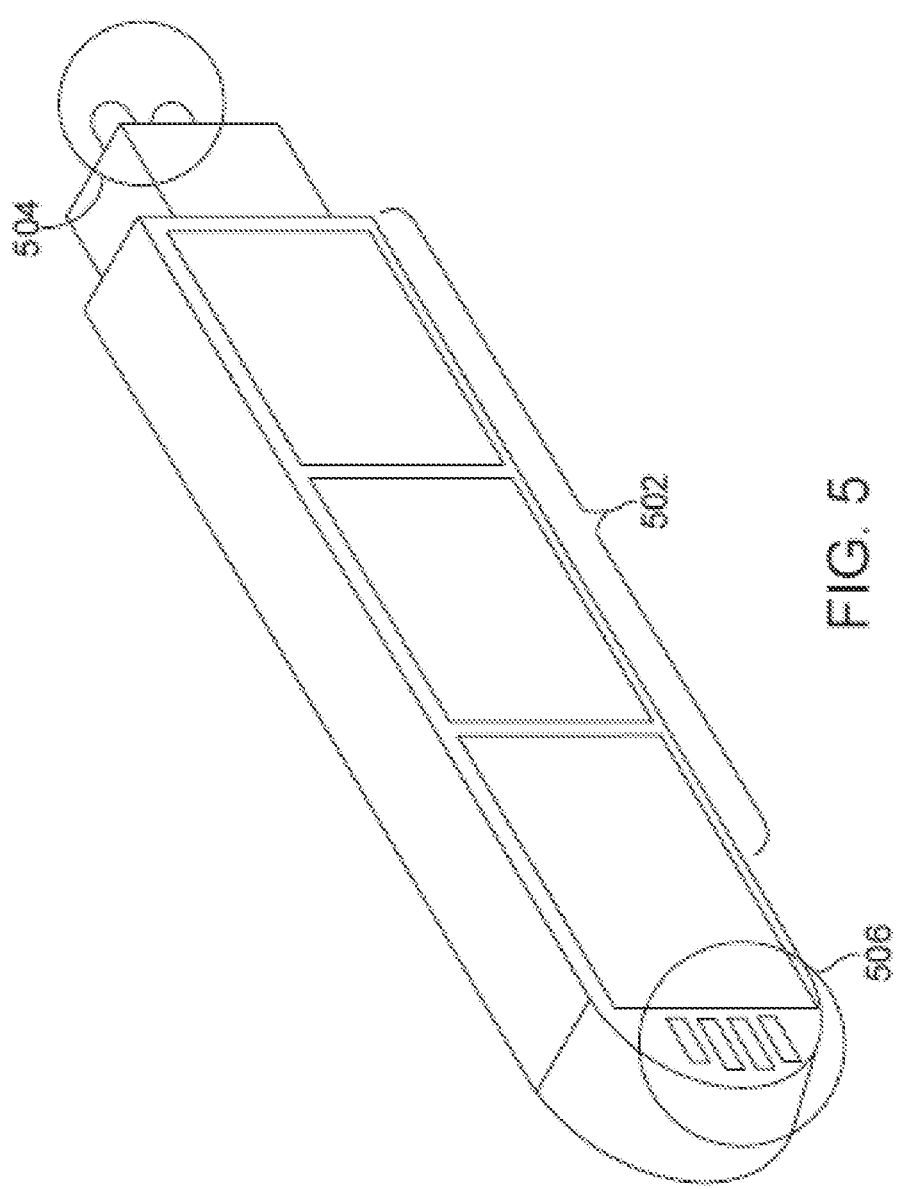
FIG. 5 illustrates an electronic module in accordance with an aspect of the present technology.

FIG. 4 illustrates an exemplary configuration of electrical connectivity between the battery 302 depicted in FIG. 3 and the electronic module 202. A portion of the frame 102 is removed for illustration purposes only. As shown in FIG. 4, conducting wires 402 can couple the battery 302 to the electronic module 202. The conducting wires 402 can be positioned within the frame 102 (e.g., embedded within the frame 102) of the electro-active spectacles 100. Conducting wires 402 are insulated and capable of being heated and bent while retaining conductor and insulator integrity in order to adjust the shape of temple. The conducting wires can be a cable or a flexible cable FIG. 5 illustrates the electronic module 202 in accordance with an aspect of the present technology. The electronic module 202 can contain all or a portion of the electronic components that govern operation of one or more electro-active lenses including a power source (e.g., a rechargeable battery or a solar battery). As shown in FIG. 5, the electronic module 202 can comprise a housing 502, first contacts 504 and second contacts 506. The housing 502 can contain the electrical components of the electronic module 202—e.g., a processor, memory, power source, and/or a gyroscope/accelerometer.

The first contacts 504 can provide electrical connectivity between the electrical components of the housing 502 and other portions of one or more associated electro-active lens (e.g., the first electro-active lens 104). The second contacts 506 can provide electrical connectivity to a memory of the electronic module 506. The second contacts 506 can be used, for example, to program or reprogram the electronic module 202 directly. Additional contacts (not illustrated for simplicity), or the first and/or second contacts 504 and 506, can also provide connectivity to a remote battery (e.g., the battery 302 depicted in FIG. 3 and FIG. 4) or to another electronic module or control unit. Alternative or additional contacts (e.g., an antenna) can allow wireless programming of the electronic module 202.

In general, the electronic module 202 can be positioned anywhere on the frame 102 (e.g., in any portion of the frame 102 having an area or cavity designed to accept insertion of the electronic module 202). The electronic module 202, as shown in FIG. 2, can be located near the front temple of a wide variety of frame types and styles. Specifically, the electronic module 202 can be located within a portion of a frame that is fully rimmed, partially rimmed, or rimless.

The electronic module 202 can be removed and replaced with a new module or can be reprogrammed. As an example, the electronic module 202 can be initially programmed with a first mode of operation or a first prescription for a user. At a later time, the electronic module 202 can be removed and reprogrammed using the second contacts 506 with a second mode of operation or a second prescription for a user.

Figure 6:
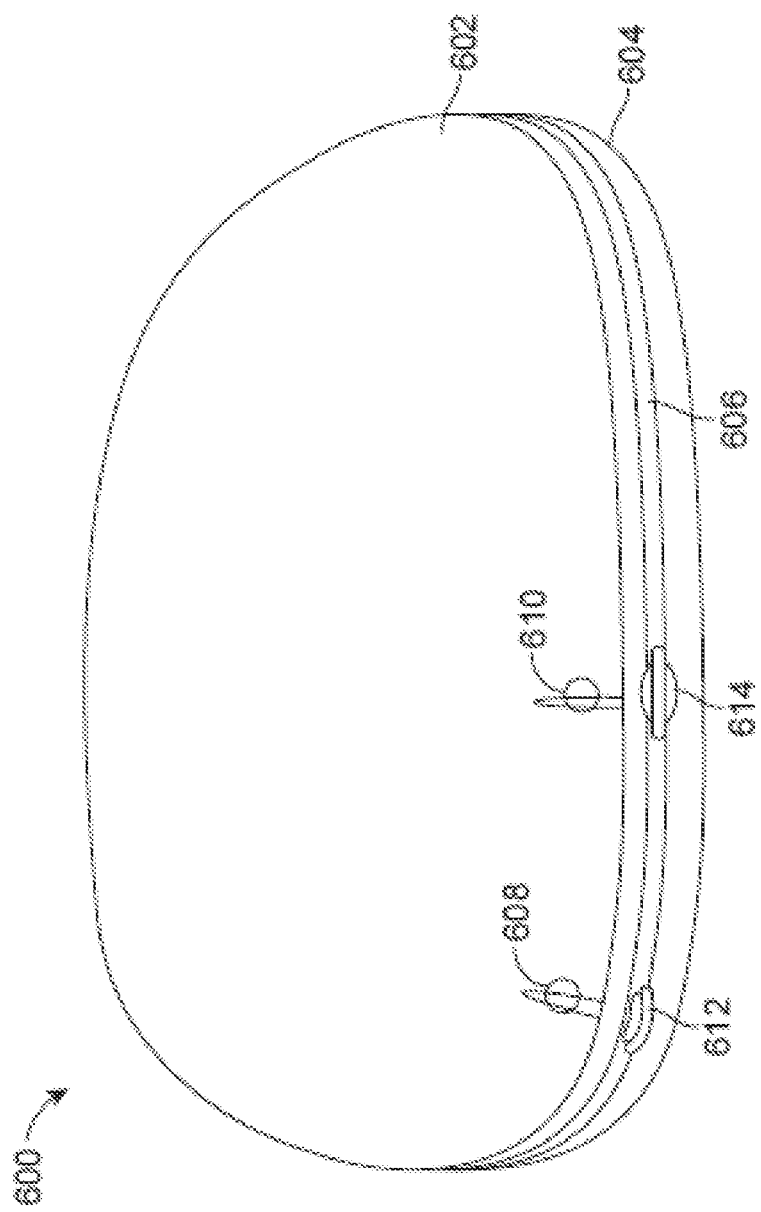
FIG. 6 illustrates an electro-active lens in accordance with an aspect of the present technology.

FIG. 6 illustrates an electro-active lens 600 in accordance with an aspect of the present technology. The electro-active lens 600 can represent one of the electro-active lenses 104 or 106. The electro-active lens 600 is depicted as a finished lens in FIG. 6. That is, the electro-active lens 600 has been edged and grooved to fit into an eyeglass frame.

As shown in FIG. 6, the electro-active lens 600 can comprise a first substrate (e.g., a top substrate) 602 and a second substrate (e.g., a bottom substrate) 604. During an edging process, a groove 606 can be formed (e.g., near or between the interface of the first and second substrates 602 and 604). The groove 606 can be used to position and stabilize the electro-active lens 600 within an eyeglass frame as is done with conventional lenses.

The electro-active lens 600 can comprise a first electrical lead or connector 608 and a second electrical lead or connector 610. The first and second electrical leads 608 and 610 can provide power (e.g., a drive signal or a control signal) to the electro-active region of the electro-active lens 600. In particular, the first and second electrical leads 608 and 610 can link or connect the electro-active region of the electro-active lens 600 to a power source and electronic components that can be housed within an associated eyeglass frame (e.g., the electronic module/control unit 202 depicted in FIG. 5). The first and second electrical leads 608 and 610 can comprise any conductive material including, but not limited to, silver ink. The first and second electrical leads 608 and 610 can be painted, applied or otherwise deposited onto the transparent conductive layers placed on the substrates 602 and 604.

To ensure or improve connectivity, after edging and grooving the electro-active lens 600, a small quantity of conductive material, paint or paste can be placed on top of the first and second electrical leads 608 and 610. Specifically, as shown in FIG. 6, a first conductive material 612 can be placed in the groove 606 on top of the first electrical lead 608 and a second conductive material 614 can be placed in the groove 604 on top of the second electrical lead 610. The first and second conductive materials 612 and 614 can be substantially transparent and can comprise an indium tin oxide (ITO) paste or a paint containing silver particles (e.g., silver ink).

Figure 7:
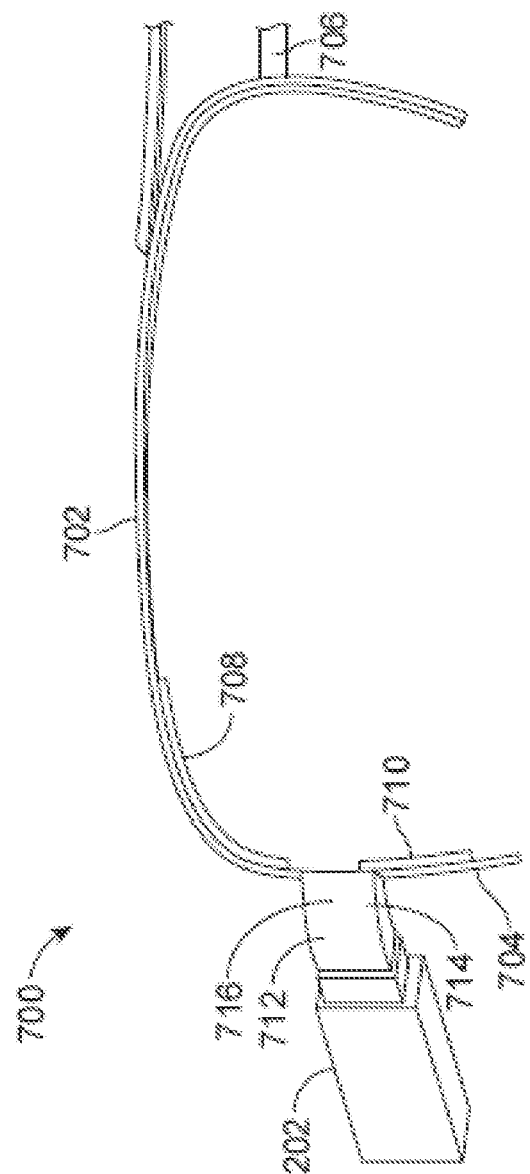
FIG. 7 illustrates a portion of a frame in accordance with an aspect of the present technology.

FIG. 7 illustrates a portion of a frame 700 in accordance with an aspect of the present technology. The frame 700 can provide electrical connectivity between the electro-active lenses (not depicted in FIG. 7 for simplicity) and the electrical components used to operate electro-active lenses.

The frame 700 can include an upper portion of the right eye-wire or rim 702 and a lower portion of the right eye-wire or rim 704. For a fully rimmed frame, the lower portion 704 can extend underneath an electro-active lens to a bridge 706. For a partially-rimmed frame, the lower portion 704 generally does not extend to the bridge 706.

The frame 700 can include an electronic module 202 and an area to accept an electronic module 202. A first conductor 708 can be positioned within a groove of the upper rim portion 702. A second conductor 710 can be positioned within a groove of the lower rim portion 704. The first and second conductors 708 and 710 can comprise flexible, compressible materials. When an electro-active lens, e.g., the electro-active lens 600 depicted in FIG. 6, is positioned within the frame 700, the first and second conductors 708 and 710 can be compressed to fit in the groove of the upper and lower rim portions 708 and 710, respectively, and the groove 606 of the electro-active lens 600. The first conductor 708 can be positioned to make contact with the first conductive material 612. The second conductor 710 can be positioned to make contact with the second conductive material 614.

The frame 700 can include an upper conducting member 712, a lower conducting member 714 and an insulating or isolation member 716. The upper conducting member 712, the lower conducting member 714 and the insulating member 716 can physically couple the temple of the frame 700 to the eye-wire portion (i.e., the upper and lower rim portions 702 and 704).

The upper conducting member 712 can be one link in the electrical connectivity between the electronic module 202 and the first conductor 708. The first conductor 708 can provide connectivity to the first conductive material 612 (and, as a result, connectivity to the first electrical lead 608) depicted in FIG. 6. The lower conducting member can be one link in the connectivity between the electronic module 202 and the second conductor 710. The second conductor 710 can provide connectivity to the second conductive material 614 (and, as a result, connectivity to the second electrical lead 610) depicted in FIG. 6. The insulating member 716 can ensure that the connectivity path between the electronic module 202, the upper conducting member 712 and the first conductor 708 remains insulated or electrically separated from the connectivity path between the electronic module 202, the lower conducting member 714 and the second conductor 710.

Any portion of the upper conducting member 712 and the lower conducting member 714 can provide a conductive link. As an example, the entirety of the upper and lower conducting members 712 and 714 can be conductive (e.g., made of metal and coated with a non-conductive material) or a portion of the upper and lower conducting members 712 and 714 can be conductive (e.g., an internal portion that is encapsulated by non-conductive material).

Figure 8:
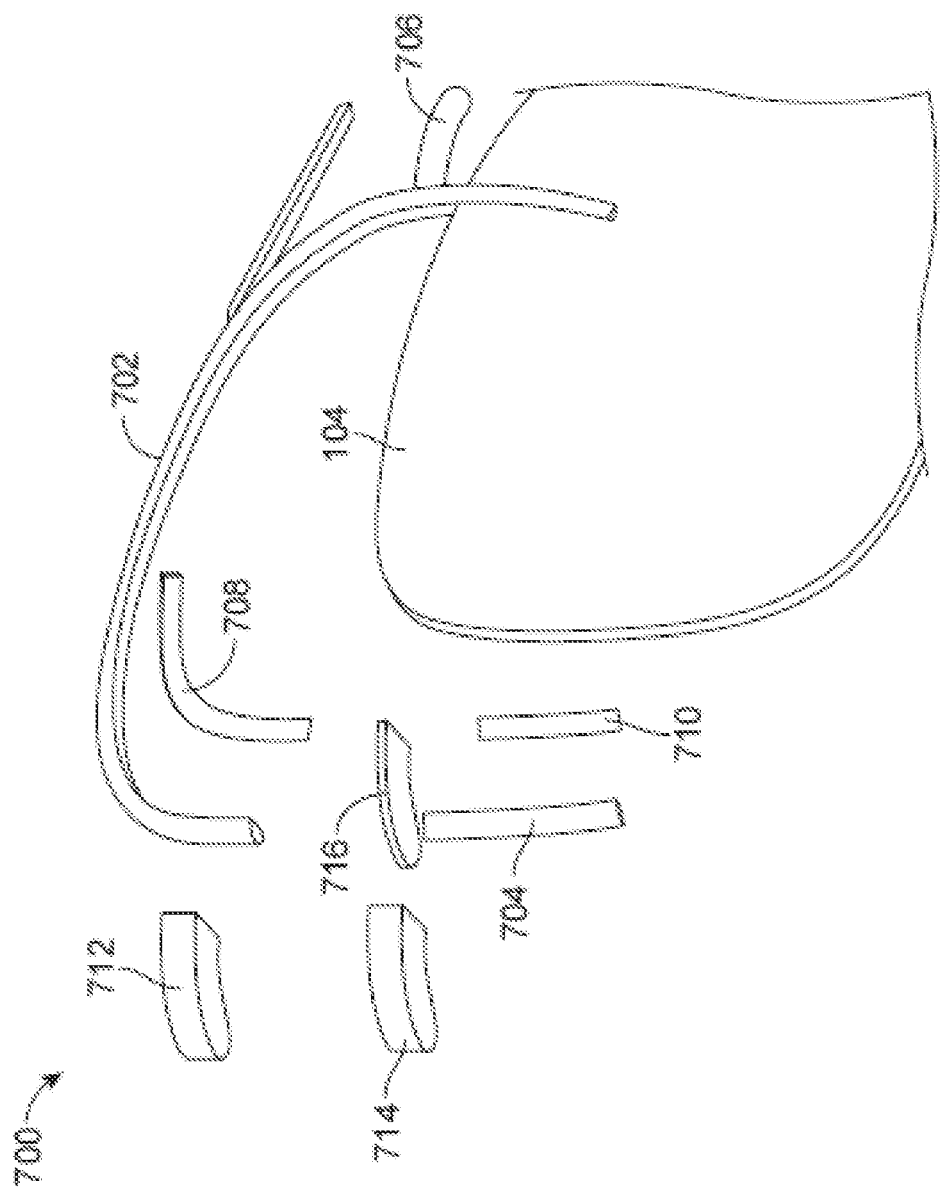
FIG. 8 illustrates an exploded view of the frame depicted in FIG. 7 in accordance with an aspect of the present technology.

FIG. 8 illustrates an exploded view of the frame 700 depicted in FIG. 7. As shown in FIG. 8, the frame 700 can be assembled by connecting the upper conducting member 712, the insulating member 716 and the lower conducting member 714 to the upper rim portion 702 and the lower rim portion 704. The first conductor 708 and the second conductor 710 can then be positioned in the groove of the upper rim portion 702 and the lower rim portion 704, respectively. The first and second conductors 708 and 710 can be positioned in areas where they will make contact with the first conductive material 612 and the second conductive material 614, respectively.

The components illustrated in FIG. 7 and FIG. 8 (namely, the upper conducting member 712, the lower conducting member 714, the insulating member 716, the upper rim portion 702, the lower rim portion 704, the first conductor 708 and the second conductor 710) can be used to form a portion of the frame 700 as a partially-rimmed frame or a fully-rimmed frame and to provide connectivity between an electronic module of the present technology and an electro-active lens of the present technology for each type of frame (and a variety of styles therein).

For a fully-rimmed frame, both the upper rim portion 702 and the lower rim portion 704 can extend from the upper conducting member 712 and the lower conducting member 714, respectively, to the bridge 706. For a partially-rimmed frame, generally only the upper rim portion 702 extends from the upper conducting member 712 to the bridge 706 while the lower rim portion 704 does not extend to the bridge 706.

When the frame 700 is implemented as a fully-rimmed frame or a partially-rimmed, the first conductor 708 can be of any size or length. That is, the first conductor 708 can extend along any portion of the upper rim 702 to make electrical connectivity with a desired lead of the electro-active lens 104. When the frame 700 is implemented as a fully-rimmed frame, the second conductor 710 can similarly be of any size or length to make electrical connectivity with a separate or second desired lead of the electro-active lens 104. However, when the frame 700 is implemented as a partially-rimmed frame, the second conductor 710 will be of the same length or shorter than the lower rim portion 704.

Electro-active eyewear or electronic eyewear may be exposed to moisture and liquids. Such moisture may come from the natural environment (e.g., rain, snow), from the human body in the form of oils and perspiration, and from consumer products such as liquid lens cleaners and cosmetics. The ingress of such materials into and between the electronic components of the eyewear can cause damage, e.g., electrical short circuits. In particular, salt residue, e.g., left over from dried perspiration or exposure to salt water, salt spray, or salt fog, can facilitate even small amounts of moisture to form an unintended conductive path in electro-active eyewear.

For example, a rimlock such as the rimlocks shown in FIG. 7 and FIG. 8 may wick moisture into its internal surfaces. If this moisture is water, then the result may be a temporary electrical short circuit across the rimlock (e.g., between metal components 712 and 714), which can result in a hazy or non-functional lens. When the water dries, then normal operation is typically restored.

If the moisture is perspiration, then over time the accumulation of salts and oils due to repeated exposure can result in permanent electrical shorts and/or make the frame even more susceptible to other forms of moisture. Additionally, if the electrical path includes spring-loaded "pogo" pins, such as described in International Pat. App. No. PCT/US2010/020498, exposure to perspiration may corrode and bind such pins, resulting in an unreliable connection between the module and the rim lock.

Also, if the lens and physically compliant conductive materials are exposed to perspiration, then these materials can break down both physically and chemically. Specifically, the conductive primers and inks that are applied to the lens 104 to establish the electrical edge connections may be susceptible to perspiration and can break down over the course of a few weeks, resulting in a lens with high series resistance and a hazy on-state appearance.

Consider a type of rimlock which is assembled by attaching (e.g., welding, soldering, brazing) a piece of eyewire to one metal rimlock component that combines components 712 and 714 such as shown in FIG. 8). This assembly, forming a single electrical node, is then coated with an electrically-insulating color finish and lastly, the coated assembly is bisected (e.g., sawn, cut) to form the upper and lower eye-wire and rimlock portions. One drawback to this approach is that bisecting this assembly after coating exposes uncoated metal that, when exposed to moisture, may create an electrical short.

In some embodiments of the present technology, the rimlock is attached (e.g., welded, soldered, brazed) to the eye-wire (thus forming a single electrical node), bisected (e.g., sawn, but not necessarily in half, to form two separate electrical nodes), and then coated with electrically-insulating color finish. In such embodiments, there are no exposed metal surfaces from which to create a short circuit. Once the frame has been completely coated with finish, said finish can be removed only in the areas where electrical connections are required, e.g., at the very end of the rimlock where electrical connectivity to the module via pins such as pogo pins can occur). In some embodiments, areas in which electrical connection is required are temporarily coated with a removable layer before the finish coating is applied, and then the temporary coating, along with and finish coating directly over it, is removed. By limiting the surface of exposed metal, the risk of moisture-induced and liquid-induced electrical shorts can be reduced as well.

In some embodiments of the present technology, a water repellent material can be used to inhibit moisture and liquids from filling spaces between components of electro-active eyewear such as rimlock components. Electrically-insulating greases, such Dow Corning® 111 valve lubricant and sealant, can be useful in this regard. Electrically-insulating grease can be applied while the frame is being assembled. A syringe equipped with a soft plastic tip can be used for application. Within the context of the rimlock shown in FIG. 8, electrically-insulating grease can be applied to the mating surfaces between the rimlock and the plastic insulating spacer, e.g., the surfaces where upper rimlock 712 mates to insulator 716, and where lower rimlock 714 mates to insulator 716. Other cavities, holes, and spaces between parts, such as those for screws and bushings used to assemble the rimlock can be filled or coated with electrically insulating grease.

Figure 9:
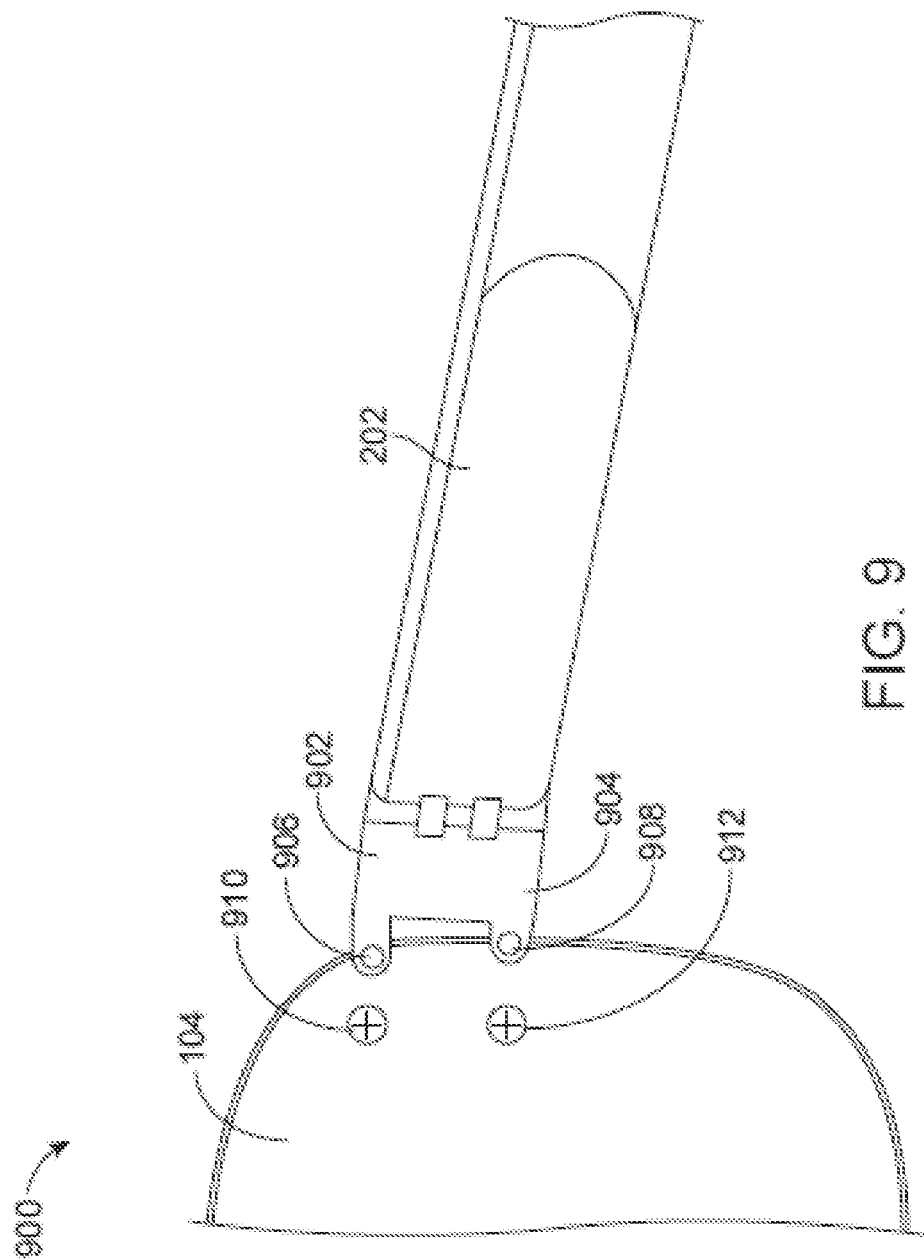
FIG. 9 illustrates a portion of electro-active spectacles in accordance with an aspect of the present technology.

FIG. 9 illustrates a portion of electro-active spectacles 900 in accordance with an aspect of the present technology. The electro-active spectacles 900 are implemented as rimless spectacles. That is, no upper or lower rim supports the electro-active lens 104.

As shown in FIG. 9, the electro-active spectacles 900 can include an electronic module 202 and an area to accept an electronic module 202. The electronic module 202 can be electrically coupled to the electro-active lens 104 using upper conducting member 902 and lower conducting member 904 (similar to upper conducting member 712 and lower conducting member 714 depicted in FIG. 7 and FIG. 8). Both the upper and lower conducting members 902 and 904 can be isolated or insulated conductors having a protected, internal conductive routes (e.g., a conductive wire) enclosed by a nonconductive material (e.g., a plastic). Alternatively, the upper and lower conducting members 902 and 904 can entirely comprise conductive material and can be coated with non-conductive material.

The frame of the electro-active spectacles 900 can support the electro-active lens 104 using upper support member 910 and lower support member 912. As an alternative, one of the upper and lower support members 910 and 912 can be used. Both the upper and lower supporting members 910 and 912 can be positioned through holes residing in the electro-active lens 104. The frame of the electro-active spectacles 900 can also be supported by upper contact 906 and lower contact

908. Both the upper and lower contacts 906 and 908 can be positioned through holes residing in the electro-active lens 104. The upper and lower contacts 906 and 908 can be compression pin connectors having a portion that can make electrical contact with appropriate elements of the electro-active lens 104.

While simultaneously supporting the electro-active lens 104, the upper contact 906 can make electrical contact with a first electrical lead of the electro-active lens (e.g., the first electrical lead 608 depicted in FIG. 6). Similarly, the lower contact 908 can support the electro-active lens 104 while also providing electrical contact to a second electrical lead of the electro-active lens (e.g., the second electrical lead 610 depicted in FIG. 6).

Both the upper contact 906 and the upper support member 910 can form part of an arm or extension of the upper conducting member 902. The upper contact 906 and the upper support member 910 can comprise one or more conductors (e.g., a wire) insulated or contained by an insulating material (e.g., plastic). The upper contact 906 and the upper support member 910 can be positioned in front of the electro-active lens 104 (and connect through to the back of the electro-active lens 104—as shown in FIG. 9) or can be positioned behind the electro-active lens 104 (and connect through to the front of the electro-active lens 104—not shown in FIG. 9). The lower contact 908 and the lower support member 912 can be positioned in a manner similar to the upper contact 906 and the upper support member 910 pairing (and can form part of an arm or extension of the upper conducting member 904).

Figure 10:
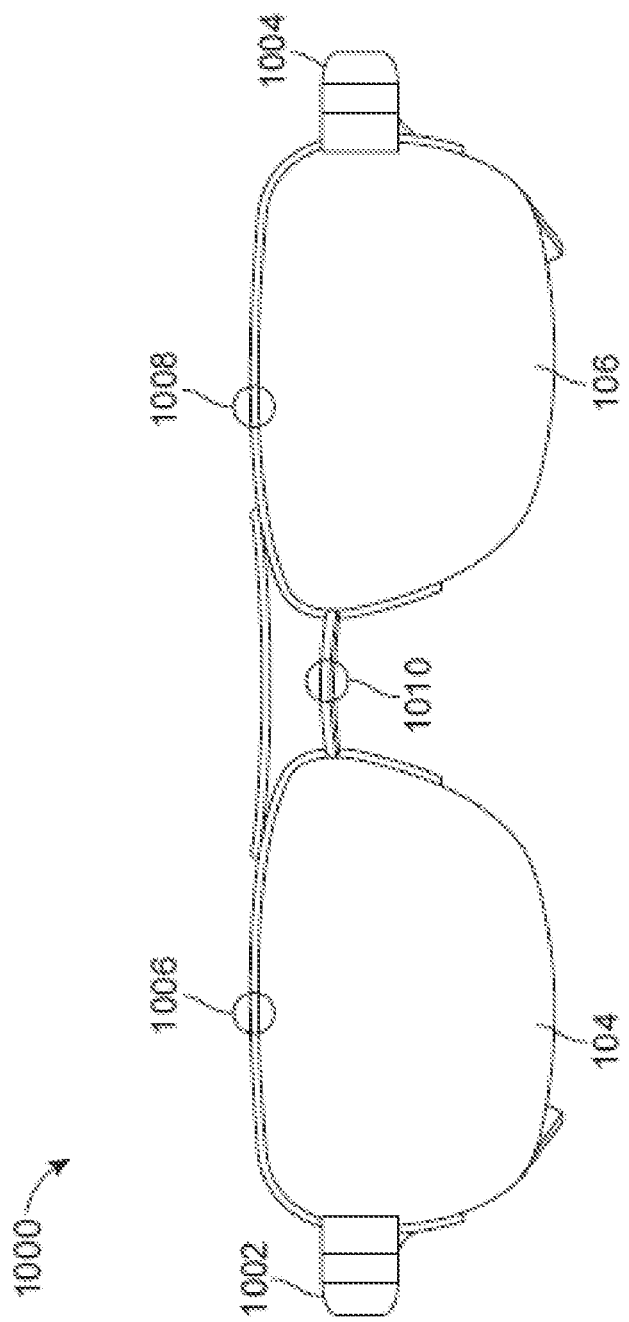
FIG. 10 illustrates a front a view of electro-active spectacles in accordance with an aspect of the present technology.

FIG. 10 illustrates a front a view of electro-active spectacles 1000 in accordance with an aspect of the present technology. The electro-active spectacles 1000 are implemented as partially-rimmed spectacles. Electrical connectivity between a right side of the electro-active spectacles (e.g., from a right-side portion of a frame 1002) to a left side of the electro-active spectacles (e.g., from a left-side portion of a frame 1004) can be provided in a variety of ways and is not limited to partially-rimmed designs. Electrical connectivity between the right-side portion 1002 and the left-hand portion 1004 can enable a single electronic module (e.g., the electronic module 202) located on either side to govern operation of both electro-active lenses 104 and 106. Further, this connectivity can ensure synchronized operation of the electro-active lenses 104 and 106 even if each of the electro-active lenses 104 and 106 is driven by separate electronic modules.

One or more conducting elements (e.g., conducting wires) can be embedded in a right-side upper frame or rim member 1006, a left-side upper frame or rim member 1008 and a bridge 1010 (as well as a left-side lower frame or rim member and a right-side lower frame or rim member for some frame designs). The conducting elements can be embedded and surrounded by insulating material. Embedding one or more conducting elements in the right side upper frame member 1006, the bridge 1010 and the left-side upper frame member 1008 can enable an electronic module on either side of the electro-active spectacles 1000 to control and/or synchronize operation of both electro-active lenses 104 and 106.

Rimless frames generally do not include the right-side upper frame member 1006 or the left-side upper frame member 1008. Rimless frames, however, do generally include a bridge 1010. Electrical connectively between the right-side portion 1002 and the left-hand portion 1004 of a rimless frame can be accomplished by using conductive elements incorporated into the manufacture of the electro-active lenses 104 and 106. Specifically, the bridge 1010 can electrically connect (e.g., using an embedded conductive link or a conductive link adjacent to or connected to the bridge) one or more conducting elements of the electro-active lenses 104 and 106 (e.g., using one or more ITO layers) which are themselves coupled to the right-side portion 1002 and the left-hand portion 1004, respectively, of a spectacles lens. Electrical connectively between the right-side portion 1002 and the left-hand portion 1004 of a rimless frame can also be accomplished by using conductive wires positioned within the grooves an electro-active lens (e.g., the groove 606 depicted in FIG. 6) to couple the right-side portion 1002 to the left-hand portion 1004. Portions of the groove on the top part of the electro-active lens or on the bottom part of the electro-active lens can be used to house or contain one or more conductive wires. The conductive wires positioned within such a groove can be insulated.

According to an aspect of the present technology, one or more conductive wires can be embedded in the upper rim members, the bridge and/or the lower rim members of electro-active spectacles and frames of the present technology during a mold casting process. That is, when the upper rim members, the bridge and/or the lower rim members are formed using a casting process, one or more conductive wires can be cast over when the upper rim members, the bridge and/or the lower rim members are prepared. Generally, thicker conductive wires can be used during such a process. Nylon is an example material that can be used to mold over one or more conductive wires to from the upper rim members, the bridge and/or the lower rim members.

According to an aspect of the present technology, one or more conductive wires can be embedded in the upper rim members, the bridge and/or the lower rim members of electro-active spectacles and frames of the present technology as each frame component is assembled. More specifically, any of the upper rim members, the bridge and/or the lower rim members that will be used to embed one or more conductive wires can be fabricated by two or more individual or separate pieces. For example, the upper rim members can be formed from two substantially symmetrical pieces of substantially the same shape—a front piece and a back piece which individually may appear to be a portion of the upper rim member split in half lengthwise. Prior to assembling the front and back pieces to form a complete upper rim member, one or more wires can be embedded (e.g., in a groove formed by mold or machined into the front and/or back pieces) between the front and back pieces (i.e., at the interface between the front and back pieces). The front and back pieces used to form the complete upper rim member can subsequently be combined, for example, using an adhesive.

According to an aspect of the present technology, one or more conductive wires can be embedded in the upper rim members, the bridge and/or the lower rim members of electro-active spectacles and frames of the present technology after the frame is assembled. Specifically, one or more grooves can be machined into the upper rim members, the bridge and/or the lower rim members that can be used to contain one or more conductive wires. The machined grooves can then be filled or covered with material to cosmetically hide the conductive wires. The assembled frame can then be polished to hide or mask the area in which the wires are embedded. Acetate is an example material that can be manipulated in this fashion to embed one or more conductive wires.

Figure 11:
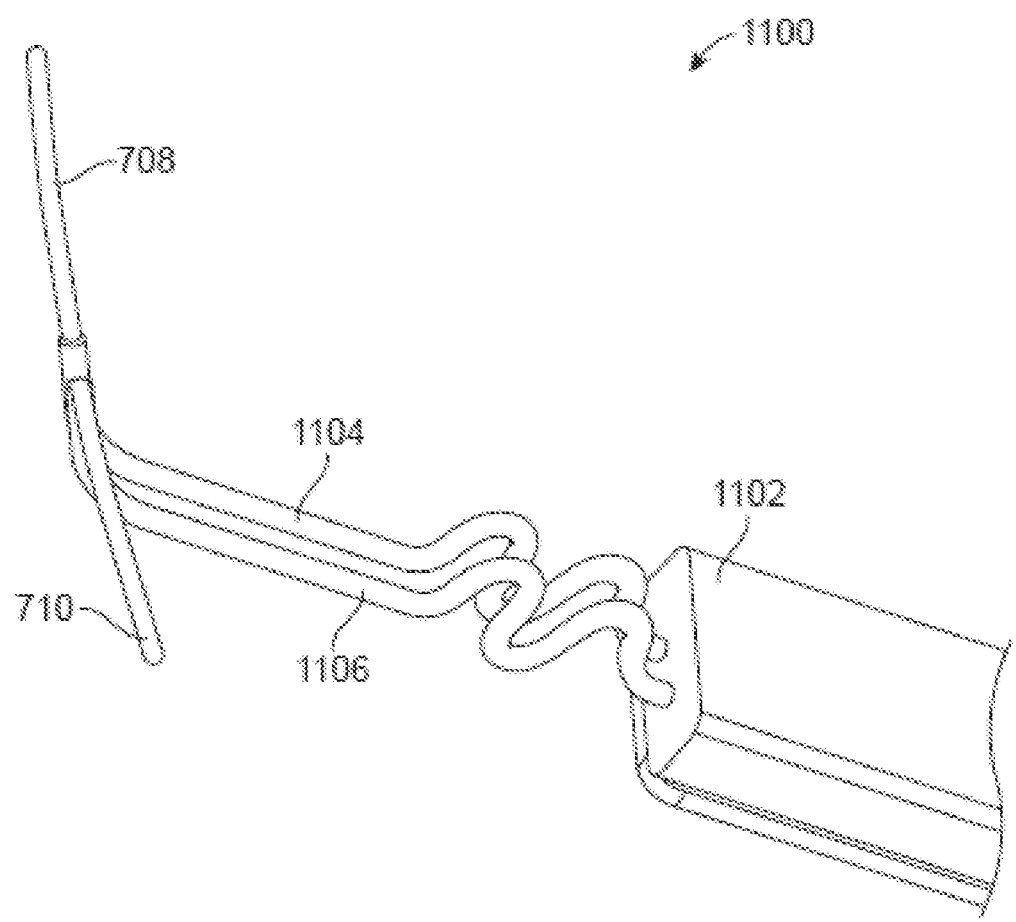
FIG. 11 illustrates a portion of a right temple of electro-active spectacles in accordance with an aspect of the present technology.

In FIG. 11, all of the frame and hinge components have been removed showing only parts of a frame 1100 including electronic module 1102, flexible conductors 1104 and 1106, and physically compliant conductive materials 708 and 710. In this embodiment flexible conductors 1104 and 1106 are permanently attached to electronic module 1102 and nearly all electrically conductive portions are coated or enclosed within electrically insulating materials. The only electrically conductive portion exposed is the connection between the ends of the flexible conductors 1104 and 1106 and the physically compliant conductive materials 708 and 710, which is required to make electrical connection to the lens. The benefits of this embodiment are that the conduction of electrical signals is separate (physically and electrically) from the lens mounting and temple hinge components and that nearly all of the electrically conductive surfaces are insulted from environmental moisture and other liquids. Furthermore, such a design does not require that the frame (or frame components) be constructed from conductive materials (e.g. metal), thus further reducing the risk for electrical shorts.

FIG. 11 illustrates a portion of a right side of frame 1100, such as frame portion 700 of electro-active spectacles in accordance with an aspect of the present technology. The portion of the right side of a frame 1100 depicted in FIG. 11 can be coupled to an electro-active lens (not depicted in FIG. 11 for simplicity) through first conductor 708 and second conductor 710 as described in connection with FIG. 7. An electronics module 1102, similar to electronics module 202, is shown. The electronics module 202 can be coupled to the first conductor 708 through first conductive link 1104. The electronics module 1102 can further be coupled to the second conductor 710 through a second conductive link 1106.

The connection between each of links 1104, 1106, and electronics within module 1102 can be direct and sealed at the entrance to the module, or insulated leads (themselves sealed at entrance to the module 1102) can protrude from the module (not shown). The module 1102 itself can be sealed and potted so as to inhibit undesirable effects of liquid and moisture on the electronics therein.

The first and second link conductors 1104 and 1106 can be shaped and constructed to tolerate bending of other frame members (not depicted in FIG. 11 for simplicity) when the electro-active spectacles are opened and closed. The first and second link conductors 1104 and 1106 can contain one or more conducting elements (e.g., conducting wires) and can enclose them with insulating or non-conductive material or can themselves be entirely conductive. The links 1104, 1106 can be contained in a flexible conductive cable 1108, as shown with respect to a portion 1500 of the right side of a frame in FIG. 14.

In embodiments the electronic module which is located within or on the temple of the electronic eyeglass frame comprises a flexible conductive cable, such as cable 1108, which connects the electronics within the electronic module. This flexible conductive cable can be connected directly to the electronics within the electronic module (in which case the one end of the flexible conductive cable) is sealed within the electronic module or it can be connected directly by way of two insulated leads that protrude from the end of the electronic module. In either event, the flexible electronic cable may provide a constant and flexible electrical connection to the electronics housed within the electronic module. It should be pointed out that the electronic module is sealed, potted and is largely moisture proof.

The flexible conductive cable can be of a length that begins within the electronic module and exits the temple either on the side of the temple or on the front end piece of the temple closest to the hinge of the temple and then bypasses the hinge connection between the temple and the frame front, and proceeds to plug into the back side of the frame front closest to the wearer. The flexible conductive cable can also be made to begin with the two conductive compressible members (by way of example only, conductive rubber) and then proceeds once again to bypass the hinge connecting the temple to the frame front and then on thru the back of the frame's front into the side or front end of the temple connecting to the module. The flexible cable can also connect by way of being incorporating thru the insulation of the bridge between the upper and lower rimlock or the flexible conductive cable can be designed as it passes between the upper and lower rimlocks to become the insulator that separates the upper and lower rimlock from one another.

In some embodiments the flexible conductive cable may be directly connected to two conductive contact points located within the rim of the eyeglass frame, on the lens surface, connected to the lens or frame surface. In other embodiments the flexible conductive cable may connect indirectly by connecting with contact points located within the rim of the eyeglass frame or on the lens surface. When connected indirectly the flexible conductive cable may connect to an intermediate conductive path by way of a moisture resistant connection or connections.

These two conductive contact points may be made of a compressible conductive material; by way of example only, conductive rubber. The flexible conductive cable provides a completely sealed and moisture proof barrier from the sealed electronic module to that of the two conductive contact points (which are spatially removed and/or insulated from one another) which make electrical contact to that of the lens or a display located on or in the lens. The conductive cable being flexible allows for the cable to be flexed or bent as the temple of the eyeglasses or eyewear is being opened and shut. Also the flexible conductive cable allows for in certain frame designs or styles the flexible conductive cable to be threaded or inserted thru certain frame members still allowing for a completely sealed connection from the electronic module to that of the electronic connection points within the frame's eye wire or rim.

In some embodiments, the flexible conductive cable may be directly or indirectly connected in a similar manner to two conductive contact points on or connected to an electronic display and or controller, affixed to the eyeglass frame front, or the lens, or housed within the eyeglass frame front or the lens.

In some embodiments, such as those involving a video display, first conductor 708 and second conductor 710 can be connected to the display. In various embodiments, conductors 1104 and 1106 can be semi-rigid or rigid for at least some of their length. The first and second link conductors 1104 and 1106 can be considered to be continuous conductive links since they provide an uninterruptable physical connection between the module 1102 and the conductive elements of the electro-active lenses, e.g., 612, 614 via conductive elements 708 and 710.

Referring to FIGS. 12A and 12B, another aspect of the present technology for reducing the risk of liquid/moisture damage to electro-active eyewear is illustrated. As described above with reference to FIG. 6, physically compliant conductive material, e.g., 612, 614, can be used along a portion of the edge of lens, e.g., 600. In some embodiments insulating materials can be used along the remainder of the lens edge. In such an approach, moisture, oils, and salt may accumulate, and over time degrade the connections. In some embodiments of the present technology, a gasket, e.g., 1200 of compliant, but electrically insulating material, e.g., silicone, can be used to create a more compliant, and liquid/moisture-resistant fit for the lens around its edge. In some embodiments, the gasket 1200 can stretch around the circumference of the lens, resisting the ingress of moisture, oils, salt, and liquids. To enable electrical connectivity to the lens, apertures 1202 can be provided that accommodate physically compliant conductive material, e.g., 612, 614, formed to mate with the gasket.

FIG. 12B shows sectional views including portions of the gasket without the physically compliant conductive material 614 (upper view), and with the physically compliant conductive material 614 (lower view).

Figure 13:
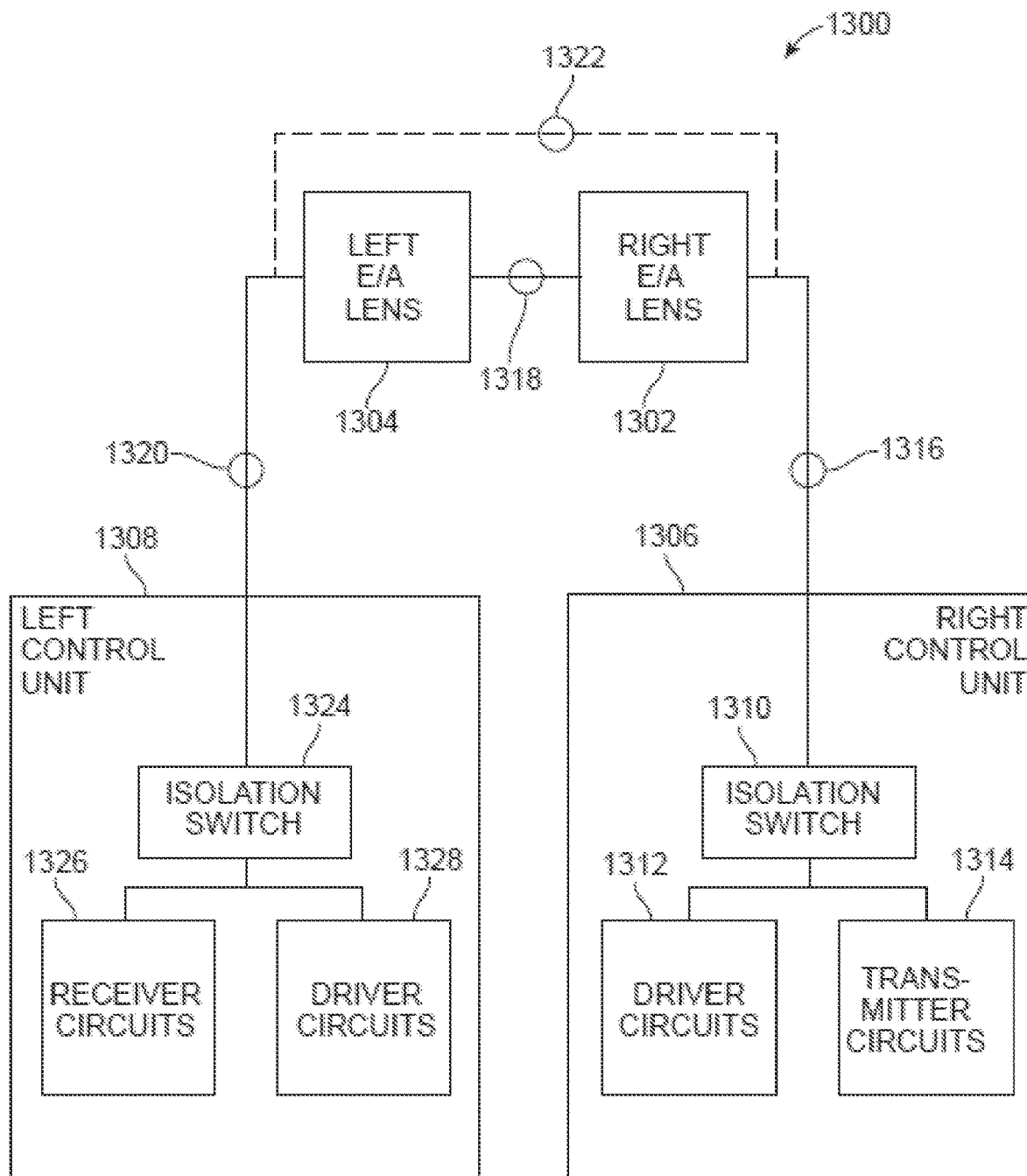
FIG. 13 illustrates a representative block diagram of electro-active spectacles in accordance with an aspect of the present technology.

FIG. 13 illustrates a representative block diagram of electro-active spectacles 1300 in accordance with an aspect of the present technology. The electro-active spectacles 1300 can represent the electro-active spectacles of the present technology described above (e.g., the electro-active spectacles 100). The electro-active spectacles 1300 can include a right electro-active lens 1302 and a left electro-active lens 1304. The right and left electro-active lenses 1302 and 1304 can represent the first and second electro-active lenses 104 and 106 described earlier. The electro-active spectacles 1300 can include a right control unit 1306 and a left control unit 1308. The left and right control units 1306 and 1308 can each represent an electronic module 202, or a portion thereof, described above.

The right control unit 1306 can include an isolation switch 1310, driver circuits 1312, and transmitter circuits 1314. The driver circuits 1312 can generate a driver signal for operating (e.g., activating) the right electro-active lens 1302. For example, to activate the right electro-active lens 1302, the driver circuits 1312 can provide, generate or transmit a driver signal or activation signal. Further, to deactivate the right electro-active lens 1302, the driver circuits 1312 can simply stop providing, generating or transmitting the driver signal.

The transmitter circuits 1314 can generate a synchronization signal for coordinating operation of the right and left electro-active lenses 1302 and 1304. Specifically, the transmitter circuits 1314 can transmit a synchronization signal instructing the left electro-active lens 1304 to activate or deactivate. As an example, the left electro-active lens 1304 can be activated based on receipt of the synchronization signal or a synchronization signal of a first type instructing activation. Further, the left electro-active lens can be deactivated based on the absence of the synchronization signal or receipt of a synchronization signal of a second type instructing deactivation. As a result, the right and left electro-active lenses 1302 and 1304 can be activated and deactivated at substantially the same time.

The isolation switch 1310 can determine when the driver circuits 1312 and the transmitter circuits 1314 can access a conductive link 1316 coupling the right electro-active lens 1302 to the control unit 1306. The conductive link 1316 can comprise one or more conductive wires. The conductive link 1316 can represent one or more of the connectivity mechanisms depicted and described above (e.g., the routing and connectivity features illustrated in FIG. 11 and described above).

When the electro-active spectacles are implemented with only a single control unit (e.g., the control unit 1306), then the control unit 1306 can control operation of both the right and the left electro-active lenses 1302 and 1304. Under such a scenario, the isolation switch 1310 and transmitter circuits 1314 can be optional. Further, the left and right electro-active lenses 1302 and 1304 can be activated at substantially the same time by a driver signal provided by the driver circuits 1312.

A communications link between the right and left control units 1306 and 1308 can comprise any portion of the conducive link 1316, conductive elements within the right electro-active lens 1302, a bridge conductive link 1318 contained within or adjacent to a bridge of the electro-active spectacles 1300, conductive elements within the left electro-active lens 1304, and a conductive link 1320. The conductive link 1320 can comprise one or more conductive wires and can represent one or more of the connectivity mechanism depicted and described above (e.g., the routing and connectivity features illustrated in FIG. 11 and FIG. 12 and described above). The communications link between the right and left control units 1306 and 1308 can also include or alternatively include a frame conductive link 1222 (shown in phantom in FIG. 13).

The frame conductive link 1322 can include one or more conductive wires wrapped over the right and left electro-active lens 1302 and 1304—e.g., either embedded within a portion of the frame and/or contained in a groove of the right and left electro-active lenses 1302 and 1304 as described above. The frame conductive link 1322 can also include conductive elements of the right and left electro-active lenses 1302 and 1304 (e.g., one or more layers of ITO or other transparent conductive layers of the right and left electro-active lenses 1302 and 1304). For example, the frame conductive link 1322 can be a wireless link that uses conductive layers of the right and left electro-active lenses 1302 and 1304 as antennas to facilitate communication and/or synchronization between the right and left electro-active lenses 1302 and 1304. Alternatively, other conductive elements can be embedded within the electro-active spectacles of the present technology to facilitate communication and/or synchronization between the right and left electro-active lenses 1302 and 1304. One or more of these embedded antennas could also provide a wireless communication link between the electro-active spectacles of the present technology and a remote communication device.

Overall, the right control unit 1306 can communicate with the left control unit 1308 and/or can operate the left electro-active lens 1304 using a single conductive wire or link. The single conductive wire can also be used to operate the right electro-active lens 1302. The single conductive wire or link can be embedded within a portion of a frame and can include conductive elements of the electro-active lenses.

The left control unit 1308 can include an isolation switch 1324, driver circuits 1326, and receiver circuits 1328. The driver circuits 1326 can generate a driver signal for operating (e.g., activating) the left electro-active lens 1302. The receiver circuits 1326 can receive and process a synchronization signal transmitted by the right electro-active module 1306. The isolation switch 1324 can determine when the driver circuits 1312 and the receiver circuits 1328 can access the conductive link 1320 coupling the left electro-active lens 1304 to the control unit 1308.

The receiver circuits 1326 can listen for a synchronization signal transmitted over conductive link 1320. The receiver circuits 1326 can listen periodically or randomly for a specific or random amount of time. Once a synchronization signal is received, the control unit 1308 can operate accordingly—i.e., either activate or deactivate the left electro-active lens 1304 using a driver signal transmitted by the driver circuits 1328.

The transmitter circuits 1314 can transmit a synchronization signal in response to detection of a head tilt change of the user (e.g., detected by a gyroscope or accelerometer included in the right control unit 1306—not illustrated for clarity) or manual command issued by the user. The synchronization signal transmitted by the transmitter circuits 1314 can be coded to distinguish it from noise and to prevent false triggering.

Figure 14:
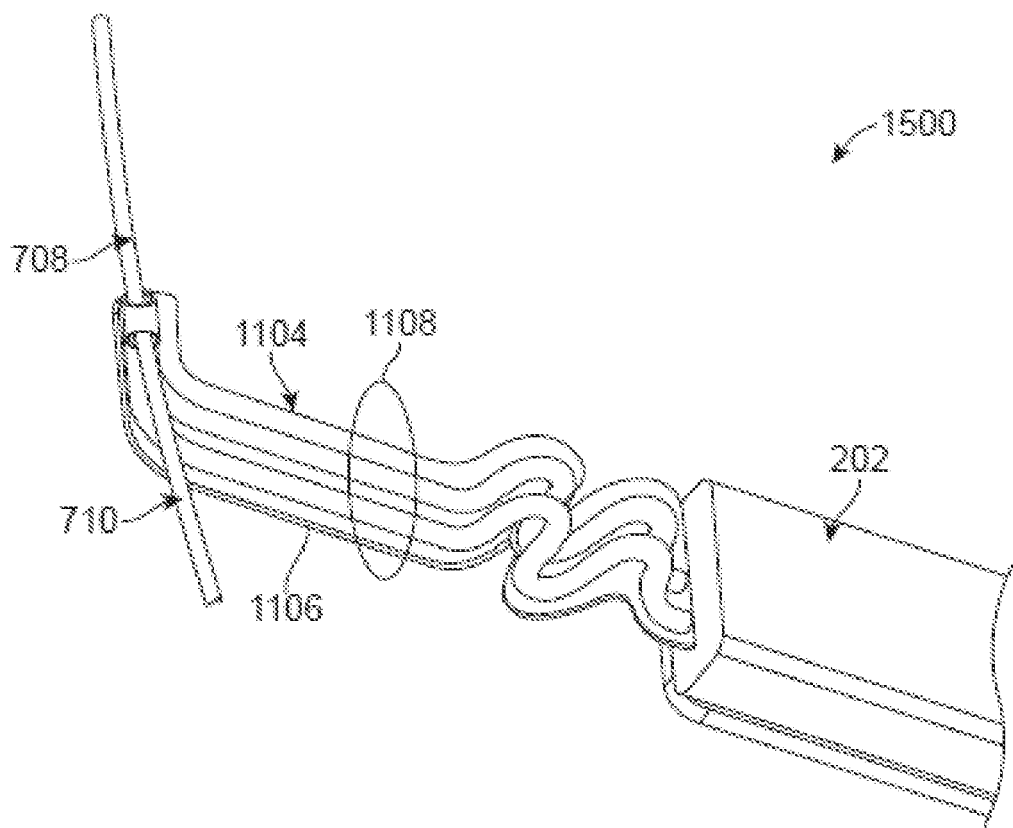
FIG. 14 illustrates a portion of a right temple of electro-active spectacles in accordance with an aspect of the present technology.

In FIG. 14, all of the frame and hinge components have been removed showing only parts of a frame 1500 including electronic module 202, flexible conductors 1104 and 1106, physically compliant conductive materials 708 and 710, and flexible cable 1108. In this embodiment, the flexible cable 1108 has one end sealed within the module 202. This sealing is substantially water-resistant or water-proof. The other end of cable 1108 may terminate in a plug (not shown) that mates with a receptacle on the backside of the eyewear frame front (or on an edge of the frame front, or on one of the end pieces of the frame front) whereby connection is provide to the lens. In other embodiments, the plug and receptacle can be reversed.

Figure 15:
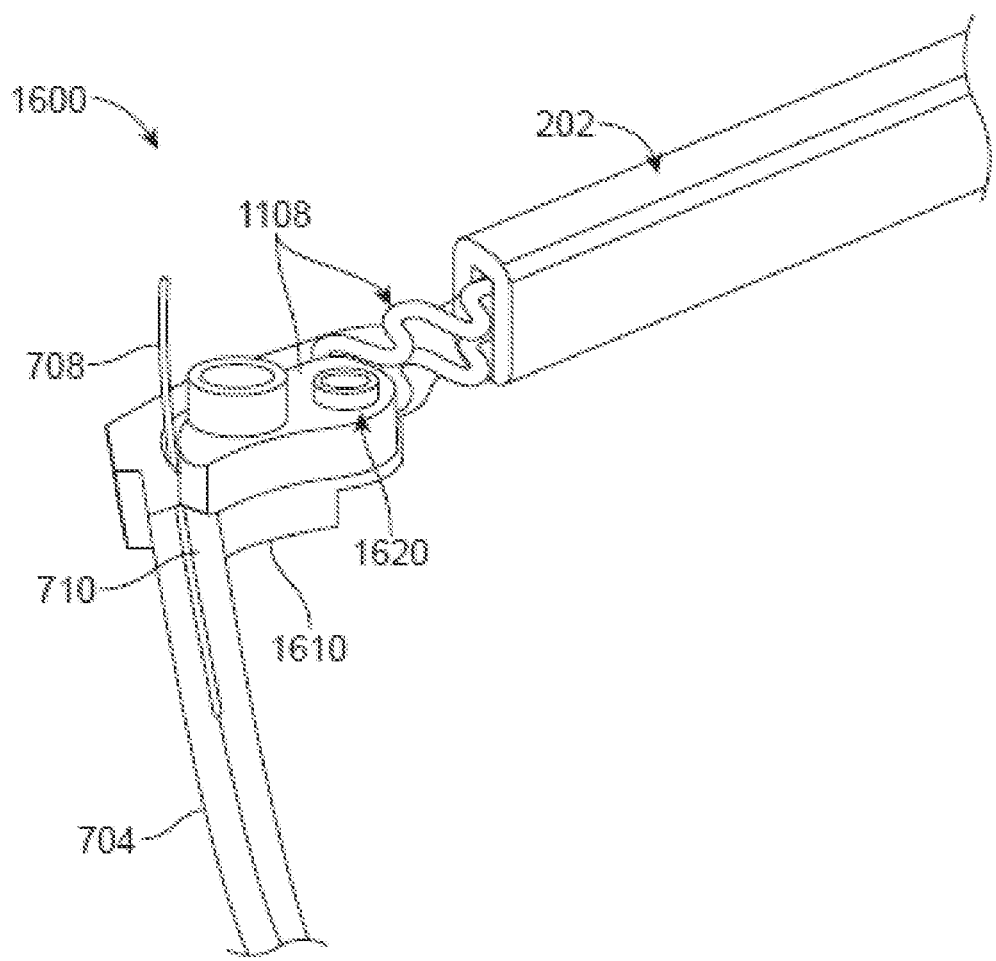
FIG. 15 illustrates a portion of a right temple of electro-active spectacles in accordance with an aspect of the present technology.

FIG. 15 illustrates a portion 1600 of the right side of the frame showing the module 202, flexible cable 1108, first conductor 708, second conductor 710, rim wire lower portion 704, lower rimlock 1610, and insulating layer 1620, with the flexible cable 1108 bypassing the hinge elements formed in the insulating layer to the right and around to the front of the eyewear. Flexible conductive links 1104 and 1106 can be used in place of flexible cable 1108. In embodiments of the present technology, such as those illustrated in each of FIG. 11 and FIG. 14, the conductive links 1104, 1106, and the cable 1108, can be of length that begins with the electronic module 200 and exits the temple either on the side of the temple to the front end piece of the temple closest to the hinge of the temple, and then bypasses the hinge connection between the temple and the frame front, and enters the frame front.

Figure 16:
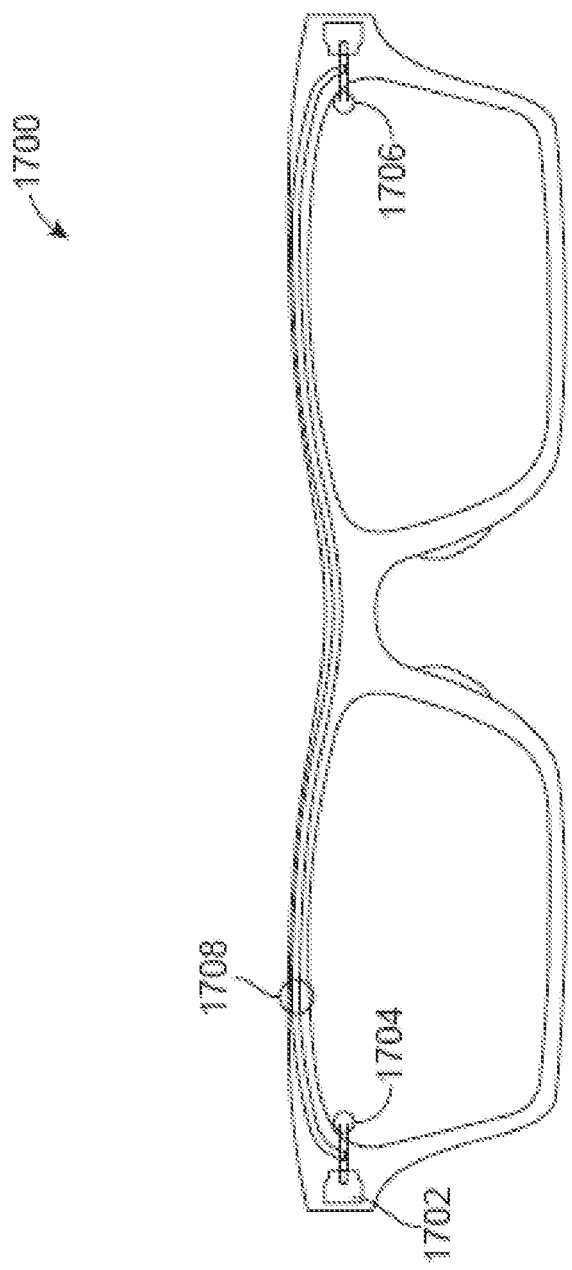
FIG. 16 illustrates an electro-active frame in accordance with an aspect of the present technology.

FIG. 16 illustrates electro-active frame 1700 in accordance with an aspect of the present technology. Electro-active lenses can be mounted within the electro-active frame 1700. For simplicity, a portion of electronics 1702 that can be used to govern operation of the electro-active lenses are shown. The electronics 1702 can represent a portion of an electronic module 202 described above and/or can represent conductive elements positioned to provide electrical connectivity between a temple of the electro-active frame 1700 and a front portion of the electro-active frame 1700. The electro-active frame 1700 is shown as including electronics 1702 on only one side of the electro-frame 1700 but is not so limited.

As further shown in FIG. 16, the electro-active frame 1700 can include conductive leads 1704 and 1706 and conductive link 1708. Conductive link 1708 can provide electrical connectivity from one side of the electro-active frame 1700 to the other side of the electro-active frame 1700. Conductive leads 1704 can provide electrical connectivity between electronics 1702 and a first electro-active lens mounted within the electro-active frame 1700. Conductive leads 1706 can provide electrical connectivity between the conductive link 1708 and a second electro-active lens mounted within the electro-active frame 1700.

As shown in FIG. 16, the conductive link 1708 can be embedded or positioned within the electro-active frame 1700. The conductive link 1708 can include any number of conductive elements (e.g., wires) that can be insulated or not insulated. If the electro-active frame 1700 uses driver electronics on each side of the frame 1700 (e.g., a master and slave driver electronics or electronic modules 202) then as few as only one single wire can comprise the conductive link 1708). If the electro-active frame 1700 has driver electronics on only one side of the electro-active frame 1700, then at least two wires or conductive elements can be used. The conductive link 1708 can be positioned inside the electro-active frame 1700 in accordance with any of the methods described above for embedding conductive links including, but not limited to, (1) embedding during a mold casting process; (2) embedding during an assembly process of the front frame portion of the electro-active frames 1700; and (3) embedding after assembly of the electro-active frames by providing a groove or route for the conductive link 1708. The conductive link 1708 can also use or can alternatively comprise the conductive layers of the electro-active lenses of the present technology that can be positioned into the frames 1700 as described above.

Figure 17:
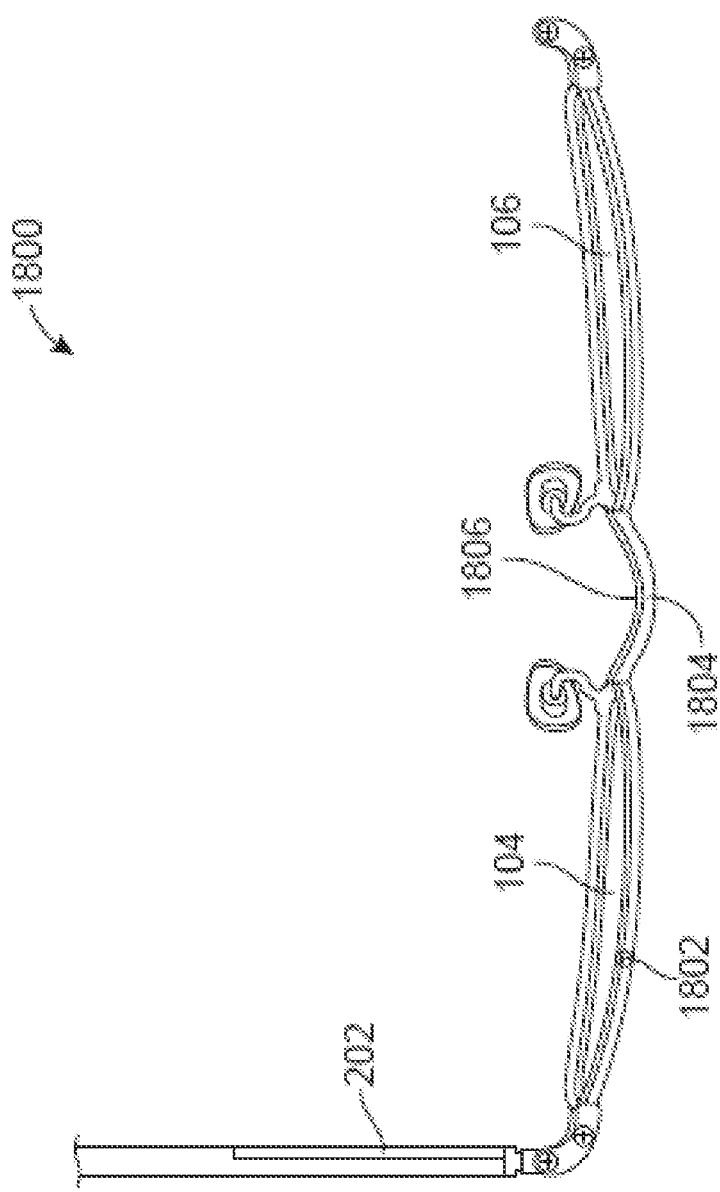
FIG. 17 illustrates electro-active spectacles in accordance with an aspect of the present technology.

FIG. 17 illustrates electro-active spectacles 1800 in accordance with an aspect of the present technology. The electro-active spectacles 1800 can include an electronic module 202. The electro-active spectacles 1800 can also include conductive link 1802. Conductive link 1802 can include any number of conductive elements (e.g., wires) that can be insulated or not insulated. Conductive link 1802 can provide electrical connectivity between the electronic module 202 and the electro-active lens 104 and the electro-active lens 106.

As shown in FIG. 17, a portion of the conductive link 1802 can be positioned or embedded within a portion of the frame of the electro-active spectacles 1800. For rimless spectacles, the conductive link 1802 can be routed through a groove in an electro-active lens (e.g., the groove 606 depicted in FIG. 6). As further shown in FIG. 17, the conductive link 1802 can be routed adjacent to a bridge 1804 of the electro-active spectacles 1800. For example, the conductive link can be routed through tubing 1806 that is positioned adjacent to the bridge 1804.

Referring to FIG. 18, embodiments of the present technology using plug/receptacle connections are illustrated in the context of electro-active eyewear 1900. In some of those embodiments, the electrical module 202 has connector leads, e.g., 1108 that have one end sealed within the module 202. This sealing is substantially water-resistant or water-proof. The other end of cable 1108 terminates in a plug 1910 that mates with a receptacle (not shown) on the backside of the eyewear frame front (or on an edge of the frame front, or on one of the end pieces of the frame front) whereby connection is provide to the lens. In other embodiments, the plug and receptacle can be reversed. A plug/receptacle connection 1930 also can be used to connect the module 202 with a battery 302. The plug/receptacle connections can be unpluggable or permanent once plugged. In some embodiments, the intermediate electrical contact is located at one of: a rim of the eyewear, the rear ⅓ of the temple, the middle of the temple, the forward ⅓ of the temple, the rim lock or hinge, of the eyewear, a surface of the optical functional member, a frame front of the eyewear, an electronic display, an electronic controller, and between the rim and the lens of the eyewear.

Figure 19:
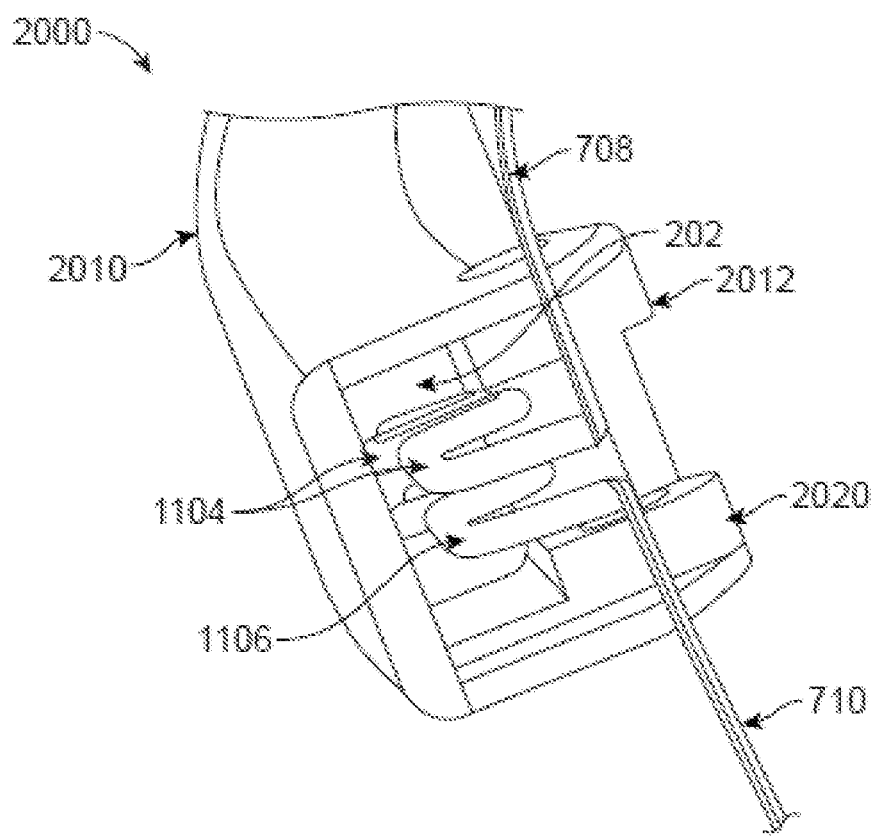
FIG. 19 illustrates a portion of a right temple of electro-active spectacles in accordance with an aspect of the present technology.

Referring to FIG. 19, the portion 1100 shown in FIG. 11 is shown as a portion 2000 from another perspective with the body of the temple 2010. The module 202 is shown inside the body of the temple 2010, the conductive links 1104 and 1106 are shown connecting to upper portion first conductor 708 and lower portion second conductor 710 respectively after being routed around a non-conducting upper rimlock 2012 and lower rimlock 2014. Embodiments of the present technology similar to that illustrated in FIG. 19 can use a cable, e.g., 1108, instead of separate conductors 1104, 1006.

In some embodiments, links 1104, 1106 and cable 1108 can be made from conductive compressible members. Conductive compressible members can include conductive rubber and metal rubber. Metal rubber is a name for conductive plastic polymers with metal ions, it is a self-assembling nano-composite, and is flexible and durable across a broad range of pressures, temperatures, tensions, exposure to chemicals. It retains its properties upon being returned to a ground state. It can carry data and electrical power.

In some embodiments, the flexible conductive cable itself can be an insulating element between the upper rimlock and the lower rimlock. In some embodiments, first conductor 708 and second conductor 710 are not used, and the conductive links 1104, 1106 (either as separate links or as elements of cable 1108) connect directly to the leads and conductive material (e.g., 608/612 and 610/614, respectively) of the electro-active lens (e.g., electro-active lens 600).

In some embodiments, the conductive links 1104, 1106 (either as separate links or as elements of cable 1108) are connected to contact point located within the rim of the eyeglass frame, on the lens surface, connected to the lens or frame surface. In other embodiments of the technology, the conductive links 1104, 1106 (either as separate links or as elements of cable 1108) are connected to contact points on or connected to an electronic display or controller, affixed to the eyeglass frame front or the lens, or housed within the eyeglass frame front or lens. In various embodiments, the conductive links 1104, 1106 (either as separate links or as elements of cable 1108) can be conductive sealed wires.

It is noted that the connectivity mechanisms illustrated in FIG. 11, and described above, can be used for any type of frame style—that is, for fully rimmed, partially-rimmed and rimless frames of the present technology.

Figure 20:
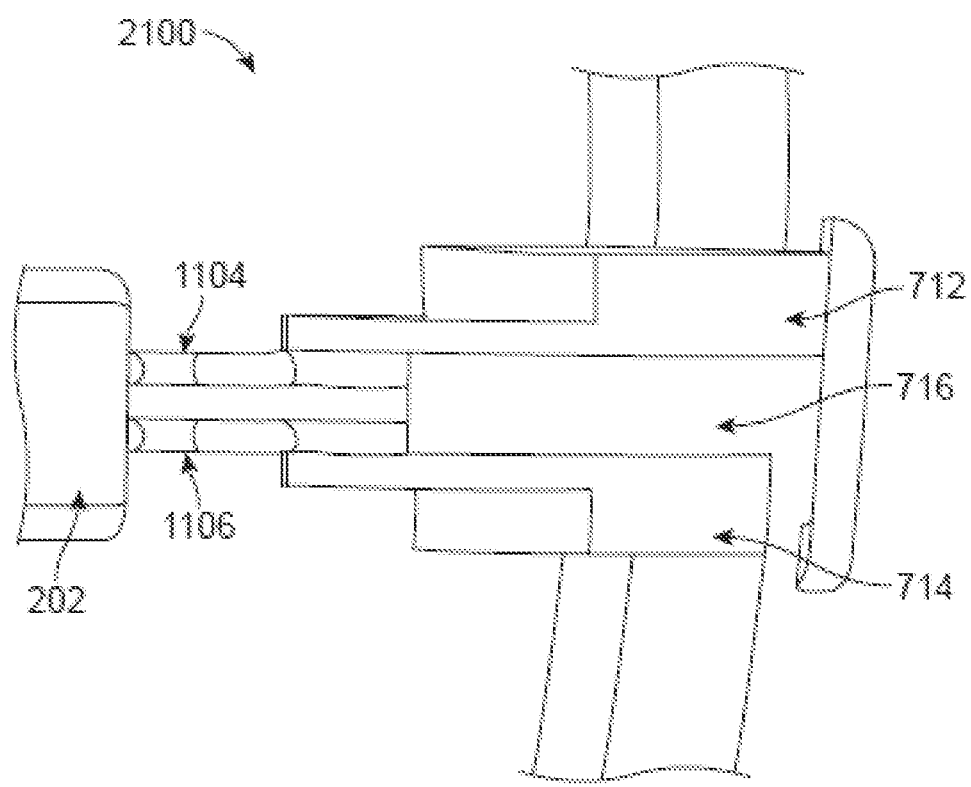
FIG. 20 illustrates a portion of a right temple of electro-active spectacles in accordance with an aspect of the present technology.

Referring to FIG. 20, a portion 2100 of electro-active eyewear in accordance with the present technology is shown. Module 202 is shown connected to conductive links 1104 and 1106 as described in connection with FIG. 11, but using upper rimlock 712 and lower rimlock 714 as conducting members connect to links 1104 and 1006 respectively. Insulating layer 716 is shown disposed between upper rimlock 712 and lower rimlock 714. A cable, e.g., 1108 can be used in place of conductive links 1104 and 1106.

Figure 21:
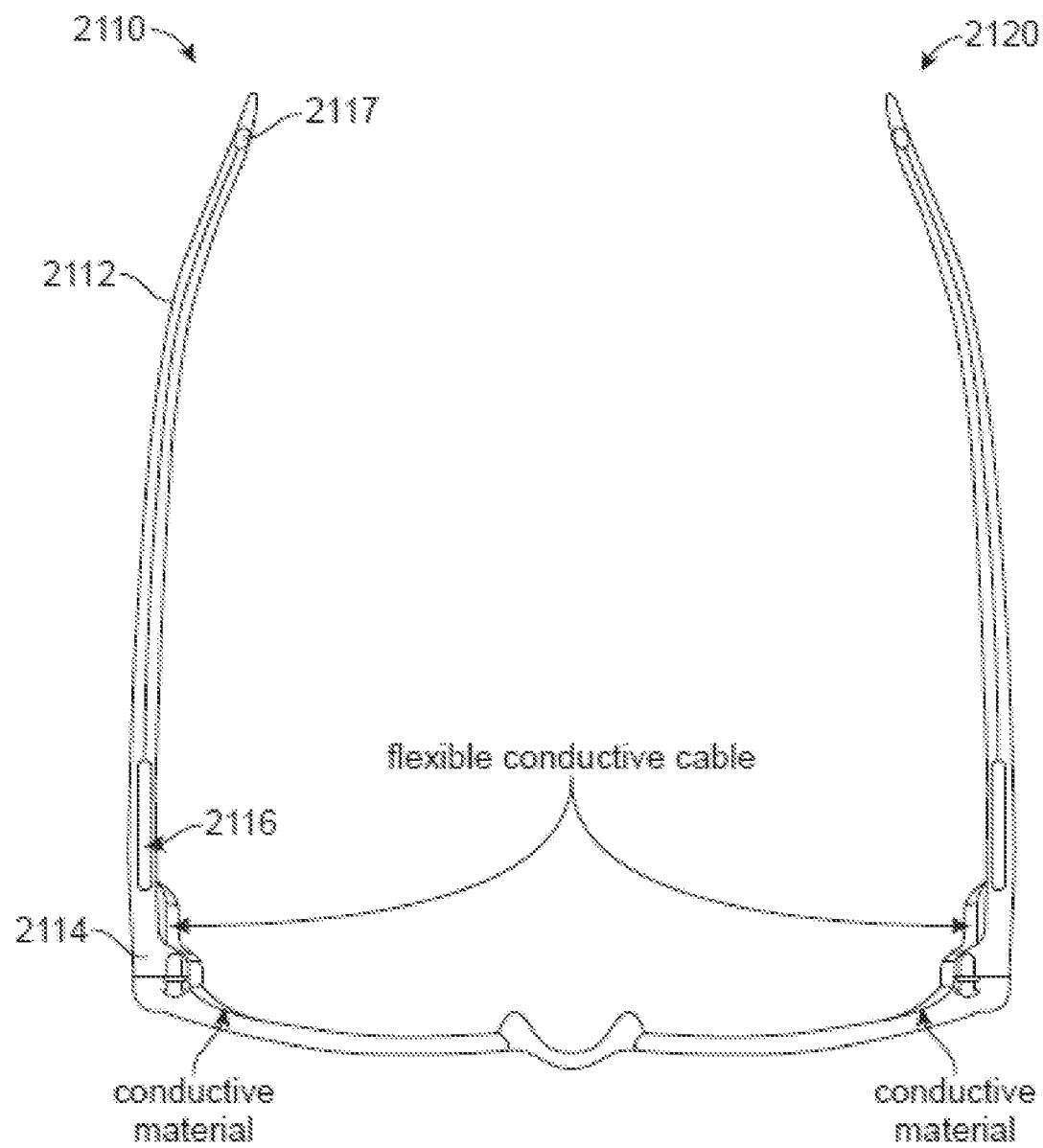
FIG. 21 illustrates a temple assembly in accordance with aspects of the present technology.

Referring to FIG. 21, electro-active eyewear 2110 in accordance with the present technology is shown. Module 2116 is shown in temple portion 2114 and connected via conductor 2112 to a battery 2117 in the distal end of the frame. Flexible conductive cables are also provided between the temple portion 2114 and conductive material of the front portion of the frame.

In some embodiments, a device may be provided including a lens comprising at least a first electrical contact, a lens housing holding the lens, where the lens housing comprises at least a second electrical contact, and a conductive element disposed between the first and the second electrical contact, wherein the conductive element electrically connects the first and second electrical contacts. The first device may further comprise a barrier layer that is disposed so as to cover at least a portion of the conductive material. The "barrier layer" may be disposed so as to cover the conductor (or a portion thereof) at or near the periphery of the lens such that it may not be exposed to the external location between the electro-active lenses and the lens housing typically tends to be where the conductors are exposed to the external environment. The barrier layer may be moisture resistant, such that it may prevent moisture from contacting the electrical connections. In some embodiments, the barrier layer of moisture resistant material may comprise a polymer substance.

In some embodiments, the barrier layer may be applied or disposed in areas of the electronic spectacles between two components (such as between the lens housing and the electro-active lenses). In some embodiments, these components of the electronic spectacles may be coupled in advance, and the barrier layer may be applied in a later process (e.g. as part of a finishing or sealing process after the electrical connections have been formed). This may be preferred because, for instance, the barrier layer may function to prevent the electrical connection at the interface between the components from being exposed to the external environment. Thus, in some embodiments, once the barrier layer is set, access to this interface may be limited. However, embodiments are not so limited, and the barrier layer may be applied at any suitable time.

The inventors have found that in some embodiments it may be preferred that the barrier layer may comprise a material that has a viscosity that is thin enough such that it may be applied or injected into the areas between the components of the electronic spectacles. As noted above, in some embodiments the barrier layer may be applied to prevent or limit contact with moisture (e. g. water) and, therefore, it may be preferred that the viscosity of the barrier layer material be comparable to water. In this manner, the barrier layer may be applied to (and thereby disposed in) the same areas that would otherwise be accessible to this moisture. In some embodiments, where the barrier layer may comprise a polymer material (such as a two component epoxy), after the barrier layer has been applied to the electronic spectacles, it may be cured to set the material in place. In general, the barrier layer may be cured using any suitable process, such as visible light curing, ultra-violet curing, and/or thermal curing. In some embodiments, where thermal curing is used, the material of the barrier layer may be chosen such that it may be cured at a low enough temperature that the other components of the electronic spectacles (e.g. the lenses, lens housing, and/or electronics) are not affected by the increase in temperature.

The inventors have also found that, in some embodiments, it may be preferred that the material that comprises the barrier layer be flexible and/or soft enough such that it does not damage (or damage other components, such as the lens) when experiencing the typical forces of daily use. For instance, when the barrier layer is disposed in the area between the lens housing and the lens component, there may be forces applied to either one of, or both of these components in various directions. If the barrier layer is too rigid, this force may be applied to the lens, which could cause chipping or cracking. This may result, for example, in exposure of the electrical contacts, damage to the lens, and/or one or more components could be decoupled.

Figure 22:
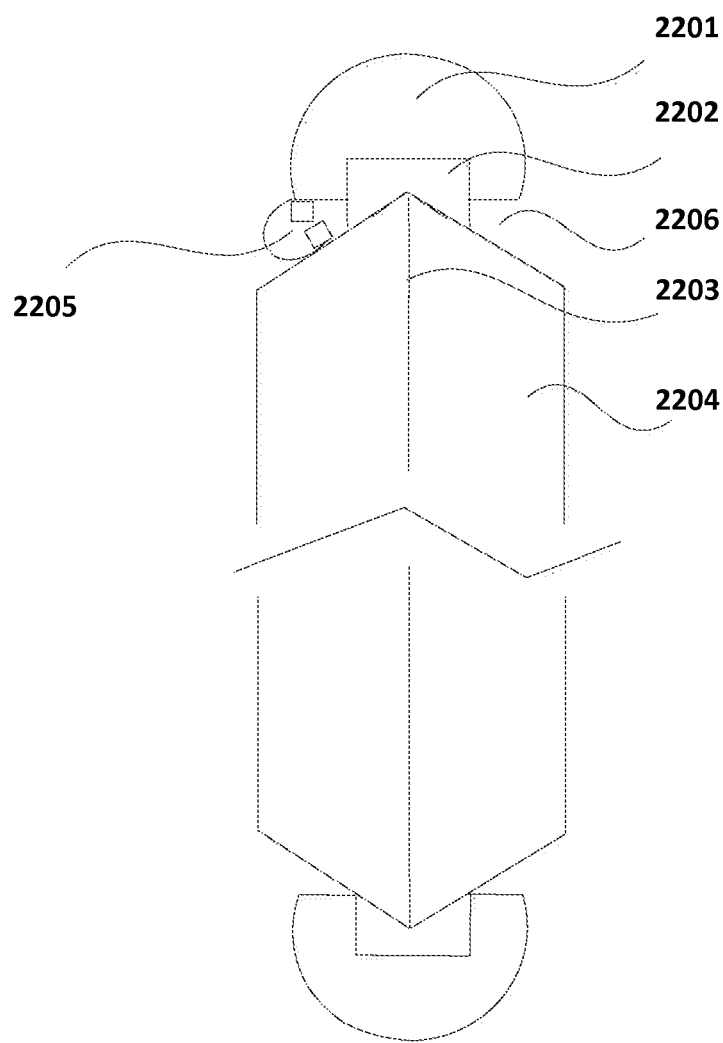
FIG. 22 illustrates an electro-active lens assembly according to an aspect of the present technology.

An exemplary embodiment that comprises a barrier layer applied to electronic spectacles so as to prevent or limit exposure of the electrical contacts between a lens and a lens housing to the outside environment (including to moisture) is shown in FIG. 22. The electronic spectacles comprise a lens housing 2201, a conductor 2202 (in this case, shown as a compliant conductive material), conductive paint 2203 that forms a part of an electrical path to one or more electrical components of the lens 2204, and a barrier layer 2205. As shown in FIG. 22, in some instances a space or area may exist between the lens housing 2201 and the lens 2204 shown as air gap 2206. As noted above, this may be created during the manufacturing process (e.g. the lens housing 2201 and a portion of the lens 2204 do not fit tightly so as to seal the components there between from exposure to the outside environment) and/or may develop through use of the spectacles. On the opposite side of the air gap 2206 shown in FIG. 22 is a barrier layer 2205 that has been disposed so as to insulate the conductor 2202 from the external environment. The barrier layer 2205 is shown as disposed within the area between the lens housing 2201 and the lens 2204. As noted above, the barrier layer 2205 could have been injected into this region between these components, and may have been cured thereto so as to be coupled to the lens housing 2201 and/or the electro-active lens 2204.

Figure 23A:
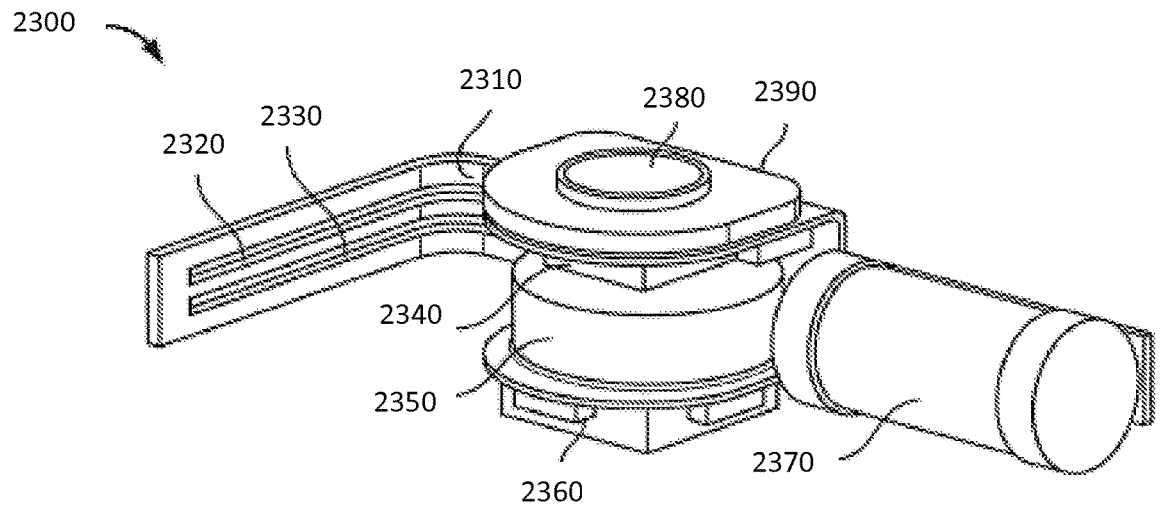
FIGS. 23A-23B illustrate portions of a temple assembly of electro-active eyewear in accordance with an aspect of the present technology.
Figure 23B:
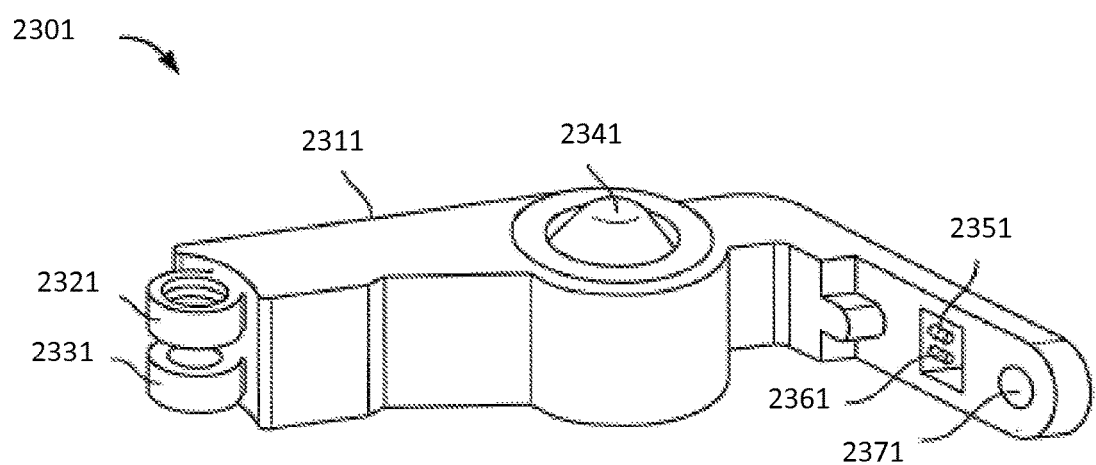

FIGS. 23A and 23B illustrate further embodiments of the present invention. The electronic module 2300 shown in FIG. 23A includes a flex circuit 2310 with two conductive buses 2320 and 2330 for making electrical contact to the front surface of an electro-active lens. The module includes a drive circuit 2340 placed above a rechargeable battery 2350. Below the battery is a recharging coil 2360. The charging coil is used to inductively recharge the battery without direct contact. In this way, the module may be hermetically sealed while still allowing the battery to be recharged without breaking a moisture resistant seal. A tilt sensor 1070 is also attached to the electronic module. A manual switch 1080 is attached to the top of the electronic module and is integrated with a sealing diaphragm 1090. This module is sealed with an epoxy, silicone, or similar water resistant material to prevent water from contacting the electronic components. This module is shaped to fit into a universal frame electronic component as illustrated in FIG. 23B.

FIG. 23B shows a universal electronic frame component 2301. The universal electronic frame component comprising a housing 2311 for holding the electronic module described in FIG. 23A. A set of thread hinge bolt 2321 and 2331 are mounted on the housing 2311 for accommodating a wide variety of frame stem styles to be attached to the universal electronic frame component. The top of the housing 2311 has an aperture to allow a manual switch 2341 to extend outward so as to be accessed by the wearer. Extending out of an opening in the housing are two electrical contacts 2351 and 2361 from the buses described in FIG. 23A. Near these contact points, there is a through hole 2371 to allow a mounting pin to pass through the front of the universal electronic frame component for attaching to an electro-active lens.

Figure 24A:
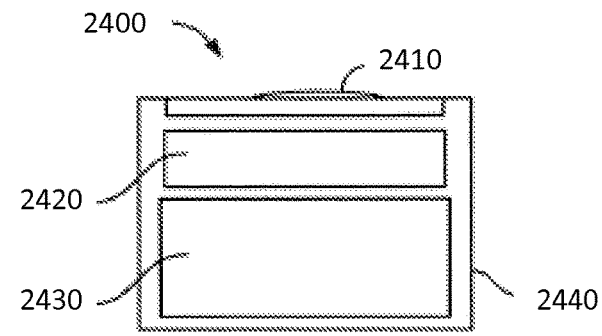
FIGS. 24A-24C illustrate portions of a temple assembly of electro-active eyewear in accordance with an aspect of the present technology.
Figure 24B:
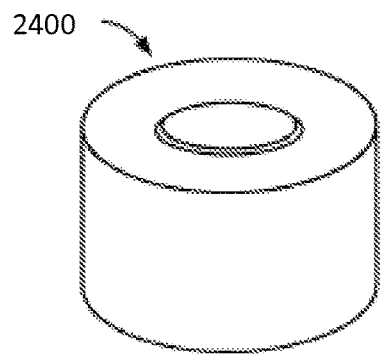
Figure 24C:
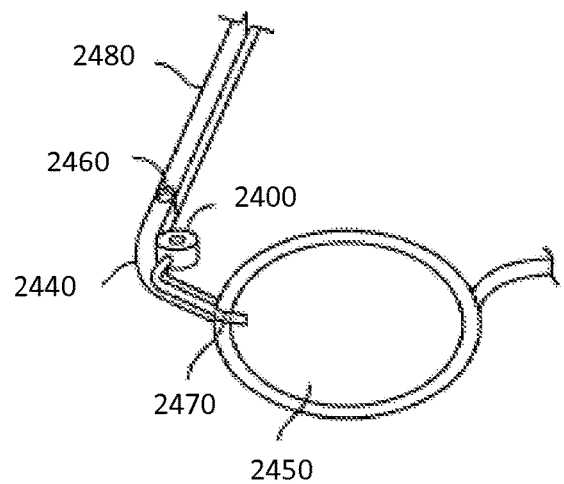

A module 2400, as illustrated schematically FIG. 24A and in cross section in FIG. 24B, contains a battery 2430 for powering an electro-active lens and related drive circuitry, a printed circuit board 2420 with drive and control electronics, and a switch 2410. The module may also contain a membrane switch to allow for manual control of the electro-active lens. FIG. 24C illustrates the module 2400 placed in an eyeglass frame 2450. The frame has a frame stem section 2440 near the front of the frame but also well in front of a frame hinge 2460 that connects a stem 2480 to the front of the frame. The module is preferably placed behind the frame stem section, provided that the frame is not of a full rimless design. In the event of a full rimless design, the inventive electronic module or modules would fit within or near the space (right spatial void and left spatial void) anterior to the hinge and would then attach to the lens. In certain other inventive embodiments where there is no hinge (hinge-less temples) and eyeglass frames that have a continuous temple that attaches directly to the frame front or directly to the lens, the module would preferably be located within or near the space (right spatial void and left spatial void). In fact, the module can be located anywhere within these two spatial voids.

The module may further include one or more of the following: a manual switch (for example, a touch button, photo-detector, motion detector, capacitive touch sensor), a controller and/or micro-processor, a power source (for example, a small battery), a sensor (for example, one or more miniature or micro tilt switches, accelerometer, micro gyro, range finder, view detector, imager), an antenna, a transmitter, a transceiver or a receiver. The module preferably houses any of the aforementioned electrical components in a substantially water-proof and wear resistant/moisture resistant environment and is preferably hermetically sealed. In the event of a malfunction of one or more of the electronic components housed within the module, the module can be replaced without having to repurchase a complete pair of new electronic eyewear (lenses and frames) or just the frames. It should be pointed out that in certain applications, a single inventive electronic module may be sufficient, and in others, two or more modules may be needed. The embodiments described in FIGS. 23 and 24 allow for modification of any number of existing frames that otherwise were not originally designed to support electronics for driving electro-active lenses.

In general, the inventors have found that in some embodiments, any surface or substrate may be utilized to dispose the electronic components thereon prior to insertion into a partial enclosure. However, it may be preferred (such as when a touch switch is utilized as a sensor for the electronic eyewear) that the electronic components be disposed on a surface of the touch switch. As used in this context, a "touch switch" may refer to a type of switch that may be touched by an object to operate (or an object may come into close proximity to the switch). For embodiments comprising electronic eyewear, it may be preferred that a capacitive touch switch is used because such switches may be moisture resistant, which the inventors have found is advantageous given the typical exposure to, for example, perspiration from the wearer, environmental moisture (e.g. humidity, precipitation), moisture from the wearer's finger, etc. A "capacitive touch switch" may refer to any sensor that may utilize an electrical field to detect, for instance, the presence of a human finger or other conducting object to activate a switch. For example, when a conductive object enters the field (e.g. comes into contact with, or in close proximity to, the device), the switch recognizes a change in the capacitance indicating an actuation. This may enable capacitive switches to be "sealed" (i.e. there may not need to be any physical interaction with the sensing components) such that, as noted above, the switches and components thereof need not be exposed to external conditions (e.g. moisture).

Additional steps may also be performed as well in some embodiments. For instance, some embodiments include the step of depositing a conformal layer (e.g. an encasing or encapsulating layer) over the electronic assembly (i.e. comprising the capacitive touch switch and the electronic components disposed thereon) using a film or other protective material layer. This conformal layer may be utilized to seal the electronic components (and particularly the electrical connections between the electronic components) to protect them from damage, particularly external environmental damage. Thus, the conformal layer may generally be moisture proof in some embodiments. However, the entire assembly may not be covered by the conformal layer in some embodiments because one or more electrical connections may be needed to, for instance, electrically couple the electronic components in the electronics module to other electronic components on the electronic eyewear. Thus, during the deposition of the conformal layer (e.g. the encasing or encapsulation process) a mask may be disposed over the electrical contacts that will be used to make such connections. In some embodiments, rather than using a mask, the entire assembly may be encased or encapsulated, and the conformal layer may be selectively removed from portions of the assembly (e.g. portions of the layer that cover the electrical contacts) to expose the electrical contacts and allow one or more connections to be made. The electronic assembly may then be inserted into a partial enclosure (e.g. an electronics module outer casing) and then disposed within the cavity of a temple of the electronic eyewear.

In some embodiments, the first method may further comprise the step of applying a conformal coating to the plurality of electronic components. As used in this context, a "conformal coating" may refer to any coating that is designed to substantially protect or enclose the electrical connections of the plurality of electronic components (and/or the components themselves) that are disposed on the capacitive touch switch. The conformal coating may also protect portions of the capacitive touch switch as well. The conformal coating may be configured to prevent short circuits, foreign materials, atmospheric conditions (such as moisture) or any other external forces from affecting the electrical connections or damaging the electronic components. In this regard, the coating may generally be moisture proof or resistant. The conformal coating may have any suitable thickness, but is typically less than 1 mm thick, and more preferably less than 0.5 mm thick. The coating may comprise any suitable material, such as a brushed, spray or dip applied acrylic, urethane, silicone, or epoxy. It should be noted that components that are intended to form one or more electrical connections with an external component(s) may be masked during the deposition/application process of the conformal coating (or the coating may be later removed) so as to expose the electrical contacts of these components.

Figure 25:
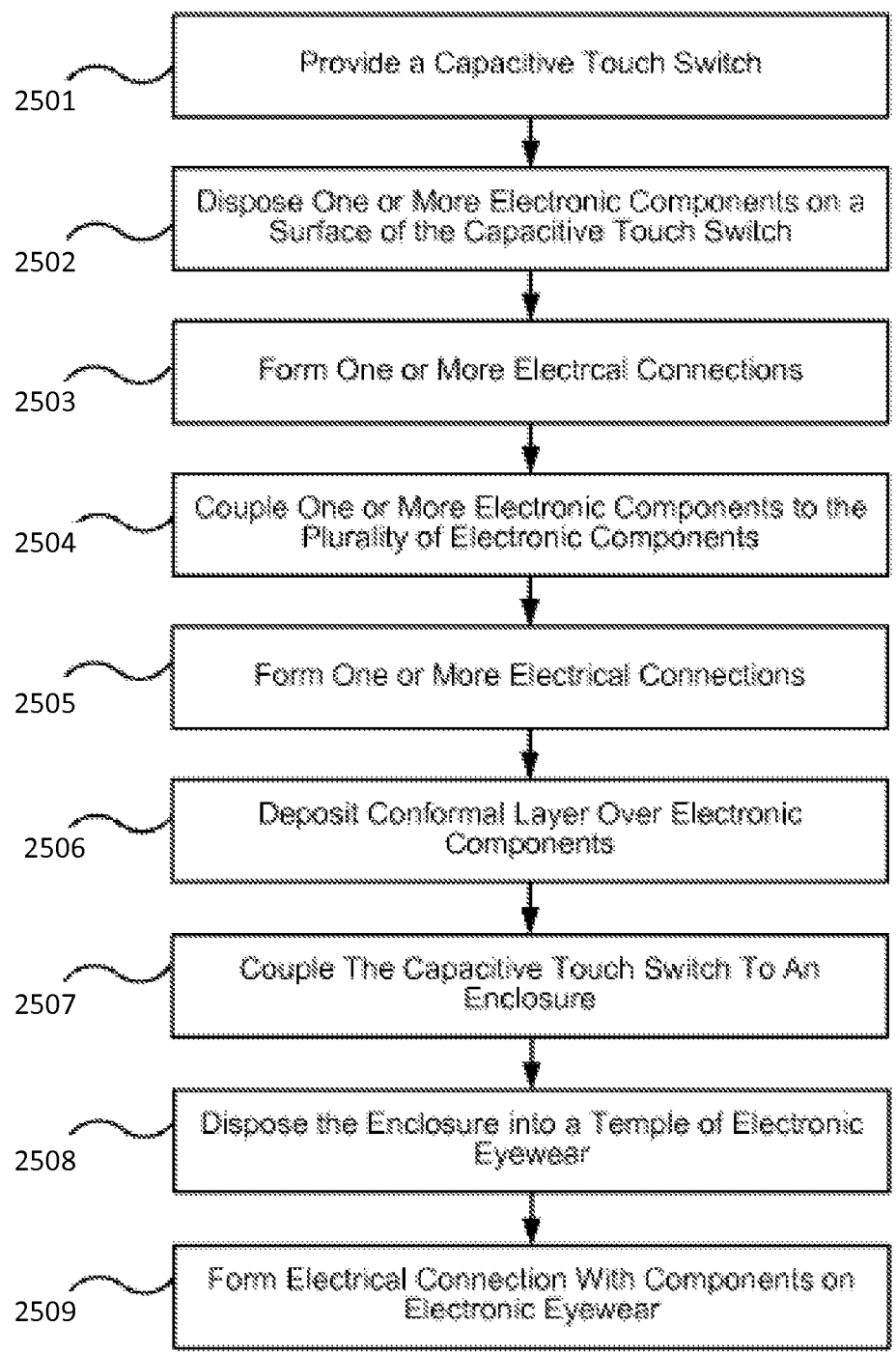
FIG. 25 illustrates steps in an exemplary method of forming eyewear with electrical connections according to an aspect of the present technology.

FIG. 25 is a flow chart that illustrates exemplary steps that may be performed in accordance with some methods provided herein. For example, at step 2501 a capacitive touch switch may be provided. The capacitive touch switch may serve as the platform or "back bone" on which some of the electronic components of an electronics module or electronic eyewear may be disposed. Next, at step 2502, one or more electronic components may be disposed on a surface of the capacitive touch switch. For instance, electrical connectors may be disposed on the surface (e.g. using reflow soldering). However, embodiments are not so limited, and the components may be coupled to the surface of the capacitive touch switch in any suitable manner. In step 2503, one or more electrical connections may be formed between the capacitive touch switch and the electronic components that were coupled to the capacitive touch switch in step 2502. In some embodiments, the electrical connections may be formed simultaneously with step 2502, such as when reflow soldering is used; however, embodiments are not so limited.

Continuing with reference to FIG. 25, at step 2504 one or more electronic components may be coupled to the one or more of the electronic components that were previously disposed on the capacitive touch switch in step 2502. For instance, electrical connectors coupled to a PCB may be coupled to one or more electrical connectors that may have been reflow soldered to the capacitive touch switch. In this manner, an electronic assembly may be created, wherein each additional electronic component may connect to another electronic component or components. Each of these additional electronic components may be considered to be disposed on the capacitive touch switch, as used in this context. At step 2505, one or more electrical connections may be formed, to the extent that this was not performed during step 2504.

In some embodiments, at step 2506, a conformal layer (e.g. an encasing or encapsulating layer) may be deposited over some or all of the electronic assembly that is now disposed on the capacitive touch switch. The conformal layer may be used to seal and protect the electrical connections that were formed in steps 2503 and/or 2505, as well as to protect the electronic components themselves (such as from moisture, which could damage or affect device performance). As described above, to the extent electrical contacts may be required so as to form electrical connections with other components that are not part of the electronic assembly disposed on the capacitive touch switch, these electrical contacts may be masked during the deposition process of the conformal layer, or the conformal (i.e. encapsulation) material may be subsequently removed to expose the electrical contacts. It should be noted that while it may be preferred in some embodiments to include a conformal layer, embodiments are not so limited. In some embodiments, the conformal layer may have a thickness that is less than 1 mm in thickness (preferably less than 0.5 mm).

At step 2507, the capacitive touch switch (which comprises the assembly of electronic components that were disposed thereon in steps 2502 and 2504) may be coupled to an enclosure. As described above, the enclosure may comprise the outer casing of an electronics module or the cavity of a temple of electronic eyewear. The step of coupling the capacitive touch switch to the enclosure may comprise any suitable method, including pressure fitting the two components (if they are designed and configured to have the structural interface to do so). The enclosure may provide protection for the electronic components from external forces, but need not necessarily support the components because they may be supported by the capacitive touch switch. As noted above, the capacitive touch switch, or at least a portion thereof, may comprise a material that may be firm enough to substantially maintain its shape and structure, even with the electronic components disposed thereon. Finally, at step 2509, one or more electrical connections may be formed between the components disposed on the capacitive touch switch (e.g. that may now be disposed within an electronics module) and one or more electronic components disposed on the electronic eyewear.

While various embodiments of the present technology have been described above, it should be understood that they have been presented by way of example and not limitation. Any conductive element described above (e.g., the upper or lower portions of the frame) can be entirely conductive (and possibly coated with non-conductive material) or can contain an embedded or buried conductive element (e.g., a conductive core) and a non-conductive outer or surrounding layer. Further, any conductive link—e.g., described or referred to as an electrical wire or connection—could alternatively, or in addition thereto, be or include an optical conductive link as will be apparent to one skilled in the pertinent art. The exemplary techniques for coupling or connecting the electrical elements of the electro-active spectacles of the present technology (e.g., the controlling electronics and power supplies and electro-active lenses) using embedded conductive links can be used to embed one or more conductive optical links (e.g., one or more optical fibers) as will be apparent to one skilled in the pertinent art.

These applications can be that of, by way of example only, by way of example only, electronic focusing eyeglasses, electro-active eyeglasses, fluid lenses being activated by way of an electronic actuator, mechanical or membrane lenses being activated by way of electronics, electro-chromic lenses, electronic fast tint changing liquid crystal lenses, lenses whose tint can be altered electronically, lenses that by way of an electrical charge can resist or reduce the attraction of dust particles, lenses or eyeglass frames housing or having an electronic display affixed thereto, electronic eyewear providing virtual reality, electronic eyewear providing 3-D capabilities, electronic eyewear providing gaming, and electronic eyewear providing augmented reality.

Overall, it will be apparent to one skilled in the pertinent art that various changes in form and detail can be made therein without departing from the spirit and scope of the technology. Therefore, the present technology should only be defined in accordance with the following claims and their equivalents.

The invention claimed is:

1. Spectacles comprising:
a temple;
a frame front;
a hinge connecting the temple to the frame front;
an electronics module disposed in the temple;
an electro-active lens held by the frame front; and
at least one flexible conductive link connecting the electronics module to the electro-active lens and configured to tolerate bending of the hinge,
wherein the at least one flexible conductive link is contained with a flexible conductive cable.

2. The spectacles of claim 1, wherein the flexible conductive cable extends into the electronics module.

3. The spectacles of claim 1, wherein the flexible conductive cable is connected to a lead that extends from the electronics module.

4. The spectacles of claim 1, wherein the flexible conductive cable exits the temple and bypasses a connection between the hinge and the frame front.

5. The spectacles of claim 1, wherein the flexible conductive cable connects to contact points on a rim of the spectacles.

6. The spectacles of claim 1, wherein the flexible conductive cable forms a sealed connection from the electronics module to electrical connection points within an eye wire or rim of the spectacles.

7. The spectacles of claim 1, further comprising:
a physically compliant insulator, disposed along at least a portion of an edge of the electro-active lens, to prevent liquid and/or moisture from penetrating the electro-active lens.

8. The spectacles of claim 1, further comprising:
a physically compliant conductor, disposed along at least a portion of an edge of the electro-active lens, to provide an electrical connection between the electro-active lens and the at least one flexible conductive link.

9. The spectacles of claim 1, wherein the at least one flexible conductive link provides a constant and flexible electrical connection to electronics in the electronics module.

10. Spectacles comprising:
a temple;
a frame front;
a hinge connecting the temple to the frame front;
an electronics module disposed in the temple;
an electro-active lens held by the frame front; and
at least one flexible conductive link connecting the electronics module to the electro-active lens and configured to tolerate bending of the hinge,
wherein the at least one flexible conductive link comprises a first flexible conductor and a second flexible conductor, and
wherein the first flexible conductor is rigid along a portion of its length.

11. Spectacles comprising:
a temple;
a frame front;
a hinge connecting the temple to the frame front;
an electronics module disposed in the temple;
an electro-active lens held by the frame front;
at least one flexible conductive link connecting the electronics module to the electro-active lens and configured to tolerate bending of the hinge, wherein the at least one flexible conductive link comprises a first flexible conductor and a second flexible conductor; and
insulating material, disposed on the first flexible conductor and the second flexible conductor, to protect the first flexible conductor and the second flexible conductor from moisture.

12. Spectacles comprising:
a temple;
a frame front;
a hinge connecting the temple to the frame front;
an electronics module disposed in the temple;
an electro-active lens held by the frame front; and
at least one flexible conductive link connecting the electronics module to the electro-active lens and configured to tolerate bending of the hinge,
wherein a connection between the at least one flexible conductive link and the electronics module is sealed at an entrance to the electronics module.

13. Spectacles comprising:
a temple;
a frame front;
a hinge connecting the temple to the frame front;
an electronics module disposed in the temple;
an electro-active lens held by the frame front; and
at least one flexible conductive link connecting the electronics module to the electro-active lens and configured to tolerate bending of the hinge,
wherein the electronics module is sealed to inhibit undesirable effects of liquid and moisture on electronics in the electronics module.

* * * * *